(12) United States Patent
Azenkot et al.

(10) Patent No.: US 6,791,995 B1
(45) Date of Patent: Sep. 14, 2004

(54) MULTICHANNEL, MULTIMODE DOCSIS HEADEND RECEIVER

(75) Inventors: Yehuda Azenkot, San Jose, CA (US); Selim Shlomo Rakib, Cupertino, CA (US)

(73) Assignee: Terayon Communications Systems, Inc., Santa Clara, CA (US)

(*) Notice: Subject to any disclaimer, the term of this patent is extended or adjusted under 35 U.S.C. 154(b) by 5 days.

(21) Appl. No.: 10/172,035

(22) Filed: Jun. 13, 2002

(51) Int. Cl.[7] .................................................. H04J 4/00
(52) U.S. Cl. ....................... 370/436; 370/447; 370/462; 370/538; 725/117; 725/144
(58) Field of Search .................... 370/389, 391, 370/392, 401, 412, 414, 416, 434, 441, 442, 458, 461, 486, 538, 436, 447, 426; 725/111, 114, 121, 124, 138, 144, 117; 375/229–236, 341, 346

(56) References Cited

U.S. PATENT DOCUMENTS

| | | | | |
|---|---|---|---|---|
| 6,353,490 | B1 * | 3/2002 | Singer et al. | ................. 398/66 |
| 6,459,703 | B1 * | 10/2002 | Grimwood et al. | ......... 370/442 |
| 2001/0033611 | A1 * | 10/2001 | Grimwood et al. | ......... 375/219 |
| 2002/0150173 | A1 * | 10/2002 | Buda | .......................... 375/316 |
| 2002/0154620 | A1 * | 10/2002 | Azenkot et al. | ............ 370/347 |
| 2002/0199202 | A1 * | 12/2002 | Hunter | ........................ 725/105 |

* cited by examiner

Primary Examiner—Hassan Kizou
Assistant Examiner—Christopher M Swickhamer
(74) Attorney, Agent, or Firm—Ronald Craig Fish; Ronald Craig Fish, A Law Corporation

(57) ABSTRACT

A multichannel, mixed mode cable modem termination system receiver capable of receiving multiple channels of digital data transmitted on one or more hybrid fiber coaxial cable systems, each the channels being either single mode or mixed-mode. Mixed mode channels are time division multiplexed and have overlapping bandwidth and each sub-channel of a mixed mode channel can have a different center frequency, symbol rate and/or multiplexing type. The receiver is comprised of a plurality of analog front end circuits coupled to the various HFC systems, each selective coupled to any one of a plurality of digital front end receivers. Control circuitry controls these circuits to receive multiple mixed-mode or single mode channels, simultaneously if necessary. An arbiter decides which bursts get processed first in a back end shared demodulator which recovers the data from each burst. The preferred shared demodulator includes an equalizer, predictor and rotational amplifier which processes both TDMA and SCDMA data bursts post despreader to reduce reception data errors.

51 Claims, 16 Drawing Sheets

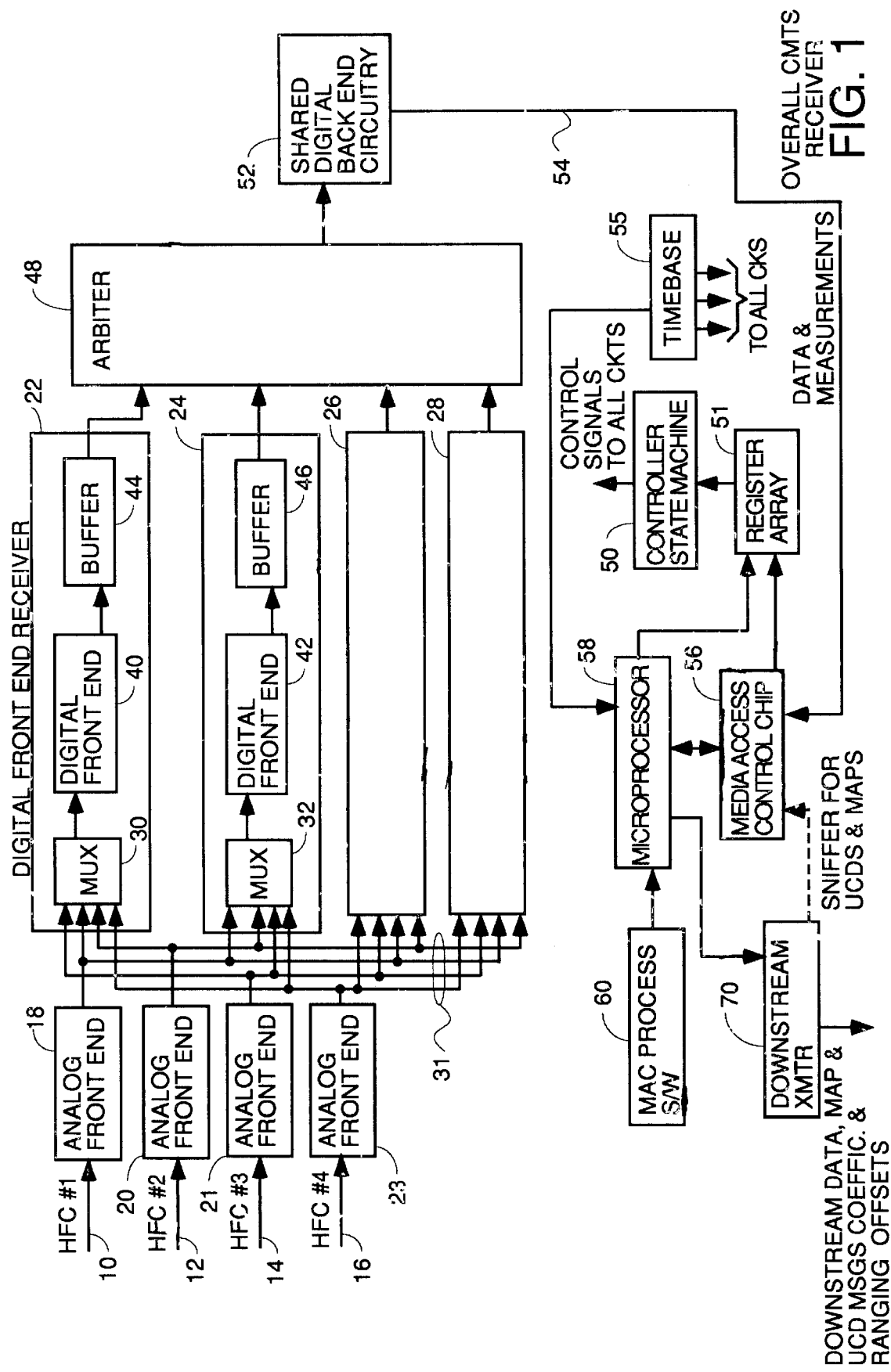

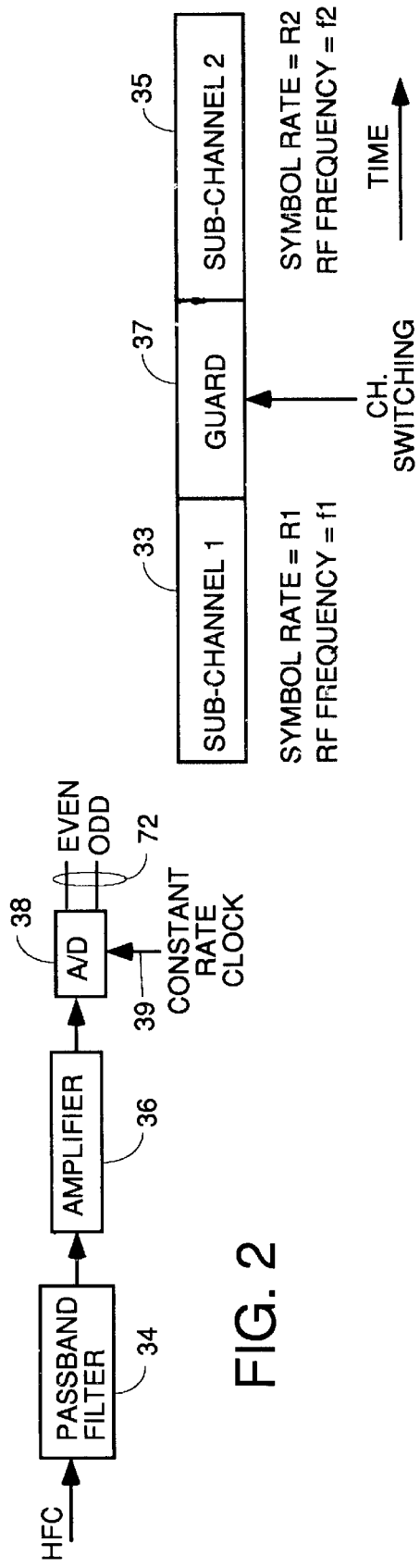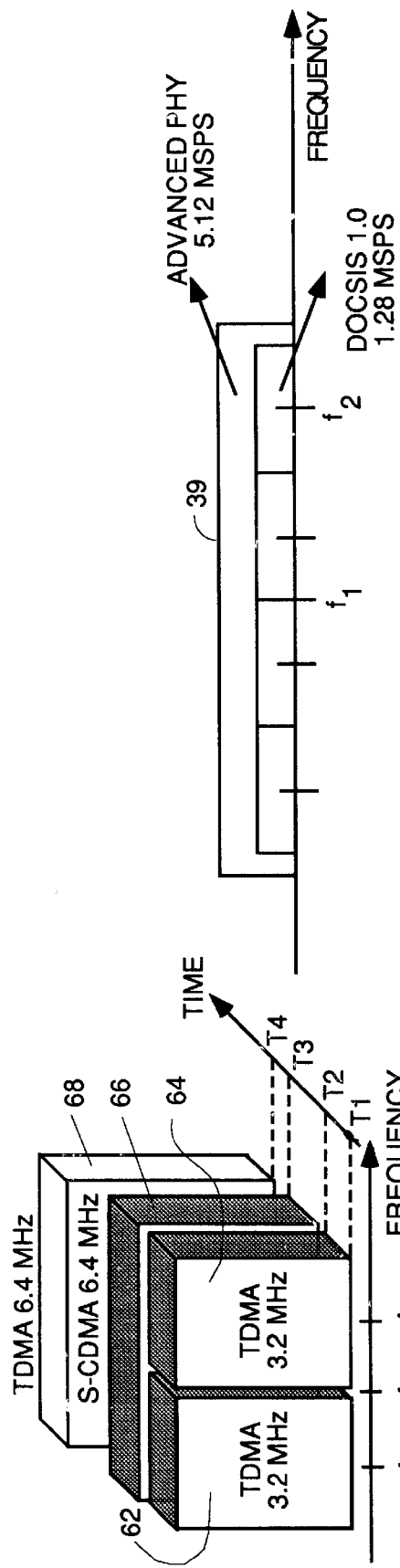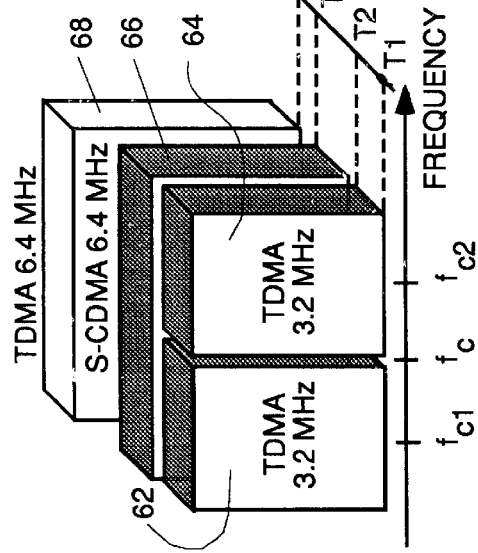

SCDMA REGION MINISLOT TO CODE MAPPING

EQUALIZER CONNECTIONS

TDMA & SCDMA SPREADER OFF
EQUALIZER, PREDICTOR & R/A

EQUALIZER & AGCR BLOCK FOR SCDMA SPREADER - ON BURSTS

MULTICHANNEL, MULTIMODE DOCSIS HEADEND RECEIVER

FIELD OF USE

The invention finds use in the digital data receivers of cable modem termination systems (hereafter CMTS) of DOCSIS enabled cable television distribution systems. The DOCSIS 1.0 systems used time division multiplexed (hereafter TDMA) bursts only. However, the desire for higher speeds for transmission of digital data led to the development of DOCSIS 1.1 systems which were also TDMA systems but faster.

Upstream noise is a major problem in any system where digital data is transmitted upstream over a cable television hybrid fiber coaxial (hereafter HFC) cable distribution system to a cable modem termination system (hereafter CMTS). Privacy can also be a problem with TDMA bursts. One way of overcoming these noise problems and insuring privacy is to use code division multiplexing (hereafter CDMA) for upstream bursts. The code gain of CDMA systems helps overcome the noise and the spread spectrum nature of the signal prevents evesdropping by those without access to the spreading codes used in the transmitters. Terayon Communication Systems, Inc. of Santa Clara, Calif. has been a leader in bringing spread spectrum cable modems to the market. Terayon's modems enjoy a further noise advantage because they use sychronous code division multiplexing (hereafter SCDMA) to cut down on intersymbol interference. SCDMA requires all remote modems to perform a ranging process to determine a delay which is proper for their distance from the CMTS such that frames of spread spectrum data transmitted from the remote modems all arrive at the CMTS with their frame boundaries aligned in time. This minimizes intersymbol interference caused by transmissions from other modems.

DOCSIS cable modem termination system receivers are under development by Terayon which are capable of receiving both TDMA and SCDMA bursts on different channels as well as both TDMA and SCDMA bursts in separate time intervals (with different MAP messages applying to each) on the same frequency channel. DOCSIS defines a sub-channels as bursts with frequencies and symbol rates such that there is overlapping bandwidth. Sub-channel bursts cannot be transmitted with overlap in time. Different type bursts with different multiplexing and/or different symbol rates can be transmitted during different time intervals on the same carrier, and because there is overlapping bandwidth, each interval would be a sub-channel. The term sub-channel, as it is used herein means bursts transmitted on the same or different frequencies with symbol rates and center frequencies of the RF carrier on which they are transmitted such that there is an overlap in the bandwidth, but multiplexed in time such that there is no overlap in time. Channels or frequency channel, as the terms are used herein means transmissions on carriers of different frequencies and at symbol rates such that there is no overlap in bandwidth. Because there is no overlap in bandwidth, transmissions on different channels may overlap in time.

A prior art receiver that could not receive two sub-channels or channels at different center frequencies referred to as the Jasper I was developed by the assignee of the present invention and is currently on sale. A United States patent application Ser. No. 09/792,815 filed by the assignee of the present invention on Feb. 23, 2001 describes circuitry of Jasper I, and that patent application is hereby incorporated by reference. The receiver of the above identified patent application is capable of receiving 15 different SCDMA and TDMA burst types by adjusting the operation of its circuitry using burst parameter data that define the burst to be received. The differences in the various burst types relate to the symbol rate, type of multiplexing, type of modulation, function of the burst such as initial ranging or periodic station maintenance or data, etc.

When deploying new cable modems (hereafter CMs) capable of higher speed TDMA transmissions and high speed SCDMA bursts into a system with existing slower DOCSIS 1.0 or DOCSIS 1.1 modems, there arises a backward compatibility problem. Cable operators devote a certain portion of the bandwidth of the HFC to upstream digital data transmissions and there is no other available bandwidth upon which the higher speed TDMA or SCDMA upstream bursts can be transmitted. The bandwidth of a channel is related to its symbol rate. The symbol rate of DOCSIS 1.0 and 1.1 modems is slower (1.28 or 2.56 Msps) than the new advanced PHY TDMA and SCDMA modems (5.12 Msps), so the new modem channels have wider bandwidth when transmitting at the faster symbol rates. Thus, it is frequently necessary for wide-bandwidth, high-speed TDMA and SCDMA advanced PHY channels to overlap in bandwidth with lower-speed, more narrow bandwidth channels on which the older DOCSIS 1.0 and 1.1 modems transmit. This is because of the bandwidth and frequency band limit restrictions on upstream transmissions imposed on digital data delivery services by the cable operators.

The Jasper I receiver chip cannot receive mixed mode signals, i.e., two different sub-channels at different symbol rates and/or different multiplexing types which have overlapping bandwidth and the same center frequency. Further, it could not receive two different sub-channels having overlapping bandwidth and different center frequencies. The Jasper I receiver also cannot receive different channels at different RF center frequencies. Further, the Jasper I receiver was capable of receiving bursts at a maximum of 5.12 Msps, so when it was receiving DOCSIS 1.0 or 1.1 bursts at 1.28 or 2.56 Msps, the digital circuitry was idle most of the time.

Therefore, there is a need for a receiver that can receive bursts on multiple different RF inputs to keep the shared back end digital circuitry busy all the time. Further, there is a need for a CMTS receiver that can receive, on each RF input, mixed mode transmissions, that is having multiple sub-channels with overlapping bandwidth and either the same or different center frequencies. The receiver should be able to receive sub-channels of any type on the same frequency channel such as DOCSIS 1.0, Advanced PHY TDMA or advanced PHY SCDMA, and the different sub-channels may have different symbol rates. The receiver should be able to receive different sub-channels having overlapping bandwidth and the same center frequency or different center frequencies. Further, the receiver should be able to receive, multiple different channels without overlapping bandwidth and having the same or different symbol rates and/or multiplexing types and different center frequencies which are spread far enough apart given the symbol rate that there is no overlap in bandwidth. For example, there is a need for a receiver that can receive a single advanced PHY SCDMA channel having a symbol rate of 5.12 megasymbols per second (Msps) and a center frequency of F1 transmitted with its bandwidth overlapping the bandwidths of multiple separate other channels of DOCSIS 1.0 bursts having symbol rates of 1.28 Msps or 2.56 Msps and center frequencies on both sides of F1 and spaced apart so that the DOCSIS 1.0 channel bandwidths do not overlap each other. The receiver must be able to receive a different UCD message for each sub-channel type and switch between sub-channels on the fly during a guardtime between bursts on different sub-channels or different channels.

Channels with overlapping bandwidth and different burst types are typically multiplexed in time so that two different burst types with overlapping bandwidth are not transmitted at the same time, but there is also a need for a receiver that can simultaneously receive two or more sub-channels with overlapping bandwidth and overlapping in time. To receive overlapping bandwidth bursts of different types which are time division multiplexed, the circuitry of the needed CMTS receiver has to be adjusted using burst parameter data that defines the burst to be received during any particular time on a sub-channel or channel.

The Jasper I receiver could only receive one channel of RF signals at a time, i.e., it only had one RF input which could only be coupled to one physical transmission medium. Thus, if a headend cable modem termination system (CMTS) were coupled to four different HFC systems, four different Jasper I CMTS receivers would have to be used with attendant multiplication of space consumed and cost. Frequently, CMTS headend apparatus are coupled to multiple HFC systems, each serving different groups of customers in different areas. Typically, each CMTS system has a mixture of older DOCSIS 1.0 and 1.1 type cable modems (CM) and newer advanced PHY TDMA and SCDMA CMs. Further, rack space and floor space is limited so footprint size of the CMTS equipment is an important consideration. Typically, cable operators have to buy the CMTS receiver equipment as well as thousands of CMs to serve their customers that want broadband digital data services delivered over their cable TV system. Thus, expense of the CMTS system is an important factor to commercial success because costs will be passed along to customers.

Thus, there is also a need for a CMTS receiver which has multiple RF inputs for connection to multiple HFC systems and which is capable of receiving the different burst types which can be transmitted in a DOCSIS system with a mixed bag of DOCSIS 1.0 and 1.1 CMs plus advanced PHY ATDMA and SCDMA CMs. Such a receiver must be able to receive upstream digital data transmissions at each of these multiple RF inputs which have different multiplexing and/or different symbol rates. Further, the circuitry coupled to each RF input must be able to receive different sub-channels on the same frequency channel with some bursts on some sub-channels being DOCSIS 1.0 or 1.1 TDMA and other bursts on different sub-channels being advanced PHY TDMA or SCDMA (referred to herein as mixed mode) with different symbol rates. Such a receiver must also be frequency agile on each of its RF inputs so as to be able to receive different frequency channels having different center frequencies without overlapping bandwidth.

SUMMARY OF THE INVENTION

The genus of the invention is defined by a central receiver for a distributed system of digital data transceivers which have the following characteristics that provide multichannel, mixed mode reception capability:

a plurality of channel receivers, each capable of receiving mixed mode upstream bursts in different sub-channels that have overlapping bandwidth but which are multiplexed in time, where each subchannel burst may have a different symbol rate, different RF frequency, different multiplexing type and different Synchronous Code Division Multiple Access (hereafter SCDMA) frame size;

a shared back end circuit for recovering the data from each burst, making measurements and calculations on at least some bursts transmitted by each cable modem which are sent down to the cable modem which sent said burst which are useful in establishing at least frame boundary and minislot boundary synchronization and upstream equalization;

an arbiter coupled to receive the data output by each said channel receiver and structured to supply received data to said shared back end circuit such that said shared back end circuit is shared so as to process all data from all said channel receivers at different times;

control circuitry for controlling at least said plurality of channel receivers and said shared back end circuit to provide multichannel, mixed-mode reception of digital data.

"Multichannel" refers to the capability to receive multiple channels simultaneously on different channel receivers. If the different channel receivers are coupled to different distributed systems such as different Hybrid Fiber Coaxial cable (HFC) distribution systems, the different channel can have overlapping bandwidth. However, if the different channel receivers are coupled to the same HFC system, the different channels being received simultaneously cannot have overlapping bandwidth. "Mixed-mode" refers to the reception of different types of bursts on the same general channel, i.e., with overlapping bandwidth, but multiplexed in time. In other words, a single RF carrier is divided into an interval during which a burst of a first symbol rate and first multiplexing type is modulated on the carrier, and one or more other intervals when bursts having different symbol rates or multiplexing types are modulated onto the carrier. "Mixed-mode" also refers to the overlapping in bandwidth but not overlapping in time transmission of multiple sub-channels on different carriers having different center frequencies which are not so different as to preclude overlapping bandwidth.

Although multiple channels can be received, and each channel can be mixed-mode, the total throughput through the backend circuit is limited to that circuit's capabilities, which, in the preferred embodiment, is 5.12 megasymbols per second. The advantage of the multiple front end receivers is that the backend circuit can be fully utilized as compared to the prior art wherein a single front end receiver circuit fed the back end circuit. Thus, if the burst being received had a symbol rate of less than 5.12 megasymbols per second, the full capability of the backend circuit was not used.

The analog front end circuits do wide band sampling. The digital front end receivers are controlled to connect to the right analog front end circuit, mix the samples of each subchannel down to baseband using the correct local oscillator signal frequency. The samples are then resampled at the proper symbol rate, decimated down to a predetermined number of samples per symbol, typically two, and narrow band noise is excised. A shared back end demodulator detects impulse noise and marks symbols corrupted therewith with erasure bits, despreads the spectrum of SCDMA bursts, recovers the symbol clock and makes start of burst measurements in support of ranging. The preamble of each burst is processed to develop phase and amplitude error correction factors and upstream equalization coefficients. The data symbols are then decoded in the appropriate type of decoder such as a Viterbi decoder for TCM bursts and the Reed-Solomon code words are reassembled and error corrected and the payload data is output. The erasure bits written by the impulse detector are used to prevent corrupted symbols from being used by the tracking loops for symbol clock recovery or error correction factor development or equalization tap coefficient updating. A SOVA Viterbi decoder in the preferred embodiment uses erasure indications to control the branch metric values in the decoding process, and outputs erasure indications which are used to increase the range of error detection and correction of the Reed-Solomon decoding circuitry.

BRIEF DESCRIPTION OF THE DRAWINGS

FIG. 1 is a block diagram of the overall CMTS receiver system.

FIG. 2 is a block diagram of the circuitry in each analog front end.

FIG. 3A illustrates how different sub-channels with different multiplexing or symbol rates can share the same bandwidth on the same HFC system without collisions.

FIG. 3B is an illustration of the time division multiplexing of two sub-channels at two different symbol rates and two different RF frequencies can be sent on the same HFC system and share the same bandwidth by time multiplexing.

FIG. 3C is an illustration of how four different DOCSIS 1.0 sub-channels at 1.28 Msps symbol rates can share the same bandwidth with a single advanced PHY channel at 5.12 Msps on the same HFC system using time division multiplexing.

DETAILED DESCRIPTION OF THE PREFERRED AND ALTERNATIVE EMBODIMENTS

Figure 4:
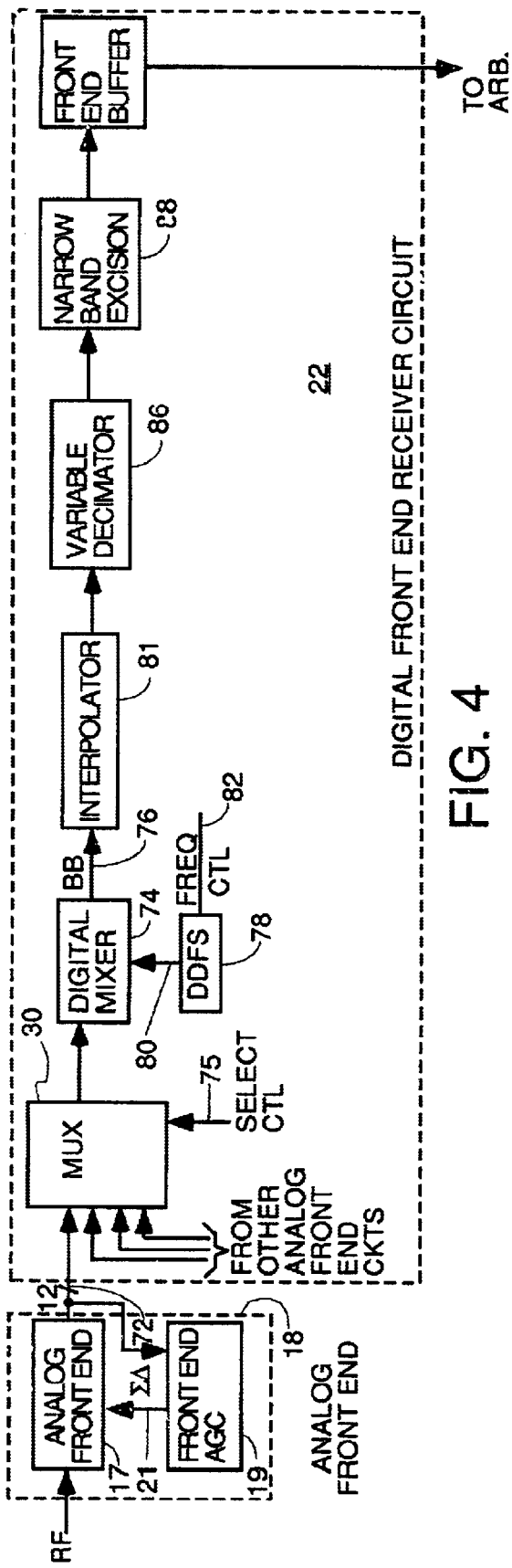
FIG. 4 is a more detailed block diagram of the circuitry of each digital front end receiver.

FIG. 1 is a block diagram of an overall CMTS receiver system that implements multichannel, mixed-mode digital data reception of a plurality of upstream channels received from a plurality of different HFC cable systems according to the teachings of the invention. Overall, in the preferred embodiment, the receiver has four different radio frequency front end sections coupled by an arbitrator 48 to a shared digital back-end demodulator-circuit 52 which has a maximum throughput of 5.12 megasymbols per second (Msps). The first front end section is comprised of analog front end circuitry 18 and digital front end circuitry 22. The combination of the analog front end 18 and the digital front end 22 is one "channel receiver". Each channel receiver described herein can receive bursts having different symbol rates, transmitted on a carrier of a different RF frequency and having a different SCDMA frame size. Each receiver channel can receive "mixed mode" wherein two or more subchannels comprised of different time division multiplexed intervals during which different type bursts can be received. Different type bursts can have different symbol rates (160 Ksps, 320 Ksps, 640 Kspsh, 1.28 Msps, 2.56 Msps and 5.12 Msps) and/or different multiplexing types (DOCSIS 1.x, ATDMA, SCDMA). ATDMA is similar to DOCSIS 1.x but modulation of up to 64-QAM can be used. These bursts during different sub channels are transmitted on the same or different RF center frequencies but the sub channels have overlapping bandwidth and all subchannel bandwidth is allocated within the bandwidth allocated to the mixed mode channel. In the preferred embodiment, only two subchannels (called logical channels in DOCSIS parlance) per channel receiver are supported. The preferred embodiment does not support two SCDMA sub-channels, but other embodiments do. Each sub-channel has its burst parameters and channel parameters such as symbol rate and center frequency defined by a separate Upstream Channel Descriptor (UCD) message. The two sub-channels may differ in RF center frequency but if they are on the same HFC and have overlapping bandwidth, they are referred to as sub-channels. This differs from the prior art Jasper I receiver which could not receive mixed mode channels with subchannels at different symbol rates and/or different carrier frequencies. Switching between sub-channels is done on the fly, and there is a guardtime between sub-channels. Switching between two TDMA sub-channels can be done any time after any burst, but switching between two sub-channels, one of which is SCDMA must be done on a frame boundary. For any particular logical channel, all CMs assigned to it will be of only one type such as DOCSIS 1.0 or advanced PHY configured to transmit only ATDMA. Each CM is sent a list of the logical channels in a downstream message, and, depending upon the CM capabilities, it picks which logical channel it wants to transmit on and thereafter its UCD and MAP messages will restrict it to transmitting on that logical channel.

Each channel receiver is frequency agile so that it can tune to any RF carrier center frequency in the upstream band. A "channel" (as opposed to a sub-channel) refers to a single allocation of bandwidth, and each channel may have a plurality of sub-channels or logical channels, which have different center frequencies but the bandwidths of the sub-channels overlap each other and are contained within the bandwidth allocated to the channel. Different channels which do not have overlapping bandwidth such that they can be transmitted simultaneously are simply referred to as channels. Channels which are mixed-mode, i.e., having two different burst types multiplexed in time with overlapping bandwidth, will be referred to herein as mixed-mode channels.

There are two possible modes of operation: (1) the channels are received in non-overlapping overlapping time; (2) the channels can be received in overlapping time simultaneously by different channel receivers, and each channel receiver buffers the burst samples, and the arbiters feeds the burst samples to the shared demodulator section with a maximum aggregated symbol processing rate of 5.12 Msps. Each channel can be mixed-mode or not. In non-overlapping time, the MAC process for each channel coordinates with all the other MAC processes for the other channels to coordinate MAP allocations messages so the channels do not overlap in time. All channels can be transmitted on the same HFC or on some combination of different HFC systems. For example, four SCDMA channels at 5.12 Msps can be received at different times from four different HFC systems with an aggregate symbol rate limited to 5.12 Msps. Another example would be three SCDMA channels at 5.12 Msps and one DOCSIS 1.x channels at 2.56 Msps. The aggregated symbol rate would be less than 5.12 Msps depending upon the percentage of time that the DOCSIS 1.x channel was being received so utilization of the shared back end demodulator would not be maximized.

Allocation by the MAC processes of channels in overlapping time means that up to four channels can be received from the same or different HFC systems. The incoming bursts are buffered in the front end buffer 44 etc. of each digital front end receiver which is receiving a channel and then processed sequentially by the shared back end circuit 52 with a maximum aggregated symbol rate of 5.12 Msps. Examples would be simultaneous reception of four DOCSIS 1.x channels at 1.28 Msps each or two DOCSIS 1.x channels at 2.56 Msps each, or one SCDMA channel at 5.12 Msps and 3 DOCSIS 1.x channels at 1.28 Msps each.

Therefore, the multichannel capability of the receiver means it can receive multiple different channels either simultaneously or in non-overlapping time from the same or different HFC systems using multiple channel receivers and buffers but with the overall symbol processing rate limitation set by the throughput limit of the shared demodulator circuit 52. Multichannel capability is implemented by the architecture shown in FIG. 1.

Different channels which are transmitted simultaneously must be received using different channel receivers but the different channels can be transmitted on the same HFC because each digital front end receiver has a multiplexer which can be controlled to couple it to any of the HFC systems to which the receiver is coupled, and each analog front end uses wideband RF sampling so that multiple channels can be simultaneously sampled. In other words, each channel receiver can receive only one channel at a time. However, each channel can be mixed-mode and have two or more sub-channels. The use of multiplexers to select the input to each digital front end receiver is advantageous since it prevents the need to combine the signals from two or more HFC systems which would increase the noise. All HFC systems can be kept separate by using multiplexers.

Each channel receiver is capable of receiving bursts having different symbol rates of up to 5.12 Msps, different multiplexing type (DOCSIS 1.x, ATDMA, SCDMA) and having a different RF frequency and having different SCDMA frame size. Each receiver channel is capable of changing the symbol rate, RF frequency and SCDMA frame size of each sub-channel.

The overall receiver of FIG. 1 is referred to as multichannel, mixed mode since the multiple receiver channels can each be receiving upstream channel transmissions simultaneously, and each channel can be mixed mode. The individual receiver channels all must have their data processed by the shared back end circuitry 52, but that circuit can only process up to 5.12 Msps. It is the responsibility of the MAC software process 60 to allocate minislots to the various CMs on the various HFC systems and to tune the individual channel receivers such that the aggregate symbol rate from all channels through the shared back end circuit 52 does not exceed 5.12 Msps.

The Jasper I receiver chip of the prior art could not receive 2 sub-channels with different symbol rates or different RF carrier frequencies.

FIG. 3B is an illustration of mixed-mode transmission by time division multiplexing of two sub-channels on the same HFC system with each sub-channel at a different symbol rate and each at a different RF frequency but sharing the same bandwidth. Sub-channel 1 is transmitted during interval 33, and sub-channel 2 is transmitted during interval 35 with guardtime 37 used for switchover of the necessary receiver circuits from the symbol rate R1 and RF frequency of f1 of sub-channel 1 so as to be able to correctly receive a burst at symbol rate R2 and RF frequency f2. The sub-channels 1 and 2 can be any type DOCSIS 1.x, ATDMA, or SCDMA, although, in the preferred embodiment, the sub-channels are not both SCDMA. Each sub-channel has its own UCD message which defines its parameters such as symbol rate and center frequency. Either one combined MAP or two separate MAP messages generated and sent by the CMTS may be used to control which CMs transmit during sub-channels 1 and 2 and when they transmit and their burst lengths and type. The switch between sub-channels is done "on the fly" during guardtime 37 and the guardtime prevents intersymbol interference. As an example, consider "mixed ATDMA/DOCSIS 1.x" mode. In this mode, there are two types of modems on the HFC system, ATDMA and 1.x. The modems share the same REQ (bandwidth requests) and ranging bursts (IUC 1, 2, 3 and 4). However, the DOCSIS 1.x modems use IUC 5 and 6 for data and the ATDMA modems use IUC 9, 10 and 11 for data.

FIG. 3C is an illustration of mixed mode transmission with four different DOCSIS 1.0 sub-channels at 1.28 Msps symbol rates sharing the same bandwidth with a single advanced PHY channel at 5.12 Msps using time division multiplexing. The advanced PHY channel 39 can be an SCDMA or advanced TDMA burst with a symbol rate of 5.12 Msps and a center frequency of 20 MHz sharing the same bandwidth with DOCSIS 1.0 modems with symbol rates of 1.28 Msps and center frequency of 17.6 Mhz. Likewise, a 5.12 Msps SCDMA burst on a 20 MHz carrier can share the same bandwidth with DOCSIS 1.0 and ATDMA sub-channel bursts at 1.28 Msps and center frequencies of 17.6 MHz. Likewise, an SCDMA burst at 5.12 Msps and center frequency of 20 MHz can share the same bandwidth with ATDMA modems at the same symbol rate and center frequency. Switching between TDMA sub-channels is done between bursts, but switching between two sub-channels when one is an SCDMA sub-channel is done on frame boundaries.

The second channel receiver is comprised of analog front end section 20 and digital front end section 24. The third and fourth RF channel receivers are comprised of analog front end 21 and digital front end 26, and analog front end 23 and digital front end 28, respectively. Each of the analog front end circuits 18, 20, 21 and 23 has identical construction. Each of digital front end circuits 22, 24, 26 and 28 has identical construction.

Each analog front end section 18, 20, 21 and 23 functions to tune to the appropriate center frequency of the frequency channel being received and digitize analog signals received from the HFC to which it is connected. FIG. 2 is a simplified block diagram of the main circuitry in each analog front end. A passband filter 34 filters out all RF signals outside the upstream digital data band of from 5–42 MHz for U.S. DOCSIS systems and 5–65 MHz for European DOCSIS systems. The output signals from the passband filter are amplified at 36 and digitized in an A/D converter 38. The A/D converter samples at a constant rate set by the clock signal on line 39 regardless of frequency of the channel being received at any particular moment. This sampling frequency is established by A/D sampling frequency configuration data stored in a register (not shown) so that the sampling frequency can be changed between the Euro-DOCSIS sampling frequency and the U.S. sampling frequency. Wherever the CMTS is operating, the constant rate clock is set to operate at a frequency which is twice as high as the highest frequency channel to be received to satisfy the Nyquist criteria. In some embodiments, the A/D clock rate is 125 KHz, but in Euro-DOCSIS, the clock rate is different. The controller state machine controls the A/D clock rate in some embodiments based upon configuration data written into the configuration register.

RF wideband sampling is used so that the sample rate clock is set to satisfy the Nyquist criteria based upon the widest bandwidth of the upstream band of frequencies to be received. Wideband sampling allows the analog front end to allow two or more channels transmitted on the same HFC system to be simultaneously sampled. Note in FIG. 1 that each analog front end circuit has its output coupled to each of the digital front end circuits but the input of each analog front end circuit is coupled to only one HFC system. Thus, if two different channels with non overlapping bandwidth transmitted on the same HFC system are to be received simultaneously, the single analog front end coupled to that HFC system can sample both channels, and two different digital front end circuits can be assigned to process the same samples but to process them to mix each different channel down to baseband.

There are at least four alternative embodiments for the analog front end within the scope of the invention. First, the RF band from 5 to 65 MHz can be divided into two bands with an overlap of 6.4 MHz. The first band is from 5 MHz to 53.5 MHz and is sampled at a rate of 125 MHz. The second band is from 47.1 MHz to 65 MHz, and is sampled at 75 MHz using IF sampling which shifts the spectrum below fs/2 to 10 MHz till 27.9 MHz. The second embodiment samples the entire band from 5 MHz to 65 MHz using one fast A/D sampling at a 200 MHz rate. The A/D outputs two buses of odd and even samples at a rate of about 100 MHz apiece in one embodiment but uses only a single bus in other embodiments, with the number of buses active controlled by configuration data in an A/D number of buses register (not shown). Two buses is the embodiment shown in FIG. 2. The third embodiment samples a spectrum of 6.4 MHz bandwidth around a 5.12 MHz sample rate channel at exactly 20.48 MHz as was done in the prior art Jasper I receiver. The fourth embodiment divides the RF spectrum into three bands. Other A/D sampling rates are possible. Preferably, the A/D clock accuracy is 10 ppm minimum. Other parameter control data registers that can be altered to alter the operation of the analog front end circuitry are: spectrum inversion on/off; A/D sampling at IF of 5.12 MHz on/off; A/D output mode: 2's complement/binary offset; and analog front end select (2 bits for each digital front end). There is one set of register for the two sub-channels of each mixed mode channel, and there is a shadow register for each parameter which stores the parameter to be loaded into the active register on a sub-channel switch. The contents of the shadow register are loaded to the active register when the timestamp count equals the contents of an analog_front end_activation_timestamp register which is loaded by the software with the timestamp count when a switch to new analog front end parameters is to occur.

Digital Front End Circuits

Each analog front end section is coupled by a data path to an input of a four input multiplexer in each of the digital front end circuits 22, 24, 26 and 28. These four data paths are collectively indicated at 31. This allows each digital front end to receive digital signals from any of the four analog front end circuits by proper control of the multiplexers, of which 30 and 32 are typical. Control of the multiplexers is implemented by control signals from controller state machine 50 by loading of appropriate data into the register array 51 by microprocessor 58 under the control of MAC process software 60. In alternative embodiments, the state machine 50 and control registers 51 are eliminated, and a microprocessor controlled by one of more media access control processes to generate the proper control signals is coupled to the various circuits that need to be controlled to tune to a channel and receive the data thereof or to change the control signals to the appropriate circuits at the appropriate time to receive the data in mixed mode.

Assuming there can be only two sub-channels of each channel tuned by one of the four "receiver channels", i.e., one analog front end circuit and one digital front end circuit, then there are eight possible sub-channels or channels which the receiver can "simultaneously" receive. The back end circuit 52 can only process at a maximum rate of 5.12 MHz per second, but it is pipelined such that several bursts may be in processing in the various stages of the pipeline simultaneously. Meanwhile, each of the "receiver channels" in front of the arbiter may be tuned to a separate channel, and each of the separate channels may have two or more sub-channels. Assuming only two sub-channels per channel, in the preferred embodiment, the MAC process software will have a separate control process for each sub-channel and there will be eight separate media access control chips 56, one for each channel. Each MAC control unit for a sub-channel will have three buffers to store burst parameters: channel characteristics, burst attributes (IUC), and assigment (MAP). In some embodiments, the two separate MAPs for each sub-channel will be merged into a single MAP. In the single MAP embodiment, the MAP data has two unique words called dummyIEs, each of which indicates whether the IE assignment which follows a dummyIE is for sub-channel 1 or sub-channel 2.

Each burst data which is output from any of the front end buffers such as 44 has a header which has the following fields therein: channel with two bits that designate whether the burst came from receiver channel 0 to 3; sub-channel with one bit indicating whether the burst was from sub-channel 1 or sub-channel 0 of the channel identified in the channel field; sub-channel mode having two bits indicating the mode of the burst as SCDMA, DOCSIS 1.0, ATDMA; DOCSIS 1.0 & ATDMA. In the preferred embodiment, as symbolized by FIG. 7, bus 103, the burst parameter data for each burst is prepended to each burst's data in the front end buffer 44 so as to travel with the burst data through each pipeline stage in the shared back end demodulator 52. Each receiver channel has a channel_mode register (not shown) which stores four bits, two for each sub-channel. The two bits for each sub-channel define the sub-channel mode as SCDMA, DOCSIS 1.0, ATDMA or DOCSIS 1.0 & ATDMA (same RF frequency and symbol rate).

Each of the four analog front end circuits and digital front end circuits is designed to be capable of receiving channel bursts having a symbol rate of up to 5.12 megasymbols per second (hereafter Msps). However, the maximum aggregated symbol rate which the receiver can support is limited to 5.12 Msps since that is the maximum rate the shared back end circuitry 52 can process at any one time.

In the preferred embodiment, there are four RF inputs 10, 12, 14 and 16 which represent four different HFC systems and four different physical channels. However, in other embodiments, there could be more than four of fewer than four so long as there are at least two.

A physical channel refers to a wire or HFC RF input. Each physical channel can carry a mix of "channels" or "sub-channels". Sub-channels have overlapping bandwidth and may or may not have the same center frequencies. Sub-channels are multiplexed in time so bursts on different sub-channels never opelap in time. Channels have no overlap in bandwidth and always have different center frequencies. Because there is no overlap in bandwidth, there can be overlap in time. However, the circuitry on each RF input can receive only one burst at at time although the circuitry coupled to different RF inputs can simultaneously receive bursts. The data from the bursts simultaneously received in different front end circuits is stored in the buffers of those circuits such as buffers 44 and 46. This allows the data to be fed, one buffer at a time, to the shared back end circuit 52. Each front end buffer operates as a FIFO.

Each front end circuit coupled to an RF input may receive mixed mode signals with two or more sub-channels. A "channel" or a "sub-channel" is an RF carrier modulated with bursts of digital data of the advanced PHY TDMA or SCDMA multiplexing types or DOCSIS 1.0 or 1.1 bursts. Symbol rates can be different on different channels and on different sub-channels modulated on the same carrier.

FIG. 3A is an illustration of four sub-channels with overlapping bandwidth, two of which have different center frequencies and two of which have the same center frequency. FIG. 3A illustrates the result of the CMTS using different DOCSIS UCD messages and MAP messages for each of the four sub-channels to implement sharing the same bandwidth between older DOCSIS 1.0 modems and newer advanced PHY DOCSIS modems. Four UCD messages define the characteristics of the four sub-channels. Four MAP messages are used to schedule the four sub-channel bursts so as to prevent collisions.

In FIG. 3A, four different sub-channels are shown at 62, 64, 66 and 68. The frequency dimension is from left to right on the paper, and time is the axis going down into the paper. The sub-channels 62 and 64 are TDMA logical channels assigned to older DOCSIS 1.0 or 1.1 modems which transmit at a lower symbol rate so as to have a bandwidth of only 3.2 MHz. Sub-channel 66 is assigned to advanced PHY SCDMA modems which transmit at a higher symbol rate so as to have a bandwidth of 6.4 MHz. Sub-channel 68 is assigned to advanced PHY modems which are configured to transmit TDMA bursts at a faster symbol rate which causes the channel to have a 6.4 MHz bandwidth.

So as to maximize the use of the existing available bandwidth for upstream digital data transmissions while not requiring any new bandwidth to be assigned to the advanced PHY CMs, the CMTS uses the UCD messages to define the symbol rate, center frequency and multiplexing type (among other things) of the four logical channels so that they have overlapping bandwidth. The CMTS media access control process implemented by software 60 in FIG. 1 then generates MAP messages to schedule the timing and length of bursts on each of the four sub-channels so as to prevent collisions between bursts on different channels having overlapping bandwidth. Different channels without overlapping bandwidth may also be defined and controlled in this way. To receive the four sub channels shown in FIG. 3A, one receiver channel could be assigned to receive sub-channels 64, 66 and 68 at the three different times these bursts arrive, and another receiver channel could be assigned to receive sub-channel 62 simultaneously with reception of sub-channel 64.

Each wire or HFC system can carry more-than one channel or sub-channel. And individual RF carriers can carry more than one sub-channel. For example, since sub-channels 66 and 68 have the same center frequency, these two sub-channels can be transmitted on the same carrier during different time intervals. Sub-channels 66 and 68 may also be transmitted on on two different physical HFC systems using two different carriers, both having center frequency $f_c$ in which case there is no need to multiplex sub-channels 66 and 68 in time. If they are on different physical channels and not be separated in time, the bursts of sub-channels 66 and 68 must be processed by different front end circuits since one front end circuit cannot process two bursts which overlap both in time and bandwidth.

The receiver disclosed herein could simultaneously process bursts on channels 62 and 64 transmitted at the same time using different analog and digital front ends. This is because the combined symbol rate does not exceed the maximum back end processing throughput of 5.12 Msps. The back end circuitry 52 would be shared to do this, but since it is piplined, both bursts can be in the pipeline at different stages at the same time.

Since the bandwidth of the two logical channels 66 and 68 overlap, and MAP messages are used to control the time of beginning and durations of SCDMA bursts on logical channel 66 and TDMA bursts on logical channel 68 so there is no overlap in time, the same front end circuitry can process both bursts. In FIG. 3, this use of the MAP messages is illustrated by scheduling SCDMA bursts on logical channel 66 to start at time T2 and end at time T3 and scheduling TDMA bursts on logical channel 68 to start at time T4.

TDMA bursts on logical channels 62 and 64 can overlap in time since these two logical channels have UCD messages which define their symbol rates so as to yield bandwidths of only 32 MHz, and the UCD messages for these two logical channels set center frequencies $f_{c1}$ and $f_{c2}$ so as to be offset in frequency from center frequency $f_c$ such that the bandwidth of logical channels 62 and 64 do not overlap. FIG. 3 shows TDMA bursts on logical channels 62 and 64 overlapping in time with each other but not overlapping in bandwidth and not overlapping in time with bursts on logical channels 66 or 68. Specifically, bursts are occurring on each of logical channels 62 and 64 starting at time T1 and ending just before time T2 when SCDMA bursts on logical channel 66 starts (there is actually a short guard time between bursts). In the preferred embodiment, all four logical channels in FIG. 3 could be received by the one CMTS receiver shown in FIG. 1 even if these four logical channels carried signals from four different HFC networks. Some switching of configuration or operation of various circuits etc. must occur in the digital front end circuitry shown in FIG. 1 to be able to receive all four logical channels in FIG. 3 "simultaneously". That is, one receiver chip can be used to receive all four sub-channels even though the bursts do not, for the most part overlap in time. To allow for the necessary switchover and frequency changes to do this, a short guard-time between different time intervals on different logical channels is used.

There are four digital channel circuits 22, 24, 26 and 28 each of which has a digital sample input coupled to each of the analog front end circuits. Each of the digital front end circuits has a multiplexer of which 30 and 32 are typical. These multiplexers each have four inputs for receiving digital samples. One of these inputs of each multiplexer is coupled to the first analog front end circuit 18. Another of these inputs on each multiplexer is coupled to the second analog front end circuit 20. Likewise, the third and fourth inputs of each multiplexer is coupled to the third and fourth analog front end circuits (not shown). Each of these digital front end circuits do several functions to be described below to down convert the frequency, filter to reduce noise in match filters, perform narrow band excision processes to remove noise, do impulse detection to determine which samples should be ignored, do digital sample processing such as interpolation and decimation and despread the spectrum of any spread spectrum bursts. Each digital front end circuit recovers an entire burst and stores the processed samples of the burst in a FIFO front end buffer of which 44 and 46 are typical. Each FIFO front end buffer can store more than one burst.

An arbiter 48 retrieves the burst samples from the front end FIFO buffers in some order determined by the priority scheme of the arbiter and stores them in a sample buffer in the shared back end circuit 52. In the preferred embodiment, the bursts are retrieved from the FIFO buffers on a first-come, first-served basis based upon the times of notification that the bursts had been stored. Another priority scheme is to retrieve the bursts from the buffers which are closest to overflowing first. Other possible embodiments are: NULL SIDs first with no sample read out; priority based upon the burst IUC number with higher priority IUC bursts serviced first with the MAC process setting a priority table with a priority number from 0 to 15 for each IUC thereby allowing maintenance bursts, etc. to be given highest priority; priority based upon burst size with short bursts such as voice-over-IP or request bursts serviced first with overflow prevention implemented by giving higher priority to bursts that were skipped. In some embodiments, the order in which bursts are read from the buffers by the arbiter 48 is controlled by a controller state machine 50 under control of the MAC process 60. Any arbiter scheme suitable for the SIDs that are being handled by the system will suffice.

Whichever burst is read out by the arbiter is sent for processing to a shared digital back end circuit 52. The back end circuit 52, in the preferred embodiment, is the same burst processing circuitry used in the prior art Jasper 1 receiver and described in U.S. patent application Ser. No. 09/792,815 filed by the assignee of the present invention on Feb. 23, 2001.

In some embodiments, the arbitrator 48 is controlled by the MAC process to give higher priority to various services which cannot tolerate too much latency. The MAC process knows for example when bursts for video teleconferencing, voice-over-IP or video or other services which cannot tolerate latency are arriving and on which HFC system these bursts are arriving. The MAC process knows this since it generates the UCD and MAP messages that tell each service when it can transmit. Using this information, the MAC process writes suitable data into register array 51 to control controller state machine 50 to generate control signals to control the arbitrator 48 such that services with low latency tolerance are serviced with high priority. The details of the arbitrator 48 are not critical to the invention, and any arbitrator from the prior art that can service the multiple digital front end receivers in the manner described herein will suffice to practice the invention.

The controller state machine 50 functions to generate control signals to all circuitry in the analog or digital front end, the arbitrator 48 or the digital back end circuitry that needs to be configured to receive particular burst types. The nature of the configuration control signals for each channel generated by the controller state machine and the timing of these control signals is based upon the data in the UCD messages and MAP messages sent downstream by the transmitter to control the burst which is currently being processed by the digital front end circuit being controlled. The timing of the control signals is controlled by the MAP data and the count in an upstream minislot counter counting the upstream minislot of the HFC system on which the burst being processed was transmitted. There are four upstream minislot counters in embodiments with four digital front end receivers, each counting the upstream minislot count of one HFC system. The media access control chip 56 and/or the microprocessor 58 under control of the MAC software monitors the upstream minislot count for each HFC system and knows from the UCD and MAP messages which type bursts will be arriving at each receiver channel and when. The microprocessor and/or media access control chip then loads the appropriate data into register array 51 at the proper time to cause the controller state machine 50 to generate appropriate control signals to cause each type burst to be properly received. These control signals control and configure the modes of operation of the various circuits in the digital front end and shared back end circuits at the appropriate time to process each particular burst type as it is received. In some embodiments, the burst's UCD data is sent through the shared back end circuit pipeline stages with the samples of the burst to control the circuitry of each stage to receive the burst.

The following parameters can be changed on the fly in each digital front end circuit: symbol rate; RF frequency; and, SCDMA frame size. The new parameters are loaded from the UCD data before the occurrence of switching to a new sub-channel carrying a burst characterized by the new parameters.

Symbol rate switching is accomplished with a dead time smaller than 96 symbols as required by DOCSIS. When the symbol rate changes, the delay through the digital front end circuitry does not change in the preferred embodiment. How this is implemented is discussed elsewhere herein, but preferably is accomplished by shifting the minislot clock signal for the pertinent channel by the known amount of the delay change in the various circuits such as the variable decimator 86 and interpolator when switching between symbol rates. The gain in the digital front end circuitry also adjusts as necessary without intevention by the controller state machine 50 or MAC software 60.

The DDFS local oscillator 78 in FIG. 4 implements the frequency change on the fly to generate a new local oscillator signal on bus 80 to cause mixer 74 to mix the new sub-channel down to baseband. The MAC software 60 will convert the RF frequency defined in the UCD data to a phase step appropriate to control the DDFS to generate the proper local oscillator frequency. The MAC process 60 then loads the appropriate data into the register array 51 to cause the controller state machine to generate the proper control signal on bus 82 in FIG. 4 to control the DDFS. This all happens within 96 symbol times plus 100 msec to comply with DOCSIS 1.1 requirements for the CM.

The back end circuit 52 does the following functions: start of burst detection to measure timing offsets; carrier recovery; processing of the preamble of each burst to measure a timing offset and develop equalization coefficients and develop phase and amplitude error correction factors; de-interleaving and descrambling of the data of each burst if necessary; differential decoding and decoding of trellis code modulated burst data if differential decoding or TCM is turned on; reassembly of the Reed-Solomon groups; de-interleaving and error correction of the Reed Solomon groups; and, output of the recovered data of each burst along with equalization coefficients, timing offset measurements and any other measurements made. The data and measurements are output on line 54 to a media access control circuit 56. The media access control circuit 56 passes the recovered data and measurements to a media access control process executing in microprocessor 58. This media access control process is controlled by media access control process software 60 stored in memory which is external or internal to microprocessor 58.

The media access control process 60 receives upstream bandwidth requests from the CMs on the four HFC systems served and does coordinated bandwidth allocation by generating Upstream Channel Descriptor messages (hereafter UCD messages) and MAP messages to allocate bandwidth to those modems that need it. There is one UCD message for every logical channel and every sub-channel transmitted on a physical channel. The UCD message defines the characteristics of the bursts transmitted on that logical channel. The MAP messages represent bandwidth awards. The MAP messages tell which CMs can transmit and when. These MAP messages assign specific upstream intervals of minislots to specific burst types and service identifiers. The service identifiers or SIDs tell the CMs which CMs can transmit because each CM has one or more unique SIDs assigned to it.

A MAP message is comprised of one or more information elements called IEs. Each IE corresponds to one grant of bandwidth. Each IE contains a service identifier (SID—which identifies the CM which can transmit), an interval usage code (IUC—which defines the burst type) and an offset (which defines the time in minislots offset from a reference when transmission may begin). The SID identifies which service may transmit data during the burst corresponding to the IE, and the SID is used by each CM to determine whether the grant is for it or for some other CM. Each different source of data coupled to a CM has a different SID. The IUC identifies which of the 15 different SCDMA and TDMA burst types at various symbol rates and modulation types that may be transmitted.

The burst length is calculated by subtracting the offset in one IE from the offset in the next IE of the MAP. Each CM must generate each burst at the appropriate time so that the beginning of the burst arrives at the CMTS at the assigned first minislot boundary specified in the MAP message. This is done by keeping an upstream minislot counter in the CM synchronized with an upstream minislot counter in the CMTS.

Channel Parameters, Burst Parameters, User Unique Parameters

Basically, the transmission characteristics of each logical channel, as defined by the corresponding UCD message, are separated into three portions: 1) channel parameters; 2) burst profile attributes, and 3) user unique parameters. In the appended claims, the term "burst parameters" is intended to include all those channel parameters, burst profile attributes and user unique parameters needed by the shared back end demodulator to properly process each burst.

The logical channel parameters include: a) the symbol rate which can be any one of 6 different rates from 160 ksym/sec to 5.12 Msym/sec in octave steps; b) the center frequency; and c) the 1536-bit preamble superstring that is prepended to at least some bursts; and d) the SCDMA channel parameters. These characteristics are shared by all users on a given channel or sub-channel (hereafter logical channel may be used to refer to either channel or sub-channel).

The burst profile transmission characteristics of a logical channel, in the preferred embodiment, include: modulation (QPSK, 64 QAM, 128 QAM etc.), differential encoding on or off; Trellis or TCM encoding on or off; preamble length, preamble value offset; preamble type (QPSK 0 or QPSK 1), RS error correction T value from 0 to 16 where 0 is no FEC bits to 16 for the maximum where the number of codeword parity bytes is 2xT, RS codeword length (fixed or shortened), scrambler seed, max burst length in minislots, guardtime from 5 to 255 symbols for TDMA channels and 1 symbol for SCDMA channels, last codeword length, scrambler on or off, byte interleaver depth, byte interleaver block size, SCDMA spreading on or off, codes per subframe, and SCDMA interleaver step size.

User unique parameters may vary from user to user even when on the same channel and same burst type and include such things as: power level; offset frequency (defines center frequency of channel to transmit on); ranging offset to achieve minislot boundary alignment at CMTS (which also achieves upstream chip clock alignment between the upstream chip clock generated at the CMTS and the chip clock embedded in the received signal at the CMTS receiver—a state which is referred to herein as "phase coherence"), burst length in minislots if variable on the specified channel (changes from burst to burst); and the transmit equalizer coefficients (up to 64 coefficients specified by 4 bytes per coefficient—2 real and 2 complex).

The ranging offset is measured by the digital back end circuitry 52 of the CMTS and is the fine tuning delay correction applied by the CM to the CMTS Upstream Frame Time derived at the CM during the coarse ranging process. It is an advancement equal to roughly the round-trip delay of the CM from the CMTS, and is needed to synchronize upstream transmissions in the TDMA and SCDMA bursts so that frames or spreading intervals of spread spectrum data from different CMs all arrive at the CMTS with their frame boundaries aligned in time so as to minimize intersymbol interference. The CMTS measures the required ranging offset for each CM based on reception of one or more successfully received training bursts, and provides feedback of this offset value to the CM. Training bursts are transmitted by CMs initially upon power up in response to ranging invitation messages from the CMTS and periodically thereafter, also in response to invitations to the CMTS. The MAC process 60 controls the process of sending downstream messages via downstream transmitter 70 telling the CMs when the ranging intervals are in terms of upstream minislot numbers and what each CM's measured ranging offset is for CMs who have successfully completed ranging. Downstream UCD and MAP messages are also composed by the MAC process software and sent downstream by transmitter 70.

A single RF carrier may have two or more sub-channels which are controlled by the MAP messages so as to not overlap in time such as separate TDMA and SCDMA time intervals. The TDMA time intervals are one sub-channel and the characteristics of the bursts transmitted during the TDMA time intervals are defined in one UCD message for that sub-channel. The SCDMA time intervals are a second sub-channel with burst characteristics of which are defined by a second UCD message. Two sub-channels on the same physical channel can both be the same multiplexing type but have different symbol rates.

More Detail About the Structure and Operation of Each Block

The above discussion was an overview of the overall structure. We will now address the individual circuit elements in more detail. Referring to FIG. 4, there is shown a more detailed block diagram of one embodiment of the digital front end receiver. Analog front end circuit 17 is comprised of the circuitry of FIG. 2 or any of the alternative embodiments for that circuit discussed herein. A front end automatic gain control circuit 19 functions to generate a signal on line 21 which controls a variable analog attenuator (not shown in FIG. 2) in series with the A/D converter 38. The function of the analog attenuator is to receive the attenuation control signal on line 21 and impose an amount of attenuation controlled by the signal on line 21 such that the analog signal entering the A/D converter has some nominal power level specified by the cable operator. The nominal power level is set to utilize the full dynamic range of the A/D converter without exceeding its range of linearity. The front end AGC circuit has the structure disclosed in U.S. patent application Ser. No. 09/999,060, filed Nov. 15, 2001, which is hereby incorporated by reference. Basically, it comprises a power measurement circuit to measure the power in the samples on bus 72. The power measurement circuit is coupled to a control word generator and a loop filter. The loop filter is coupled though a mode switch to a control word register. The control word generator is coupled to a sigma-delta modulator to generate an analog control signal on line 21 based upon the value of the control word. An analog filter filters the generated analog signal to smoothen it.

The digital front end circuitry 22 (representing one of four channels in the preferred embodiment) is coupled to receive the output sample stream on bus 72. A multiplexer 30 receives a stream of 12 bit samples from analog front end circuit 18 on bus 72 in one embodiment but bus 72 is actually an odd and even bus in another embodiment. In the pictured embodiment, bus 72 carries a stream of samples of the output of A/D converter 38 in FIG. 2 at a 125 MHz sampling rate. In an alternative embodiment, bus 72 is comprised of two 12-bit parallel buses, each carrying 12-bit samples at a 100 MHz rate to multiplexer 30.

The multiplexer 30 has four such inputs to receive samples from each of the four analog front end circuits. A select control signal on line 75 generated by the controller state machine 50 under control of the MAC process 60 generates the select control signal to control which HFC system is coupled to the digital front end 22. This allows different digital front end circuits to receive different channels from either the same HFC and the same analog front end (via wideband sampling) or from different HFC systems and different analog front end circuits.

A digital mixer 74 mixes the sample stream down to base band on bus 76. A direct digital frequency synthesizer generates a digital local oscillator sample stream on bus 80 for use by the mixer 74 with the frequency of the local oscillator signal controlled by a frequency control signal on bus 82 from the controller state machine 50 in FIG. 1. The frequency control signal is established by the MAC process 60 based upon the center frequency of each sub-channel or channel to be received at any particular time. In other words, in mixed mode when two sub-channel bursts are to be received at two different times with two different center frequencies, the frequency control signal is set first to control the DDFS 78 to generate a proper frequency local oscillator signal to receive the first sub-channel, and then, during the guardtime between sub-channel bursts, the controller state machine generates a new frequency control signal to cause DDFS 78 to generate a proper frequency local oscillator signal to mix the second sub-channel burst down to baseband. Center frequency data for the two sub-channels is obtained from their UCD messages, and the timing as to when the two different sub-channel bursts are expected is obtained from the MAP messages for these two bursts.

An interpolator 81 re-samples at the symbol clock rate the samples on bus 76. The samples on bus 76 were taken at the rate of the constant rate A/D clock 39 in FIG. 2. That rate can be switched to support Euro-DOCSIS. The symbol clock rate of the burst being processed is supplied from a timebase.

A master timestamp count shared by all HFC systems and all digital front end circuits is generated in timebase 55 in FIG. 1, and this timestamp information is used to generate downstream sync and snapshot messages for each HFC system.

The timebase 55 serves to generate timing information needed by various circuits in the CMTS receiver. The timebase 55 has a master timestamp counter, an upstream minislot counter for each HFC system, a frame counter used for SCMDA bursts only and a spreading interval counter used for SCDMA bursts only. In the preferred embodiment, each of the four "channels" (combination of analog front end circuit with a digital front end circuit) has its own timebase such that all the counts are independent except the timestamp count which is common to all four channels. Separate snapshot messages are generated for each HFC system using the common timestamp count shared by all channels. This collection of individual timebases is preferred so that each HFC system can have its own minislot size. Symbol rates for the various types of bursts are fixed by the DOCSIS specifications, but minislot size and the number of SCDMA spreading intervals per frame and the number of codes per minislot are matters of discretion for each HFC system with a few restrictions. The timebase also implements an upstream minislot counter for each HFC system. Each CM on a particular HFC maintains an upstream minislot counter which is synchronized by the snapshot messages to the upstream minislot counter in the timebase in the CMTS assigned to the HFC system of which the CM is a part. The minislot counter in the CMTS for each particular HFC system is used to control timing of processing of bursts from that HFC system. The MAC process assigns CMs on each system to particular minislots on that system when they are authorized to transmit using UCD and MAP messages. The CMTS receiver circuitry then uses the UCD and MAP message data for each burst and the minislot counter for that HFC system to properly configure itself at the right time to process the burst. For example, an SCDMA burst from HFC system 1 may have minislot lengths which are 16 symbol times long and may be assigned to minislots 100 to 150 for that system. The burst may be defined as having TCM turned on, RS codeword length and T values equal to certain values, scrambling turned on with scrambling seed X, etc. The CMTS circuitry knows from the HFC system 1 minislot counter in the timebase when minislot 100 is about to happen on that system. The CMTS circuitry also knows the burst parameters and which CM is sending the burst from the UCD and MAP messages. The controller state machine is then controlled by writing the appropriate data into the register array 51 just before minislot 100 to generate the proper control signals to process that particular burst. For example, frequency control signal for the DDFS 78 will be set to generate the proper frequency, the variable decimator 84 will be informed of the symbol rate of the burst, and the TCD decoder in the back end circuit 52 will be turned on. Likewise, the RS decoding circuitry will be informed what the codeword length and T value are and the descrambling circuitry will be given the scrambler seed that was used to scramble the data. If the spreading codes are not permanently assigned to specific minislot numbers (which they are in the preferred embodiment) but are assigned specifically to each burst, then the proper codes will be supplied to the despreader circuitry to despread the spectrum. Any other control signals to configure the various circuits in the CMTS that process the burst will also be generated.

The timebase also maintains a frame counter and a spreading interval counter for each HFC system to which it is coupled, both of which are used to control timing of processing for SCDMA bursts from the system to which the frame and spreading interval counters pertain. These timebase signals are coupled by connections not shown to all circuits in the CMTS that need them to process particular types of bursts. The snapshot downstream messages include the current timestamp count when the snapshot was taken, the current upstream minislot count, and the current frame count. These snapshot messages are sent downstream to the CMs occasionally on frame boundaries. The snapshot messages allow the CMs to send upstream SCDMA bursts that are properly synchronized and framed after the CM completes the DOCSIS or any other suitable ranging process. The ranging process allows each CM to achieve minislot boundary alignment such that upstream bursts scheduled by MAP messages to be sent during specified minislots arrive at the CMTS aligned with the assigned minislot boundaries. TDMA bursts can be properly synchronized by deriving the minislot count solely from the timestamp messages included within the normal DOCSIS sync messages.

The master symbol clock is recovered in each CM and used to synchronize a local upstream symbol clock in the CM to the master symbol clock in the CMTS. The CMTS therefore uses its own master symbol clock to process bursts in some embodiments but recovers and tracks the symbol clock used by each CM in other embodiments.

Returning to consideration of the interpolator 81, samples on path 76 are at the A/D sample clock rate, but this rate can be switched by the controller state machine for EURO-DOCSIS bursts although the A/D clock rate will not be switched when switching between sub-channels in mixed mode operation or switching to another channel when operating in the U.S. But if an A/D sample rate switch occurs, the interpolator output sample rate might also occur. The function of interpolator 81 is to figure out what the value of the I and Q values are at each symbol time from the incoming symbol stream and generates output samples at a sample rate which is a multiple of the symbol clock rate for the symbol clock of the HFC system from which the burst came. If the sample stream has a sample rate of between 8 to 16 times the DOCSIS 2.0 symbol clock rate of 5.12 MHz, the interpolator will interpolate the sample stream down to 8 times the DOCSIS 2.0 symbol clock rate of 5.12 MHz. Sampling rates that are higher will be interpolated to 16 times the DOCSIS 2.0 symbol clock rate. There is also a bypass mode where the interpolator is not used for sample streams with a sampling rate equal to the ASIC clock rate of 20.48 MHz.

A variable decimator 86 receives the output sample stream from the interpolator 81. In some embodiments, the decimator 86 includes a matched filter. The purpose of the decimator is to filter and decimate the baseband sample stream to reduce the sample rate to 2 samples per symbol based upon the symbol rate of the burst being received. Samples are not thrown away but filtered down to the 2-samples-per-symbol rate. The structure of the variable decimator is an array of half band filters as used in the Jasper I prior art. The number of half band filters used depends upon the symbol rate of the burst being processed. Since the number of decimation stages depends on the signal symbol rate, the controller state machine sends the symbol rate of the burst to be processed to the variable decimator to control how many stages are used. The data rate output by the decimator 86 is 10.24 MHz maximum, but depends upon the sub-channel symbol rate and is adjusted based upon the UCD data for the burst being processed. The variable decimator is designed so that the delay therethrough is the same regardless of symbol rate, so there is no sample loss when switching between different symbol rate sub-channels.

Because symbol rates can change between time intervals for different sub-channels in mixed mode or when a new channel is tuned in multimode, the delay through the variable decimator will change. The delay through the decimator should be the same for all symbol rates to prevent errors because the CMTS is expecting to see a burst at the start of whatever minislot the burst was assigned. If the variable decimator causes an unknown delay, the burst does not arrive in the back end circuit 52 at the start of the assigned minislot, and errors occur in receiving the data. Further, the timing error may cause the CMTS to send a message downstream telling the CM that sent the burst to do its ranging process again when the CM is actually correctly ranged. This causes delay and unnecessary overhead.

There are three possible embodiments that represent solutions to this variable delay caused by the decimator problem. The first embodiment is to use a variable delay element and a conventional decimator. In this embodiment, the controller state machine controls the variable delay element in accordance with the symbol rate of each burst as it is processed such that, regardless of the symbol rate, the delay the burst experiences as it passes through the variable decimator is the same. A variable delay element controlled by the controller state machine should also be used with any other element that causes a variable amount of delay depending upon the symbol rate so as to make the delay the same for all bursts regardless of symbol rates.

In the second embodiment, the variable decimator 86 imposes a different delay for each different symbol rate, and the burden to compensate for the delay is shifted to the CM. This is done by the MAC software in scheduling bursts. The MAC software in this embodiment keeps track of the symbol rate of each burst it schedules. When there is a change in symbol rate between a first burst and a second burst, the MAC software schedules a ranging interval between the first burst and the second burst, and sends a downstream message to the CM that is to send the second burst telling it to perform a ranging algorithm again. This compensates for the changed delay in the decimator, because a start of burst detector which detects when the ranging burst arrives is located in the back end circuitry 52 and is located after the decimator. Therefore, the timing measurement will compensate for the new delay in the decimator and the downstream message with the timing measurement will cause the CM to alter its burst transmission time to compensate for the changed delay of the decimator.

The third embodiment is the preferred one, and involves shifting the timebase minislot clock in the CMTS corresponding to the HFC system from which a burst with a different symbol rate is scheduled so as to compensate for the known delay imposed by the decimator for that symbol rate. The delay in the decimator for each symbol rate is known, so fixed adjustments to the timebase minislot counter can be made by switching fixed delays in or out depending upon the symbol rate of the burst to be processed. The preferred way of shifting the timebase minislot or symbol clock count is to add or subtract an appropriate number from the timestamp count used by the timebase for the HFC from which the burst originated. This timebase shifting is easiest because it eliminates the need for as many gates as the first alternative and eliminates the overhead and delays of the ranging process.

The variable decimator can have the same structure as the variable decimator in the Jasper I prior art receiver. In the preferred embodiment however, IIR halfband filters are used instead of FIR filters with coefficients selected to minimize the gate count.

To eliminate complication of the back end circuitry 52 in FIG. 1 caused by unknown delays in the arbiter 48 and dependencies of processing in the back end circuit on the various minislot counts in the various HFC systems, these dependencies are eliminated. One of the most significant dependencies in the back end circuitry between processing of a burst and the minislot counter value for whatever HFC the burst came from would be in the automatic gain control (rotational amplifier) circuitry at 89 in FIG. 6. To understand this, refer to FIG. 6.

Figure 6:
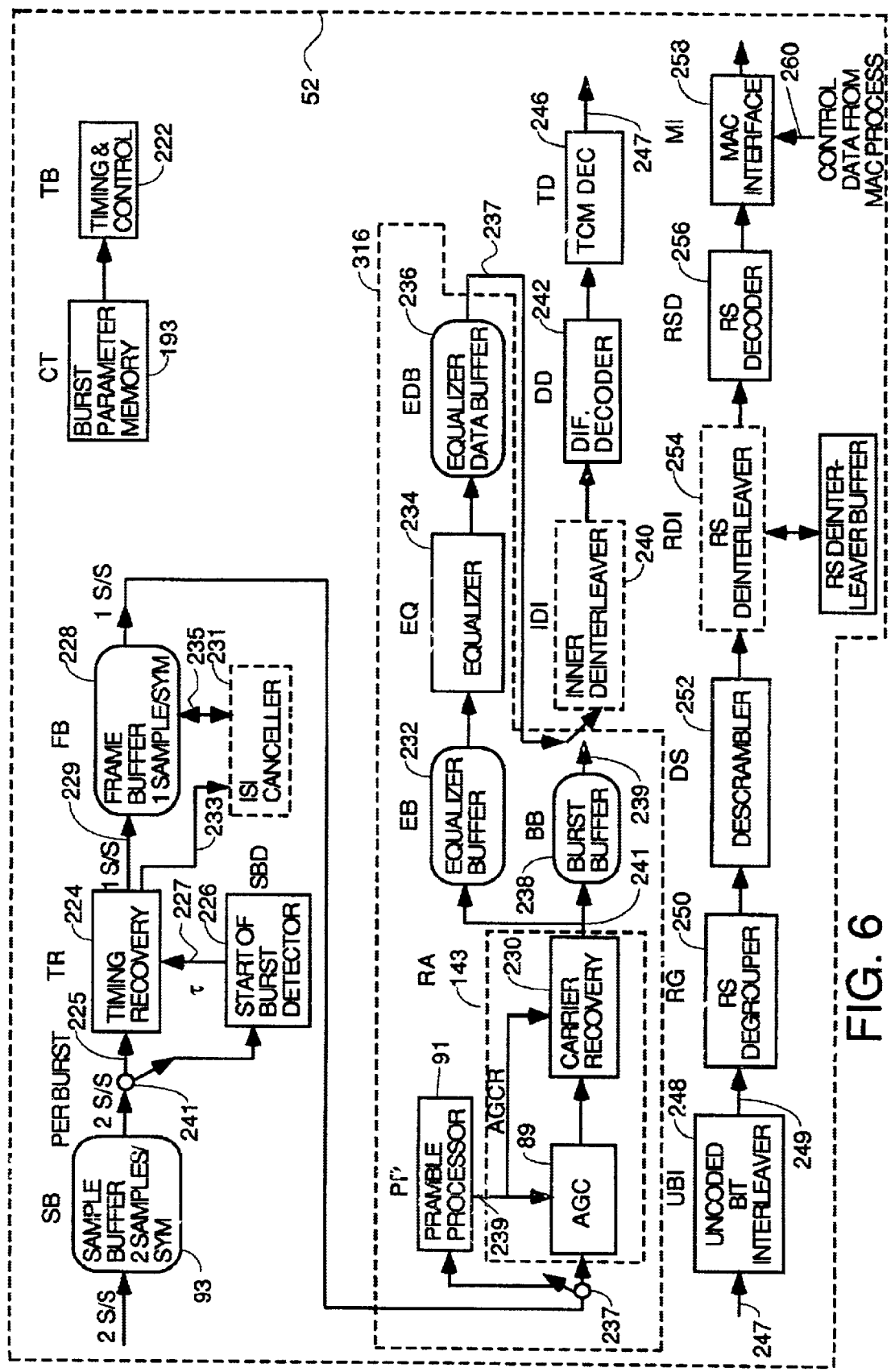
FIG. 6 is a block diagram of the remainder of the back end burst processing circuitry 52 in FIG. 1.

FIG. 6 is a block diagram of the back end burst processing circuitry 52 in FIG. 1. The rotational amplifier 143 uses phase and amplitude error correction factors to correct the carrier phase and amplitude errors in constellation points of bursts from each CM caused by different propagation paths between each CM and the CMTS. These phase and amplitude error correction factors are unique for each CM and are developed for each CM by the preamble processor 91 in FIG. 6 when a training burst with known preamble data is transmitted by the CM during training. The error correction factors for each CM are then stored in memory and linked to the CM to which they pertain. The error correction factors for the CM that transmitted each burst must be recalled from memory at the time a burst from that CM is processed. Thus, if a burst from CM 50 of HFC 1 is scheduled for transmission starting at minislot 100 for HFC 1, the arbiter 48 in FIG. 1 would have to keep track of the minislot count for each HFC system and gets bursts from each HFC system to the back end circuitry in time to be processed. The error correction factors for CM 50 would have to be supplied to rotational amplifier 89 by the control circuitry before minislot 100 of HFC 1 started.

One possible embodiment for the back end circuitry 52 is to allow the dependencies to exist and make sure the arbiter gets the burst from each CM to the back end circuit 52 in time so that it may be processed at the time of occurrence in the timebase minislot counter for the HFC from which the burst originated of the minislots to which the burst was assigned. This complicates the arbiter however in that it must know the minislot counts of each HFC system and make sure bursts get to the back end circuit 52 in time to be processed during the scheduled minislots when the correct error correction factors for the CM that transmitted the burst are recalled from memory and.supplied to the rotational amplifier. It also complicates the controller state machine since it has to keep track of the minislot counts for each HFC system and the UCD and MAP data and make sure the proper error correction factors are supplied to the rotational amplifier at the right time. Although complicated, it is one embodiment.

A simpler embodiment uses the UCD and MAP data for each. burst to determine which CM the burst came from and then recall the proper error correction factors for that CM from memory. These error correction factors are then written, along with the other burst parameters into burst parameter memory 193 in FIG. 6. The burst parameter memory 193 actually represents a prepended portion of the front end buffer 44 (FIG. 4) of the. receiver channel which is processing the burst. The front end buffer stores the burst data and has the burst parameter and error correction factor data added to it to prepend the burst data. The burst parameters and the carrier phase and amplitude error correction factors for each burst are written into this memory 193 before the burst is put into the pipeline of the backend circuit of FIG. 4. These burst parameters travel with the burst along the same data path the burst data travels, and are used to configure the circuits in the back end demoduator 52 pipeline sections as necessary to correctly process the burst. This preferred embodiment is different and simpler than the Jasper I prior art where the burst parameters did not travel along the same path as the burst data. In some embodiments following the Jasper I approache, the burst parameters are supplied in parallel to each circuit in demodulator 52 that needs them as the data for that burst is supplied to the block. In the preferred embodiment, the burst parameters and error correction factors for each burst are like a header that is appended from the burst parameter memory 193 to each burst's block of data. This way, the burst parameters are loaded by each circuit in the pipeline that is to process the burst just in front of the burst data itself. This eliminates separate signal paths for the burst parameter data as this data is transmitted on the same signal path as the burst data itself. It also eliminates the complexity and the need to send the burst parameter data to specific circuits just in time for the circuit to process the burst data thereby simplying the timing and control circuitry 222. Because of this architecture, the error correction factors needed to correct the symbols in the burst arrive at the rotational amplifier 89 as the burst arrives along with the other burst parameter data and are used to process the burst.

The output samples from the variable decimator are processed by a narrow band excision circuit 88 which functions to eliminate or minimize interference caused narrow band interference sources using tunable, digital notch filters. The narrow band excision (NBX) circuit can have the structure disclosed in U.S. patent application Ser. No. 09/152,645, filed Sep. 14, 1998, which is hereby incorporated by reference. Alternatively, the narrow band excision circuit consists of a plurality of programmable notch filters, one for each sub-channel in mixed mode operation. Either two separate filters may be used, each with programmable parameters such as filter coefficients, or a single filter with programmable parameters may be used. A single control circuit (not shown) controls all the narrow band excision circuits in all the digital front end circuits. The control circuit controls the NBX circuit to have multiple modes. There is a bypass mode where data is passed through the NBX circuit without change. There is an unused mode where the NBX circuit is not used. There are also spectrum analyzing, adaptation and filtering modes. The control circuit first does a spectrum analysis wherein it is determined if narrow band interference is present. This can be done in any way including the algorithms disclosed in U.S. patent application Ser. No. 09/152,645, filed Sep. 14, 1998, or any other suitable way to determine interference is present such as by comparing relative signal power in adjacent bins and using a rolling window of bins to scan the band of frequencies of interest. After determining where the interference sources are, the control circuit sets the coefficients of the digital filters to set a "notch" over the interference and goes into an adaptation mode to adapt the coefficients to best suppress each interference source.

In an embodiment with two programmable filters per digital front end circuit, one embodiment for the control circuit does a round robin servicing of each of the eight filters in the four digital front end circuits by supplying the proper parameter data to cause each NBX filter to suppress narrow band interference sources affecting the sub-channel to which the filter is assigned. There are adaptation and spectrum analysis modes which are used to determine if a narrow band interference source is present and adapt to filter coefficients that minimize the effect of the interference. The NBX circuit has five modes of operation: adaptation, spectrum analysis, filtering, bypass and unused. The bypass and unused modes are used when there is no narrow band interference present. The spectrum analysis mode analyzes the spectrum for a narrow band inteference source. Mode switching is implemented using the timestamp counter and an NBX_timestamp_activation register for each filter. The control circuit controls mode switching by placing a timestamp count in the register for the filter whose mode is to be switched. This timestamp count indicates when the mode switch is to occur. The control circuit compares the timestamp count to the value in each register and switches mode when the timestamp count equals the count in the register. This allows the adaptation mode to be turned on and off for a specific window. The spectrum analysis mode takes about 1 millisecond, but it can be shortened by partitioning the scan into smaller frequency intervals and scanning all intervals simultaneously. The NBX filters should be switched into filtering mode only if spectrum analysis indicates significant improvements can be made. The delay of processing the burst in each mode should be the same except for the unused mode so as to prevent a delay change when switching modes. A delay change would cause the ranging delay developed by each CM to keep its transmission synchronized with minislot boundaries to become incorrect when the NBX circuit switched modes.

After applying a new set of NBX filters, the equalizer coefficients of all the cable modems require an update so they are, in some embodiments, ordered by the CMTS to send new training bursts to the CMTS receiver for generation of new equalization coefficients for each CM. This is done because the presence of the NBX filter in the channel alters the channel characteristics, and this alteration needs to be compensated by adjustment of the equalization coefficients. This takes too much time when there are many CMs, so to shorten this process, the MAC layer process, in the preferred embodiment, only orders a few CMs to send training bursts. The equalization coefficients for each of these CMs are generated. Then the average of these equalization coefficients are sent to all the other CMs. These CMs convolve the average equalization coefficients with the existing coefficients and use the results to send their training bursts. This causes convergence at the CMTS on the proper equalization coefficents to occur sooner and speeds up the process.

The NBX filters used for one sub-channel filter can be applied to the NBX filter for another sub-channel when the second sub-channel time interval arrives, but not if the RF frequency or symbol rate changed between channels.

Each digital front end receiver stores its sample data in a portion of a buffer dedicated to storing just the data of that particular receiver. In FIG. 4, that portion of the front end buffer is indicated at 44. Each buffer acts as a FIFO and, as soon as the data from an entire burst is stored, a notification is sent to the arbiter 48 in FIG. 1 that a burst is ready. Data is output from the front end buffer at 10.24 MHz minimum. The FIFO size of each buffer is programmable in the preferred embodiment, but fixed in other embodiments. The MAC software determines the size of the FIFO by determining the symbol rate of each channel or sub-channel being received and how many total sub-channels or channels are being received by the four digital front end receivers as compared to the total memory available. If less than four channels are being received, the allocated memory per channel is increased.

The maximum write rate for a four digital front end embodiment each of which can receive two subbands of DOCSIS 2.0 bursts is 4*2*5.12 MHz or 40.96 MHz because the four digital front ends all write independently into the buffer at 2*5.12 MHz apiece. The read rate is 2*5.12 MHz to match the processing rate of the back end receiver 52. The front end buffer should be as big as possible to handle multiple simultaneous bursts. The burst sizes depend upon the burst parameters. The maximum length burst is QPSK modulation, TCM enabled, RS active with (k,t)=(16,16). The RS encoding with these parameters thriples the burst size to 44,756 symbols. This is for a packet of 32 preamble symbols+1518*8 bits/(1 bit/symbol)*3+100 symbols+ 2*32*128=44,756 symbols. One hundred symbols are added to account for zero padding and header, and two frames of 32*128 symbols are added to handle the case where the burst starts at the last minislot of a frame and ends at the first minislot of a frame. Assuming two long bursts have to be stored per digital front end, that amounts to 89,512 symbols at 32 bits per symbol and 4 channels. With 32 bits per symbol and 4 digital front ends, the total memory size needed is 358,048*32 bits or about 512K×32 bits.

That is a pretty big memory, so an external memory management chip of conventional design is used. If memory overflow occurs, one or two bursts will be lost and an interrupt will be set for the channel which overflowed. This will cause the MAC software to send a message to the CM(s) whose bursts were lost telling them to re-transmit.

To save memory and gate count, the sample buffer 93 in FIG. 6 is eliminated and the front end buffer is used instead.

Figure 5:
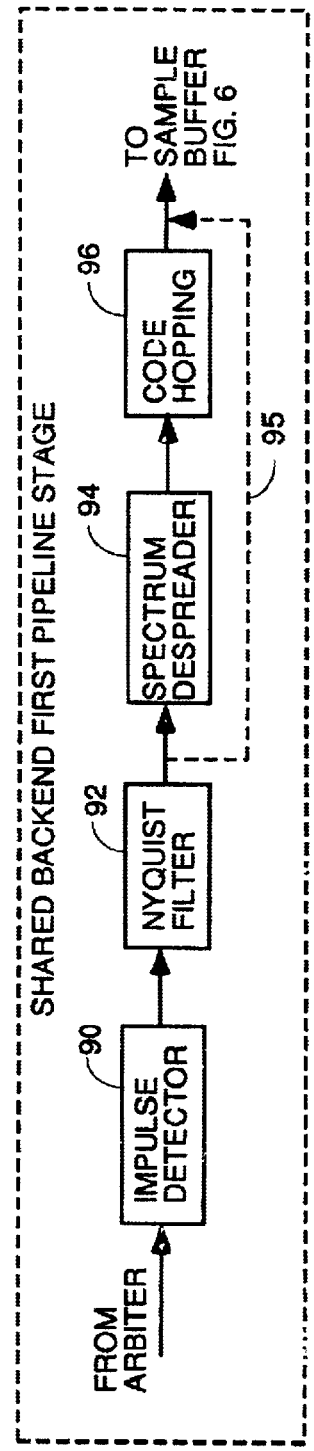
FIG. 5 is a more detailed block diagram of the initial circuitry in the back end burst processing circuit 52 in FIG. 1.

Referring to FIG. 5, there is shown a more detailed block diagram of the first pipeline stage of the shared circuits in the back end circuitry 52 in one embodiment. In the embodiment shown in FIG. 5, the impulse detector 90 is located in the shared back end circuit 52 and the narrow band excision circuit 88 is located in the digital front end receiver circuit of each channel. In other embodiments, the inpulse detector 90 and narrow band excision circuit 88 are both located in the digital front end circuit 52 along with the Nyquist matched filter 92, spectrum despreader 94 and code hopping circuit 96.

The filtered output of the NBX circuit stored in the front end buffer, when selected by the arbiter for application to the back end circuit is first processed by an impulse detector circuit (IMD) 90. The function of the impulse detector is to detect impulse noise in the received burst and add erasure indications to samples that may have been corrupted by impulse noise. The preferred location of the IMD circuit is after the NBX circuit so that any impulse noise that was lengthened will be detected in its full length. The impulse detector is also located after the matched filtering process carried out in the decimator 86 in the embodiment shown. Impulse detection is carried out at baseband with two samples per symbol. The IMD circuit detects the presence of high power signals above the expected level, and adds an erasure indication to the corrupted samples. Placing the IMD after the matched filter eliminates the need that existed in the Jasper I prior art to deal with erasure indications.

A Nyquist matched filter 92 processes the filtered output of the impulse detector to increase the signal-to-noise ratio of the signal.

A spectrum despreader 94 is used to despread the spectrum of any spread spectrum bursts, and is bypassed for TDMA bursts, as represented by dashed data path 95. The spectrum despreader does spectrum despreading of each SCDMA burst by matrix multiplication of the received spread spectrum constellation points times an inverse of the spreading code matrix used at the CM to spread the spectrum of the burst. The MAP messages define which minislots will carry SCDMA bursts. In SCDMA regions within the MAP, data from multiple different services each of which has its spectrum spread by one or more different spreading codes may be transmitted simultaneously. There are a set of rules to map minislots to codes. Both the CMTS receiver of FIG. 1 and the CM transmitters use the same rules, and each has an upstream minislot counter which are kept synchronized by the ranging process. Therefore, based upon the local upstream minislot count of the CM to transmit an SCDMA burst, the CM transmitter uses whatever spreading codes that are mapped to the minislots identified in the MAP message that authorized the SCDMA burst to spread the spectrum of the data of the burst. The CMTS receiver despreader 94 then uses the same codes to despread the data based upon the upstream minislot count in the CMTS local upstream minislot counter in timing and control circuit 222 and the UCD and MAP data identifying when SCDMA bursts are arriving.

Figure 8:
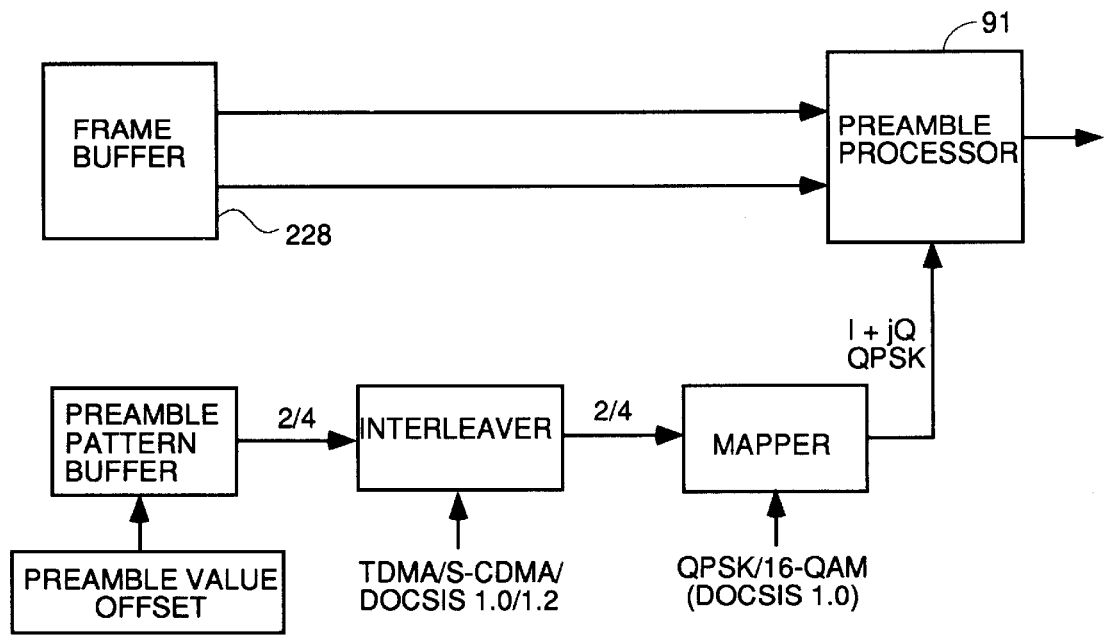
FIG. 8 is a more detailed block diagram of the connection to the preamble processor 91 in FIG. 6.

A diagram of the mapping of minislots to codes is shown in FIG. 8. In FIG. 8, the data from one particular SID would be transmitted by one CM during minislot m using spreading codes 0 and 1, and data from a different SID would be transmitted simultaneously during the the same time interval but using codes 2 and 3 which are mapped to minislot m+1.

Synchronization of CM Minislot and Frame Counters to CMTS

Figure 10:
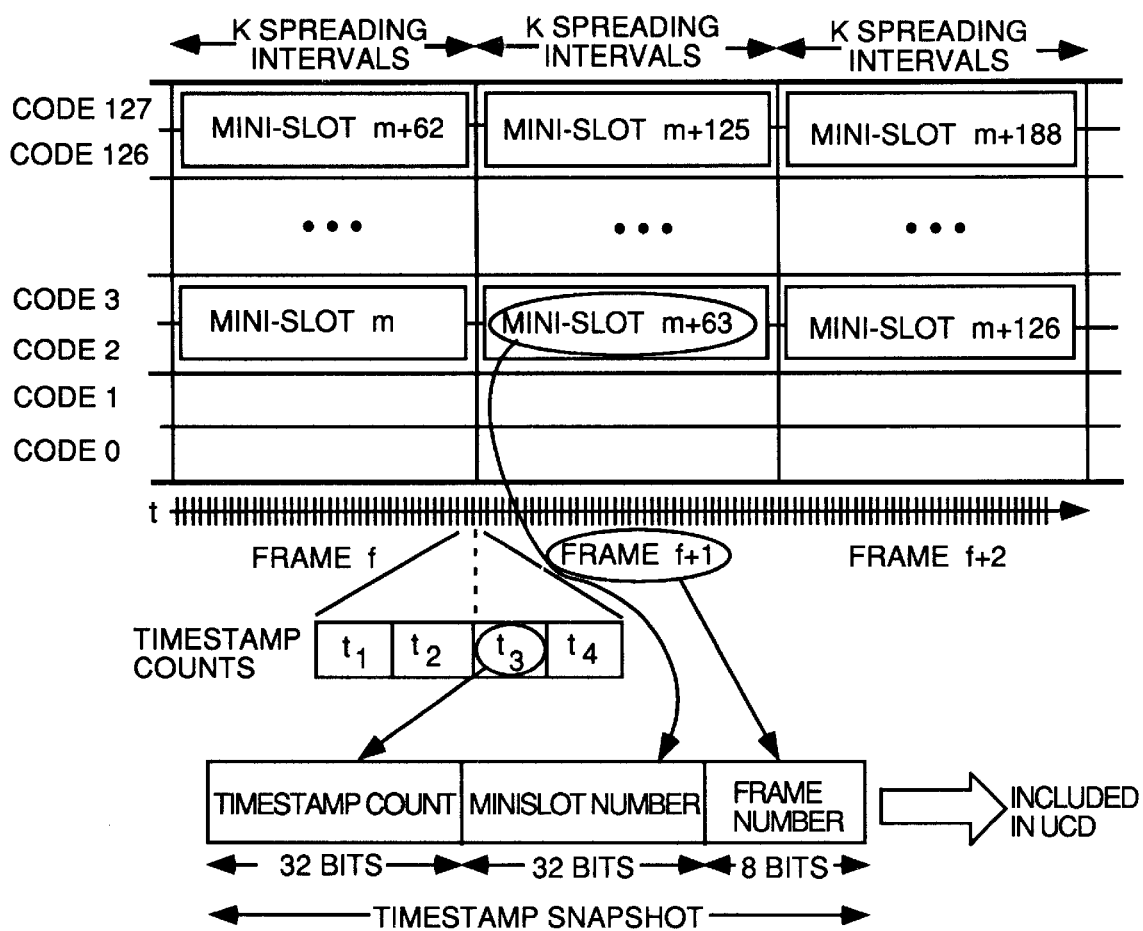
FIG. 10 is a diagram of how the timestamp snapshot is composed from the timestamp counter count on a minislot boundary, the frame number and the minislot number for inclusion in the UCD message to keep the CMs frame synchronized.

The despreader knows which codes to use to despread SCDMA bursts because the CMs and CMTS use the same system to map minislots to spreading codes. Thus, the minislots identified in the MAP messages for a burst define which codes will be used to spread and despread it. Each CM must maintain a set of counters functionally identical to the CMTS frame and minislot counters for the HFC system on which the CM resides. The CMTS frame and minislot counters are maintained in a timebase 55. The CMTS sends snapshot messages to the CMs on each HFC system periodically to assist them in keeping their counters synchronized with the corresponding counters in the CMTS. FIG. 10 shows how the timestamp snapshot is composed from the timestamp counter count on a minislot boundary, the frame number and the minislot number for inclusion in a UCD message to keep the CMs frame synchronized properly.

Using this timestamp snapshot and parameters in the UCD message, each CM can calculate the number of time counts per SCDMA frame for the frame and minislot size on the HFC system to which the CM is connected. The CMTS MAC process 60 sends a separate timestamp snapshot for each HFC system since each HFC system may have a different minislot and frame size. The timestamp count is common to all HFC systems. Using modulo arithmetic, each CM can then calculate accurate values for its timestamp, minislot and frame counters at any point in the future. The CM can then arrange to to update its local minislot and frame counters at an appropriate timestamp counter value. At this point, the CM and CMTS representations of minislots and frames are aligned.

The CM and CMTS, in the preferred embodiment, must each implement a 32-bit timestamp counter, a 32-bit minislot counter and an 8-bit frame counter in the following way. The minislot counter must contain the value of the first minislot in the frame when it is sampled. It may be incremented by the number of minislots in the frame once per frame interval. The only specified function for the frame counter in the preferred embodiment is to reset the code hopping sequence at frame 0.

Figure 9:
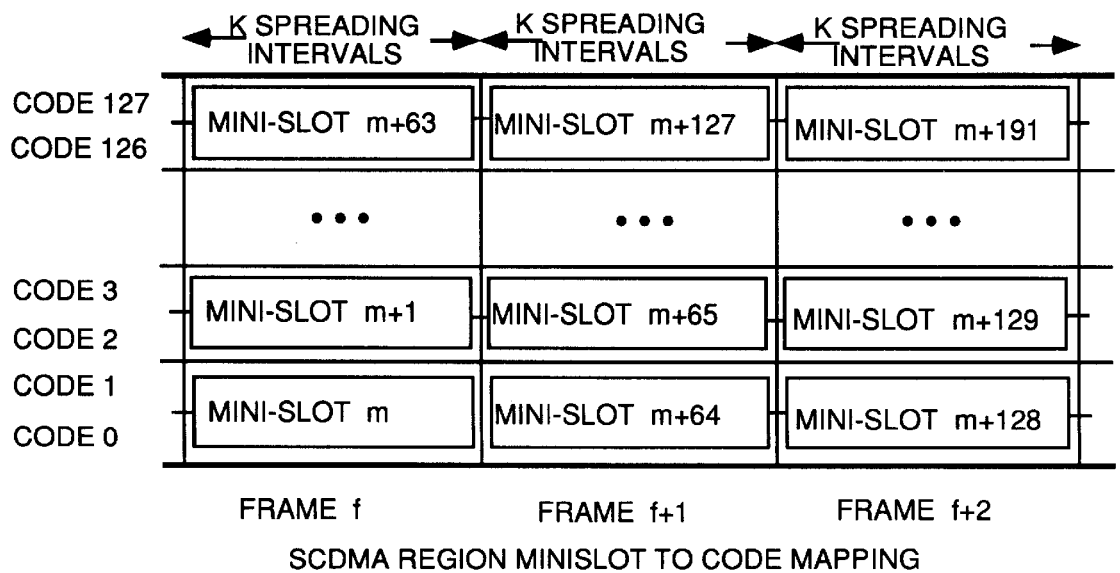
FIG. 9 is a diagram of the mapping of minislots to spreading codes.

The frame structure and mapping described herein applies to each entire upstream HFC system (each HFC system has its own frame structure and mapping) and not to just one CM. The assignment of codes is done by the framer in each CM in accordance with instructions in the UCD and MAP messages. Assignment of codes occurs as the framer assigns a burst of symbols to a particular order in the 2-D matrix of codes and time shown in FIG. 9. FIG. 9 shows how spreading codes are mapped to minislots, spreading intervals and frames.

The UCD message transmitted by the CMTS specifies three parameters that control the mapping: spreading intervals per frame, codes per minislot and number of active codes. The number of spreading intervals along with the signaling rate define the time duration of the SCDMA frame. The codes per minislot in conjunction with the spreading intervals per frame define the total number of symbols per minislot. The number of active codes allows the number of codes used to carry the data to be less than or equal to 128.

Programmability of the number of active codes to less than 128 plus programmability of the power per code for the remaining codes allows reliable operation in extremely noisy cable plants. For example reduction from 128 to 32 codes provides a 6 dB increase in SNR.

All the minislots in one SCDMA frame are transmitted simultaneously either from a single CM or from multiple CMs, as defined in the bandwidth allocation MAP message and the minislot mapping parameters in the UCD. One CM may not have more than one active burst in a single SCDMA frame. SCDMA frame timing is derived directly in the CMs from the CMTS master clock at 10.24 MHz. Selecting the number of spreading intervals and the signaling rate therefore defines the frame duration. Thus, frame duration can change for every burst based upon the UCD parameters. Thus, the term "frame synchronization" means that the CM and CMTS counters are in synchronization with the proper offset and are processing SCDMA frames using the same UCD parameters and the same MAP message and the CM has its ranging offset set such that when it transmits a burst scheduled for one or more specified minislots, the burst will arrive during those minislots as measured by the count of the CMTS minislot counter corresponding to the HFC system on which the CM resides.

In the preferred embodiment, the CMTS must create MAP messages such that the first minislot in the MAP aligns with the start of an SCDMA frame. In other words, the group of minislots allocated in a single MAP must exactly span an integral number of SCDMA frames.

The advanced PHY TDMA Initial Maintenance ranging/training burst and SCDMA Initial Station Maintenance ranging/training burst types are specified in the preferred embodiment by UCD and MAP messages to be TDMA bursts. The SCDMA channel is programmed by the UCD message for c codes per minislot, p number of active codes, k spreading intervals per SCDMA frame, and a resultant s minislots per frame where s=p/c.

Then each SCDMA frame, where TDMA transmission is to occur for ranging, will contain exactly s minislots where each minislot contains c*k symbols.

If a burst spans multiple frames, the burst will start at the beginning of the first frame and continue without interruption into the next frame.

TDMA bursts on SCDMA channels are defined with a guardtime of 1, i.e., no guardtime, and all TDMA bursts are padded with zeroes from the end of the RS encoded data until the end of the grant. Differential encoding and RS byte interleaving is not used with TDMA burst on SCDMA channels in the preferred embodiment, but may be used in alternative embodiments. The CMTS scheduler (implemented by MAC layer process 60) insures in the preferred embodiment that the TDMA ranging burst interval is aligned to the start of an SCDMA frame, occurs completely within one or more SCDMA frames and ensures that no SCDMA bursts are scheduled during these same frames. The scheduler is allowed to grant at most one TDMA burst per CM per frame.

Consecutive minislots are numbered vertically over codes. Thus, the bits to be transmitted during a burst are, after Trellis encoding, etc., mapped into a number of constellation points and the number of constellation points that can fit into the the assigned number of minislots are picked. This defines the number of payload bits that can be transmitted during that burst. The rest of the bits are buffered for another burst in some embodiments. In other embodiments, the upstream bandwidth request will indicate how much data exists to be sent, and the MAP message will assign the number of minislots needed to send that amount of data. If the 64 minislots in a frame are assigned to different cable modems, up to 64 cable modems can transmit on the same frequency simultaneously without interference using different spreading codes mapped to those 64 minislots.

The despreader 94 receives the samples output by the decimation circuit 86 (after NBX and IMD filtering in some embodiments) only when the receiver is receiving an SCDMA burst. The samples for the entire frame of data spread by all 128 codes are received and stored in a buffer (not shown) in the despreader. The mapping between frames, minislots and codes in an SCDMA region of a MAP is shown in FIG. 9. The grants or IEs in the MAP assign data from different sources to be transmitted by different cable modems during different minislots. For SCDMA bursts, the CMs connected to these sources map the assigned minislots in the MAP to the appropriate frame and codes. Then, when it is time to transmit that particular frame, data from all the sources defined in the MAP message to be transmitted in SCDMA bursts is all transmitted simultaneously. These transmissions all mix by superposition in the transmission medium and are sampled.

In some embodiments, MAC process 60 in FIG. 1 is programmed to use the MAP grants and the information therein as to which minislots have been assigned to TDMA intervals of the MAP and which have been assigned to SCDMA intervals to control the bypassing of the despreader 94 during TDMA bursts. In other embodiments, the IUC (burst type) data in the MAP is stored in burst parameter memory 193 in FIG. 6 and used by timing and control circuitry 222 or controller state machine 50 in FIG. 1 (timing and control circuit 222 and controller state machine 50 are the same circuit in some embodiments) to control bypassing of the despreader and the code hopping circuit 96 during TDMA intervals as well as controlling the other elements of the demodulator.

The despreader demultiplexes SCDMA bursts by multiplying the received chips defined by the samples output by the matched filter 114 times the inverse of the code matrix used by the cable modem transmitter to spread the spectrum of the burst. The output to the code hopping circuit is a result vector comprised of despread, noise-corrupted received chips with two complex samples per chip.

To keep all the data from the different sources separate even though it was transmitted simultaneously during a particular frame, the despreader, in the preferred embodiment, uses the same sample data in multiple iterations of despreading. Thus, the despreader outputs the data resulting from each despreading operation and corresponding to a different spreading code at a different time. The sample data representing the despread data for each code is then stored in a portion of front end buffer 44 dedicated to storing samples for data spread by that particular code. Thus, the data from all 128 codes is stored in 128 different areas of front end buffer 44.

The over-sampled signal at the despreader output is used in some embodiments to measure the time offset of periodic training bursts and to enable sending of downstream messages to correct the time offset of each burst from each cable modem.

During DOCSIS ranging and while receiving TDMA bursts, the despreader is in bypass mode because training bursts are TDMA even in SCDMA CMs. In bypass mode, the despreader gain is compatible with the spreader gain at the transmitter used in ranging and in transmitting TDMA bursts. The gain in bypass mode is programmable in the preferred embodiment, but is not programmable in other embodiments.

Code Hopping Circuit 96

A code hopping circuit 96 is used to control which spreading codes are used to spread and despread the spectrum of a burst in embodiments where the codes assigned to a burst are not permanently mapped to the minislots in which the burst is sent. SCDMA bursts are transmitted on different spreading codes in the preferred embodiment to spread around the effects of bad codes. Multiple CMs transmit simultaneously on different codes. The code set in the preferred embodiment includes 128 orthogonal cyclic spreading codes, but they are not all equal in their signal to noise ratio, so some codes will suffer from more interference than others. To combat this effect, code hopping is implemented in the hardware of the CM transmitter so that a cable modem is not always transmitting on the same spreading codes. Typically this is done using a seed number and a random number generator which pseudorandomly shifts which codes are multiplied against the information vector data to be transmitted by a CM. Code hopping circuit 96 reverses this pseudorandom hopping during the writing process into the buffer that stores a frame of SCDMA data.

For example, suppose cable modem number 1 has been assigned to code 1 during a particular spreading interval. Now, suppose during the next spreading interval, cable modem 1 is assigned to code 3 because of code hopping. This causes the data not to use the same code many times. This allows the error correction code to combat the noise more easily. The Code Hopping circuit 96 receives information about these code assignments from MAC process which assigned the codes in downstream MAP and UCD messages to the cable modems. The Code Hopping circuit 96 reverses the code hopping by putting the data from the two different elements in the received information vectors into the appropriate memory locations in front end buffer 44 assigned to storing messages from cable modem 1.

A Code Hopping Offset number is obtained for each spreading interval. In the transmitter, when the Number Of Active Codes equals 128 (all the codes are used) code 0 is written into the row address of the Code Hopping Offset, code 1 into the row address Code Hopping Offset+1, etc. When the address is above 127, the storage address is calculated modulo(128), e.g., address 128 is 0. In the CMTS receiver, the opposite operation is done by code hopping circuit 96. That is, the code address at the sample buffer is given by mod(code−Offset). For example, for offset of 58, the received code 0 is written into address of mod(0−58)=−58+128=70, receive code of 59 is written into code address of mod(59−58)=1.

When the Number of Active Codes is less than 128, code 0 is unused and at the transmitter at the address of Code Hopping Offset code 1 is written. For addresses above 127, the corrected address is obtained at the transmitter by modulo(128)+1; namely address 128 is converted to 1. At the receiver, the code address of the sample buffer is calculated by code−offset+1, if modulo operation is required, it's calculated by mod(code−offset). For example, for offset 59, the received code 59 is written into address of (59−59)+1=1, the received code 1 is written into address of mod(1−59)=−58+128=70, the received code 58 is written into address of mod(58−59)=−1+128=127. The received code 0 can be written into address 0 but it is not used.

The blocks that are affected by the code order and code 0 location are the equalizer 234 in FIG. 6 and the optional inter-burst ISI canceller 231. When the Number of Active Codes is 128, the equalizer does not use the code 0 symbols. The Code Hopping Offset for each spreading interval gives the location of code 0 (row number from 0 to 127). There are up to 32 values for each frame. The equalizer also gets the starting row number of the burst, and using this together with the code 0 location, the equalizer can find the location of code 0 in the equalizer buffer 236 in FIG. 6. When the Number of Active Codes is less than 128, each code in the sample buffer is a cyclic shift of the next one including at the address of Code Hopping Offset.

Code hopping is disabled during ranging (TDMA bursts) and TDMA mode.

The code hopping circuit 120 is optional and is not used in some embodiments.

The despread data output by the code hopping circuit is stored with 2 samples per symbol.

Figure 7:
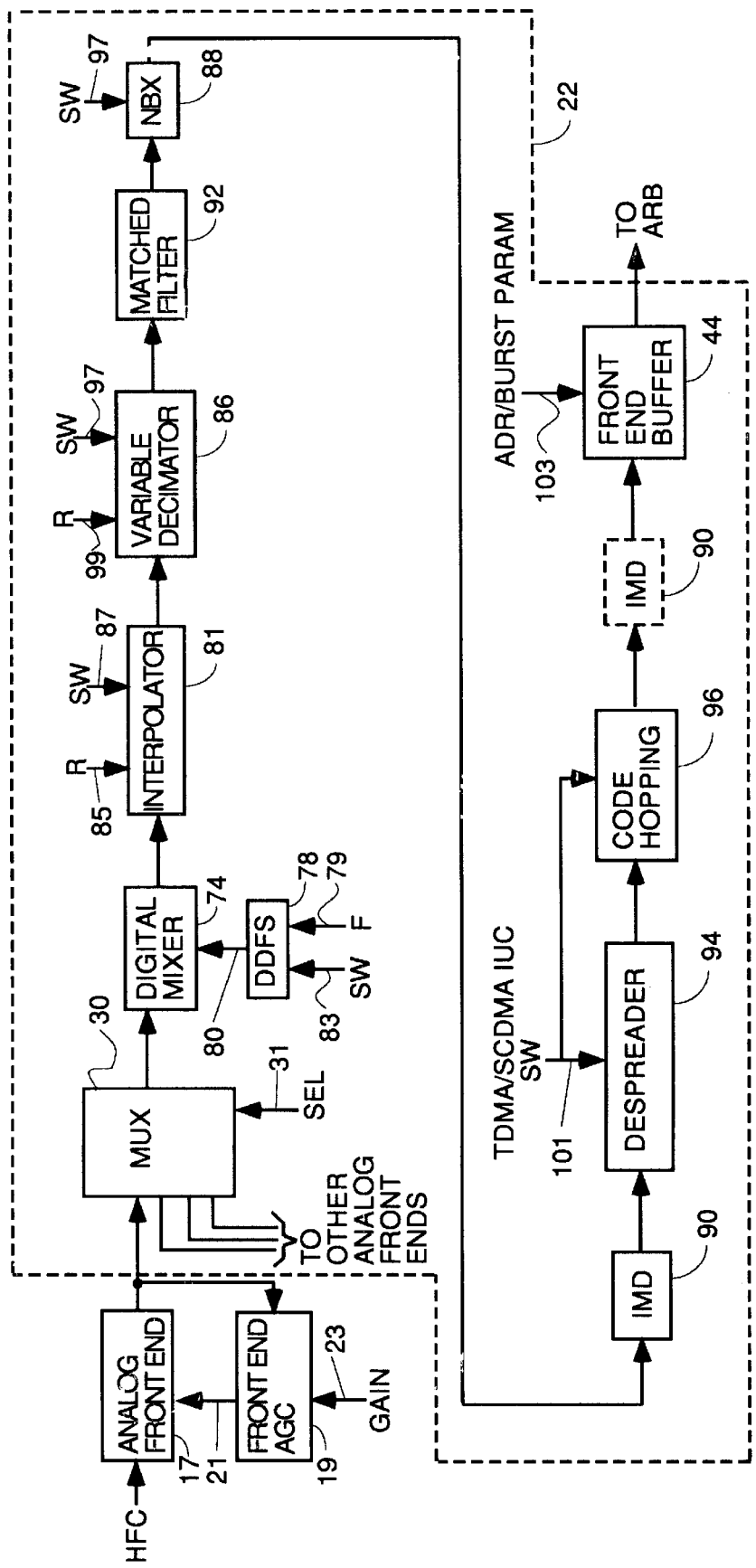
FIG. 7 is a block diagram for the preferred embodiment for a digital front end circuit 22 having an impulse detector, matched filter, despreader and code hopping circuit all included.

FIG. 7 is a block diagram for the preferred embodiment for a digital front end circuit 22 having an impulse detector, matched filter, despreader and code hopping circuit all included. The circuits shown do the same functions as discussed above for their counterparts in other embodiments, so the emphasis here will be on the control signals supplied to the various circuits by the controller state machine. The front end AGC circuit receives a gain control signal on line 23. This signal causes the circuit to generate a signal on bus 21 which controls the amount of attenuation or gain applied by an analog amplifier/attenuator in analog front end 17.

Control over which analog front end signal is selected by multiplexer 30 is implemented via a select signal on line 31.

The DDFS local oscillator receives a frequency control signal F which controls it to generate a digital representation of a carrier at the same frequency as the carrier on which the burst being received was transmitted. This causes mixing down to baseband. Thus, for example, when digital front end circuit 22 is receiving sub-channel 64 in FIG. 3A, the DDFS will be ordered to generate a frequency $f_{c2}$ which is the center frequency of sub-channel 64. During the guardband between sub-channel 64 and sub-channel 66, DDFS78 will be ordered to generate a frequency of $f_c$ which is the center frequency of sub-channel 66. No change would be necessary to receive sub-channel 68 since the center frequency is $f_c$. Typically, the DDFS has one internal frequency control register which stores a control word defining the center frequency of a first sub-channel to be received and a second control register which stores a control word defining the center frequency of a second sub-channel to be received. These registers are loaded with control words supplied on bus 79. A switch signal on line 83 causes the DDFS to switch from one control word register to another for rapid switching of the output frequency on bus 80.

The interpolator 81 also is capable of switching between different subchannels at different symbol rates rapidly. The interpolator re-samples the sample stream at the symbol clock rate of the burst being processed. The symbol rate of the burst to be processed is supplied from the UCD data via bus 85. To be able to switch symbol rates fast, the interpolator has at least two registers that store sample rate data therein, and each is loaded via bus 85. During the guardtime between a burst of a first subchannel at a first sample rate and a burst of a second subchannel at a second sample rate, a switch control signal on line 87 controls the interpolator to switch from having its resampling rate controlled by the data in the first control register to control by the data in the second control register.

The variable decimator 86 functions to decimate the baseband sample stream to reduce the sample rate to 2 samples per symbol. As such, it needs to know the sample rate of the burst it is processing. This information is supplied by bus 99. Since several subchannel bursts with different sample rates may be processed in quick succession, variable decimator 86 has a plurality of registers which store sample rates supplied on bus 99 of the various bursts to be processed. A switch control signal on line 97 controls when the decimator switches from decimating at one symbol rate to decimating at another symbol rate.

In the embodiment of FIG. 7, the matched filter 92 is a conventional square root raised cosine digital filter with its coefficients set to match the Fourier spectrum of the signal so as to raise the SNR of the signal. It is placed right after the variable decimator as opposed to after the impulse detector in the embodiment of FIG. 5.

The functioning of the narrow band excision circuit 88 does not depend upon the symbol rate of the burst, but it is desirable to turn the narrow band excision circuit on or off. Thus, a control signal is provided on line 97 that allows the narrow band excision circuit to be turned on or off as desired.

The impulse detector 90 functions to detect impulse noise and mark affected samples with an indication that the sample may be corrupted by impulse noise. This allows the error correction circuitry to do a better job in detecting and correcting errors and allows the other circuitry in the back end receiver such as the timing recovery loops and other loops to protect themselves from, usually by ignoring samples marked with the erasure bit indicating impulse noise was present when the sample was taken. The impulse detector can be the same structure as used in the Jasper I prior art or it can use the unused codes of SCDMA bursts. In the prior art version used in Jasper I, the IMD is located in front of the despreader but after the matched filter 92, and has a detector which opens a window in time and determines the amount of noise power in that window. Basically, the detector looks for a high power signal in the window which is substantially above the expected power level, and if one or more such signals are found, it assumes that all samples taken during that window may be splattered with noise power from the impulse. If the noise power indicates that impulse noise is present, samples that are possibly corrupted by noise taken during that window are marked with an erasure bit. By locating the IMD after the matched filter, any narrow band impulse noise located on adjacent channels is filtered out before it reaches the despreader 94. This location after the matched filter is desirable for both the prior art version of the IMD and new unused code version. Because the NBX circuit 88 is located before the IMD circuit in either embodiment, the NBX circuitry does not have to be able to deal with the erasure indications.

The preferred form of the impulse detector has a detector which uses the unused spreading codes and NULL SIDs in SCDMA bursts to determine if impulse noise exists since any power found in unused codes obviously arose from noise. In an embodiment that uses this type impulse detector, the impulse detector is located after the despreader circuit so that the power in unused codes can be determined. This embodiment is represented by the IMD circuit shown in dashed lines following the code hopping circuit 96. The detector circuit determines if the amount of signal power in the unused codes is above a threshold level. If it is, then an erasure signal is written into the symbol data received on all the codes that were used during the duration of the time the excess power is found in the unused codes. The erasure signal takes the form of an erasure bit which is set to a predefined state in the samples that carry used code data. The IMD circuit 90 processes all the bursts in a frame and is not burst based. The impulse noise hystogram resolution is a spreading interval and is based on spreading interval length bursts. There are counters which count the impulse noise length in terms of 1, 2, 3 or 4 spreading intervals, and there is a global counter that counts all the spreading intervals. In alternative embodiments, the impulse detector can be located after the sample buffer 93 in FIG. 6.

The preferred location for the IMD is after the NBX circuit so that any impulse noise which has been lengthened by the filtering in the NBX circuit will be detected in its full length.

The despreader circuit 94 receives one sample per symbol coming in from the IMD in the preferred embodiment, and it receives a TDMA/SCDMA IUC code on bus 101 from the control circuitry that tells the despreader whether the samples are for a TDMA or SCDMA burst. Because training has occurred at the CMs before the SCDMA bursts are sent, the symbols sent in each SCDMA burst arrive properly aligned with the symbol times and minislot boundaries assigned by the CMTS MAC process. Actually, the training bursts are TDMA and result in a calculation in each CM as to the proper timing to use to transmit so that TDMA bursts assigned to certain minislots arrive at the CMTS aligned in time with those minislots. This same timing is then used to transmit SCDMA bursts from that CM. Thus the despreader can build a vector of received symbols and matrix multiply that vector times the inverse code matrix to despread the spectrum. The control data on bus 101 also is received by the code hopping circuit 96. If the control data indicates the sample data is for a TDMA burst, then both the despreader and code hopping circuit pass the sample data through unchanged in bypass mode. If the sample data is for a spread spectrum burst, the despreader does a matrix muliplication of the received I and Q constellation point elements during each spreading interval times the inverse of the code matrix used to spread the spectrum of the data at the CM which transmitted the burst. The IUC data on bus 101 can indicate that SCDMA bursts at several different symbol rates on several different subchannels will be arriving from a single HFC system. Separate registers in the despreader store this data. A switch signal also on data path 101 or on a separate data path tells the despreader when to switch between the different symbol rate SCDMA bursts.

The IUC data also tells the despreader what the symbol rate is so that it despreads the spectrum at the proper symbol rate.

In alternative embodiments, the despreader works on two samples per symbol so that a training mode in DOCSIS 2.0 SCDMA transmissions can be used. The two samples per symbol input data can be advantageously used to make timing adjustments because the timing offset will be output by the despreader in the sense that data that was supposed to come out on one code will come out on another code. This tells the timing offset because the spreading codes are cyclic codes which are cyclically, sequentially generated at a rate of one new code each symbol time. The timing offset derived by examination of the output of the despreader on various codes versus which codes the data was supposed to come out on can be sent down by the MAC process to the CM that sent the burst to adjust its timing. Alternatively, the CMTS can adjust the timing and still decode the data without forcing the CM to adjust its timing.

The IUC data on bus 101 also tells whether code hopping for a channel is turned on or turned off and this causes the code hopping circuit 96 to undo the effects of code hopping if it is turned on.

The front end buffer 44 receives address data and burst parameter data on data path 103 from the control circuitry. The address data controls where the burst data is stored in buffer 44, and the burst parameter data includes the data needed by the arbiter (such as the priority of the burst indicated by its IUC) and other data that needs to travel along with the burst through the back end circuitry 52 to control the circuitry there to properly receive the burst.

Shared Back End Circuit 52

Referring to FIG. 6, there is shown a block diagram of the back end demodulator circuitry 52 (hereafter referred to as the demodulator) which is shared by all the front end receivers. The back end circuitry has the same structure and operation as the circuitry of the Jasper I prior art CMTS receiver. The maximum throughput of the back end circuitry is 5.12 Msps. This demodulator 52 does the detection of the transmitted constellation points and all the other processing necessary to receive whatever modulation, multiplexing, symbol rate, forward error correction encoding and deal with whatever other variable that are employed by the transmitted burst per the UCD message. Each burst type is received differently, and the demodulator adapts its circuitry each time a new burst is received in accordance with the burst parameters identified by the IUC of burst to be received. The control circuitry, comprised of MAC process software 27, microprocessor 58, MAC chip 56, register array 51 and controller state machine 50 tells the demodulator which type of burst is going to be received and when it will be received. This is done by controlling the arbiter 48 in FIG. 1 to select a burst from one of the front end buffers and sending control signals to retrieve the burst parameter data for that burst from the front end buffer in which the selected burst data was stored and load these burst parameters into burst parameter memory 95. A timing and control circuit 222 uses those burst parameters to generate and send suitable control signals out to each circuit in demodulator 52 that needs to be configured to receive a particular burst type before the data of that burst arrives.

Timing and Control Circuit 222

The timing and control circuit 222 includes the portion of the timebase 55 in FIG. 1 which keeps the upstream minislot counter for each of the HFC systems to which the receiver is coupled. Using the appropriate upstream minislot counter for the burst being processed and the MAP message for the burst stored in burst parameter memory 193, the control circuit 222, in some embodiments, retrieves the appropriate burst parameters from burst memory 193 and distributes them to the various sections of the pipelined demodulator. In the preferred embodiment, the burst parameter data is prepended to the burst data in the front end buffer and travels to each pipeline stage in the demodulator with the burst data. In an alternative embodiment, as the minislot where each burst starts comes up, the burst parameters for that burst are extracted from the burst parameter memory 193 and input to the input section of the pipelined demodulator 52 along a different path than the burst data travels along with the burst data itself. The burst parameters then travel to each section of the pipelined demodulator with the burst data. Each circuit in the demodulator then uses the burst parameters for each burst to configure itself and carry out the appropriate processing that needs to be carried out for that particular burst type and burst parameters. Either of these processes is referred to in the claims as control or configuration of the circuits of the demodulator by the control circuitry (comprised of the MAC software 60, microprocessor 58, MAC chip 56, register array 51 and controller state machine 50) since it is the control circuitry which sends the UCD and MAP messages downstream and which loads the burst parameters of each burst into the appropriate front end buffer as each burst is received and moves the burst parameter data from there into the burst parameter memory 193 when the burst data is sent by the arbiter to the demodulator.

As an example of how this configuration and control process works, the despreader 94 in FIG. 7 bypasses itself and the code hopper 96 for TDMA bursts, and the Reed-Salomon decoder 256 uses the Reed-Solomon T number burst parameter to properly decode the Reed-Solomon encoding. Likewise, the Viterbi decoder 246 uses the modulation type defined by the burst parameter to determine which constellation was used and properly decode the incoming constellation points back to the coded and uncoded bits that define each point. Other control functions will be identified as each different circuit in the demodulator is discussed.

The control circuit 222 includes the following counters in the portion which forms part of timebase 55:

1) Minislot counters: 32 bits for SCDMA and another counter for TDMA (1.0 & advanced PHY) which rolls over with Timestamp (TS) counter. The TDMA MS is derived from the TS counter. Note that TDMA bursts in SCDMA mode are considered as SCDMA timing.

2) Frame counter: 8 bits (SCDMA only).
3) Timestamp counter: 32 bits.

For TDMA bursts, the minislot (MS) counter is derived from the timestamp counter, so the MS counter does not have to be an actual counter. When the TS counter rolls over, the MS counter also rolls over to 0. Also, the SCDMA frame counter for a particular HFC system can be derived from the TS counter so the control circuitry can read only the TS counter and would then be able to derive the MS and frame counters for the HFC system of interest and plan the allocation of SCDMA regions and TDMA regions, and the allocation of minislots to modems in the MAP messages.

Each data burst goes from one block to another using a FIFO in some embodiments or a Stop/Go hand shake in other embodiments. Handshaking is preferred when the burst size varies from one burst to another.

The overall receiver is divided into five pipelined areas so five different bursts can be processed at the same time. Therefore, each burst's parameters should be forwarded to the next section when the data of the burst is forwarded to that section. The five stages of the pipeline are:

(1) Input processing (full frame in SCDMA) to mark corrupted samples, decimate and matched filter and de-spread SCDMA bursts (this processing occurs in the circuitry of FIG. 7 and is not part of the demodulator 52);
(2) Timing recovery (224) to recover the symbol clock and re-sample at the correct timing and do start of burst detection, ranging offset measurements and collision detection (226);
(3) Rotational amplifier circuitry (including preamble processor 91 and AGC/rotational amplifier 89 and carrier recovery 230) to calculate and track correction offsets and correct preamble and symbols and calculate equalization coefficients from corrected preamble symbols (234) for each training burst;
(4) De-interleaving (240) and Trellis Code Modulation (TCM) decoding (246) of TCM bursts and differential decoding (242) of differentially encoded bursts or slicer decoding of non-TCM bursts;
(5) Reed-Solomon decoding (256) for reassembling the RS codewords and error correcting the payload data in the RS codewords for output.

Only the first pipeline stage deals with full frame (in SCDMA) where all the rests deal with bursts.

Mixed DOCSIS 1.0/1.1 and Advanced PHY TDMA or SCDMA Modes

The receiver must be able to receive in at least 2 mixed modes for each channel receiver: DOCSIS 1.0/1.1 TDMA; and, Advanced PHY TDMA and SCDMA bursts multiplexed over time. The MAC process 60 divides the time domain into SCDMA frames and some of the SCDMA frames will be used for TDMA bursts. Generally, the TDMA bursts will be used for DOCSIS 1.0/1.1 modems, but Advanced PHY TDMA bursts and TDMA ranging bursts from SCDMA CMs can be received also.

If the CMTS detects that there are two kinds of modems (TDMA and SCDMA) on an HFC system, it will divide the time on each HFC system with both types of CMs between TDMA modems and SCDMA modems using the mixed mode scheme.

In mixed mode reception, there is guard time after the SCDMA region and before the TDMA region. The guard time should at least equal to the guard time between two TDMA bursts. Note that the guard time belongs to the end of the burst, therefore, the guard time after the TDMA burst and before the SCDMA region is already in place. In alternative embodiments, synchronous TDMA is implemented and there is no guard time between TDMA bursts or between the TDMA region and the SCDMA region of mixed mode channels.

Sample Buffer 93

In SCDMA mode, the sample buffer stores a double frame sampled at 2 times per symbol. The data is processed after the buffer is full with one frame. The time-offset of each burst is corrected and the estimated data sampled at one sample per symbol are stored in the sample buffer.

The sample buffer 132 stores both the data and the erasure bit indication.

In TDMA mode, the sample buffer is a circular buffer or FIFO and is used to store the data in order so that it may be processed in a few passes. The read pointer follows the write pointer and it never passes the write pointer.

The reading steps from the sample buffer in SCDMA mode are:

Read the Unique Word (UW) preamble bits at the beginning of each SCDMA burst for use by the Start of Burst Detector 226. When the interleaver in the CM is enabled, the UW symbols need to be deinterleaved. The UW size is programmable and is the same as the size of the preamble, 4 to 32 symbols.

The symbols of the burst, including the preamble symbols, are then read for a symbol clock timing recovery process carried out by the timing recovery circuit 224. The symbols are read over all the codes of the burst for each spreading interval. Interleaving does not change the order of reading the symbols.

The timing recovery circuit 224 reads the symbols only once, but the first symbols are processed 3 times as the timing recovery circuit scans the data forward, backward and again forward to recover the downstream symbol clock therefrom.

The output of the sample buffer with the burst control is sent via line 225 to the timing recovery circuit 224. A switch 241 is controlled by the timing and control circuit 222 to supply the filtered data to the start of burst detector 226 during the unique word portion of every different type of burst, i.e., during the UW portion for all IUC types, for start of burst detection and ranging. The switch 241 then is controlled to change states after the UW portion of every burst to supply the sample data to the timing recovery circuit 224 for recovery of the symbol clock.

Timing Recovery Circuit 224

The timing recovery circuit 224 only recovers the symbol clock during asynchronous TDMA bursts, and does nothing and is either bypassed or transforms itself into a transparent pipeline that just passes the sample data through to the frame buffer 228 during SCDMA bursts in the preferred embodiment. This is because after ranging in TDMA mode, SCDMA bursts use the same timing and are assumed to be aligned with minislot and symbol clock boundaries. Likewise, in embodiments where STDMA bursts are transmitted, the timing recovery circuit 224 does nothing. Symbols that have been marked as erased by the impulse detector are not used by the timing recovery circuit tracking loop.

For SCDMA bursts, the CMTS receiver assumes the CM that transmitted the burst has achieved precise frame synchronization. Thus, the CMTS receiver just uses its local master symbol clock of the proper symbol rate based upon the burst's IUC data to receive the burst. The local symbol clock is used along with phase and amplitude correction factors developed from the preamble of training bursts transmitted by the CM that transmitted the burst to process upstream data of other bursts from this CM. The IUC data of every burst in the burst parameter memory in conjunction with the timing and control circuit causes the bypassing of the timing recovery circuit 224 to occur during SCDMA (or STDMA) bursts in the embodiments where the CMTS receiver assumes the CM is in precise synchronization.

There is another class of alternative embodiments, where the timing recovery circuit 135 monitors the time synchronization of SCDMA and STDMA and TDMA bursts and provides time offset data for downstream messages to the cable modems that transmitted the bursts if any slip in synchronization to the minislot boundaries at the CMTS receiver is detected, or corrects the time offset of the burst.

The timing recovery circuit 224 works before the carrier acquisition and is non-decision aided.

The timing recovery 224 tracks the symbol clock phase using a second order loop. The second-order loop is used in TDMA mode and a first-order loop is used in SCDMA mode in some embodiments. The loop gets the initial time offset estimate from the start of burst detector 226 via data on line 227. The timing recovery circuit tracks the symbol clock by using the timing error of each symbol.

There is a resampler in the timing recovery circuit to convert from the two samples per symbol stored in the sample buffer 93 and the one sample per symbol output on line 229 to the frame buffer 228. The resampler in timing recovery circuit 224 synchronizes to the recovered symbol clock and then re-samples the transmitted signal at the proper time to develop one sample per symbol taken at the proper time. In other words, the resampler uses the time offset to estimate the correct timing for one sample per symbol.

The timing recovery circuit 224 outputs the following data for each burst to the MAC chip 56 in FIG. 1 via data path 54:

Initial time offset

Final time offset at the end of the burst

Symbol Clock frequency offset

Each CM initially sends an initial station maintenance burst which is used to establish a proper transmit timing delay value so that transmissions are delayed properly so that, given the position of the CM on the HFC system relative to the CMTS, transmissions scheduled by the CMTS to start at a certain minislot arrive at the CMTS at that minislot time. The preamble of the initial station maintenance burst also is used to develop phase and amplitude error correction factors for use in receiving bursts from the CM that sent the burst, and is also used to calculate upstream equalization coefficients to send down to the CM for use in subsequent transmissions. Subsequent periodic station maintenance bursts are used to update these equalization coefficients and error correction factors and transmit timing values.

In ranging and training (initial and periodic station maintenance) bursts, the ranging offsets measured by the timing recovery circuit and start of burst detector 226 are sent via the MAC chip 56 in FIG. 1 to the MAC process 60 and are sent to the CMs that sent the training bursts via the CMTS downstream transmitter 70 so as to correct the cable modem's upstream ranging offset. The ranging offset may be used to correct the CM kiloframe counter and/or symbol clock so as to have an offset such that transmissions scheduled for particular upstream minislots in will arrive at the CMTS aligned in time with the assigned minislot and kiloframe boundaries. Frames and kiloframes only have meaning for SCDMA bursts with either spreader on or off.

Ranging bursts for SCDMA channels are spreader off TDMA bursts. Therefore, bursts for TDMA channels can arrive anywhere in the middle of frames as there is no notion of frames in TDMA channels and ranging only achieves minislot boundary alignment for TDMA bursts.

In SCDMA mode, the time offset of the symbols over a spreading interval of each burst are calculated and used by the timing recovery loop. In tracking mode for TDMA bursts, the loop tracks the symbol clock phase noise. In SCDMA mode, the timing recovery circuit 224 is mainly used for symbol clock tracking of TDMA training bursts. In SCDMA mode, the time offset of the symbols over a spreading interval of each burst are calculated and used by the resampler in the timing recovery loop to do resampling at the proper time. The resampler is an interpolation filter whose coefficients are determined by the time shift.

In SCDMA mode, the resampler is initialized during each spreading interval because there is no connection between two spreading intervals. In the first and last codes of the burst, the resampler has limited window span to interpolate the data because it cannot use the adjacent samples which are from a different spreading interval or different user. Therefore, the interpolator uses a smaller window span when processing the first and last codes of the burst. The resampler in SCDMA mode for data bursts can be disabled by the control circuitry.

The demultiplexed data from each minislot of the frame being processed by the timing recovery 224 is then stored in a different set of addresses in frame buffer 228 with one sample per symbol in the preferred embodiment, although other numbers of samples per symbol can also be used.

The timing recovery 224 has the following control registers in the preferred embodiment:

Enable/Disable: sometimes the MAC layer process 60 only needs to run the equalizer 234 without correcting symbol clock time offset such as in SCDMA mode. Thus, some training bursts have their timing offset corrected and some only have equalizer coefficients calculated therefrom.

Timing offset resolution (number of bits): The process is as follows. The training burst time offset is calculated, and the same burst then passes through the equalizer 234 to converge on new coefficients. The equalizer corrects any time offset that was not corrected by the timing recovery. The time offset and the new coefficients are then sent to the CM via a downstream message.

For TDMA data bursts other than ranging, the timing recovery circuit 224 measures the time offset and corrects the received data and no measurements are sent down to the CM. There is no correction of timing in SCDMA bursts since it is assumed their timing is correct.

Start of Burst Detector 226 and Ranging

The start of burst detector 226 provides support on the CMTS end for the ranging process carried out by the CMs to achieve precise alignment with the upstream minislot and kiloframe boundaries on the HFC on which they are operating. There are two different types of ranging: initial ranging and periodic ranging. The object of initial ranging is to achieve "phase coherence", and the object of periodic ranging is to maintain "phase coherence". "Phase coherence" exists for a CM when the ranging offset, i.e., transmit timing delay and ranging offset, is correctly set for that CM. Correct setting of the transmit timing delay and ranging offset of the upstream minislot counter in the CM compared to the upstream minislot counter in the CMTS counting minislot for the HFC system on which the CM operates will result in the CM's TDMA transmissions having their minislot boundaries aligned in time at the input to the CMTS receiver with the minislot boundaries counted off in the CMTS receiver by the appropriate minislot counter of the minislots to which the burst was assigned. "Phase coherence" will further result in the chip clock and frame boundaries in upstream SCDMA bursts from this CM being aligned in time with the chip clock boundaries and frame boundaries as they are counted off at the CMTS receiver.

Phase coherence also requires that the upstream symbol clock and/or chip clock frequency used by the CM to transmit a burst is identical to the upstream symbol clock and chip clock frequency generated in the CMTS timebase from the master clock or timestamp counter. Phase coherence as to the upstream symbol clock or chip clock-frequency generated by the CM is achieved by synchronization to a CMTS master clock recovered from the downstream so that there is frequency lock and no drift between the upstream chip or symbol clock generated in the CMTS and the upstream chip or symbol clock generated in the CM. How this is done is described in U.S. Pat. No. 6,243,369 B1 entitled APPARATUS AND METHOD FOR SYNCHRONIZING AN SCDMA UPSTREAM OR ANY OTHER TYPE UPSTREAM TO AN MCNS DOWNSTREAM OR ANY OTHER TYPE DOWNSTREAM WITH A DIFFERENT CLOCK RATE THAN THE UPSTREAM which is hereby incorporated by reference. The DOCSIS 2.0 specification also requires that the upstream be divided into minislots with are integer multiples of 6.25 microseconds. The minislots are numbered relative to the master reference maintained by the CMTS. The master reference is sent to the CMs by sync and UCD messages.

The DOCSIS 2.0 specification is hereby incorporated by reference. To the extent anything in this specification differs from the teachings of the DOCSIS 2.0 specification and one skilled in the art would appreciate that what was said in this specification is erroneous in light of the teachings of the DOCSIS 2.0 specification, then the DOCSIS 2.0 specification controls. In such a case, what was said in this specification is intended as a teaching of an alternative embodiment to the extent what was said in this specification is operative.

Phase coherence also requires that the upstream carrier frequency used by the CM to transmit a burst be identical to the upstream carrier frequency generated in the CMTS DDFS and used to mix the burst's RF transmission digital sample stream down to baseband. In some embodiments, the upstream carrier frequency generated by the CM is generated from the CMTS master clock recovered from the downstream so that there is frequency lock and no drift between the upstream carrier generated in a CMTS RF analog demodulator and the upstream carrier generated in the CM.

In the preferred embodiment, mixing to baseband does not occur in the analog phase in the analog front ends 18, 20 etc. in FIG. 1. Mixing to baseband occurs in the digital front end circuits using the DDFS with frequency control supplied by the MAC process 60 and the controller state machine 50.

Phase coherence results in at least minislot synchronization for TDMA bursts and minislot and frame synchronization for SCDMA bursts. Phase coherence is necessary to correctly receive these bursts. The generation of an upstream carrier and upstream chip and symbol clocks phase locked to the recovered master clock is one element necessary to achieving phase coherence. The ranging process and circuitry are another necessary element to achieving phase coherence. Ranging corrects for bulk timing errors which are the most common variety. Optionally, but included in the preferred embodiment is the ISI canceller 231 which corrects for small timing offsets that arise on a burst-by-burst basis by developing timing correction factors from each burst's preamble.

During initial ranging, there is no control by the CMTS of which CMs can do their initial ranging and the CMs can be substantially off in their timing. All CMs are invited to transmit their ranging bursts during a designated contention interval, so there can be collisions of ranging bursts. To implement initial ranging, the MAC layer sends a downstream message which tells the CMs that an initial ranging interval with IUC type 3 will be opened up over an identified span of minislots. The span of the initial ranging interval is set to be long enough to encompass the entire round trip propagation time to the farthest CM. The IUC in the downstream message tells the CMs that it is an initial ranging interval so every CM that needs to do initial ranging is free to do so during this interval. A reference time in the contention interval is identified in the downstream message. The CM then sends its initial ranging burst during the identified interval and uses its upstream minislot counter to time the transmission to start at what that CM thinks is the reference time.

The ranging Initial Station Maintenance burst starts with a UW or preamble and includes the ID of the CM that transmitted it.

Because the CMs minislot counter may be out of sync with the corresponding upstream minislot counter in the CMTS, the initial ranging burst will arrive at the CMTS receiver at some time which is offset from the reference time established by the downstream message. The start of burst detector 226 detects when the burst starts by detecting the UW and outputs a timing offset measurement for each CM which has a burst detected. That timing offset is used to compose a downstream message directed to that particular CM telling it how far and in which direction to adjust its minislot counter or other timebase to achieve phase coherence, i.e., synchronization.

If there is a collision between ranging bursts, the start of burst detector 226 detects this fact, and no timing offset calculation is made, and no downstream message is sent to any CM. The CMTS MAC software process 60 uses the fact that there are a large number of collisions during initial station maintenance intervals to infer that there is a large demand for initial ranging. The CMTS will respond by opening more initial station maintenance intervals or lengthening them.

If a CM transmits an initial ranging burst and does not receive a reply, it assumes there was a collision or its power is not high enough. The CM then waits for the next contention interval to send another initial ranging burst.

After achieving initial synchronization, CMs have their timing adjusted so as to be able to transmit their bursts so that they arrive within ½ a symbol time from the designated minislot boundary in a bandwidth award message from the CMTS.

Periodic ranging is the other type of ranging the the CMs perform. From time to time, the MAC layer will open a periodic ranging interval for each specific CM. That time boundaries of the periodic ranging interval will be transmitted in a downstream message directed to the specific CM authorizing a burst which includes an IUC that indicates to the CM that the burst to be transmitted is a periodic ranging burst and the MAP messages tells the CM when it can transmit the burst. Only the CM to which these messages are directed can transmit a ranging burst during the identified periodic station maintenance interval so there will be no collisions. The CM responds by transmitting its periodic training burst, and the start of burst detector detects when the burst starts relative to the reference time identified in the downstream message. The start of burst detector then calculates time offset data to be used in a downstream message to that CM to re-adjust its transmit timing or ranging offset to maintain precise synchronization with upstream minislot boundaries.

The start of burst detector is also involved in processing of non-training bursts. Asynchronous TDMA bursts are transmitted by DOCSIS 1.0, 1.1 and advanced PHY TDMA CMs, and these bursts will hereafter just referred to as TDMA bursts. All ranging is performed with TDMA bursts in the preferred embodiment even for SCDMA only CMs. However, in other embodiments, other types of burst multiplexing such as SCDMA bursts may be used. Synchronous TDMA for post ranging bursts with more precise time alignment and small or no guardtimes is not implemented in the preferred embodiment, but is implemented in alternative embodiments.

That is, the start of burst detector 226 functions to determine where in time each asynchronous TDMA burst starts by monitoring for the arrival of the Unique Word. For SCDMA mode in the preferred embodiment, and synchronous TDMA mode in alternative embodiments, the start of burst detector knows where the burst is supposed to start from burst IUC data that travels with the burst payload data (assuming the CM that sent it has already performed ranging and is in frame synchronization and has complied with the MAP message). Since ranging has already been performed, the main function of the start of burst detector 226 in these modes is to determine if the STDMA or SCDMA burst is present and if there has been a collision.

Certain bursts such as requests for bandwidth are also transmitted during a contention interval so there can be collisions in bandwidth request bursts also. The MAC wants to know if there have been collisions in the bandwidth contention intervals so more contention intervals can be opened if there have been collsions or the contention intervals can be made wider. The MAC process 60 also wants to know if SCDMA bursts (or STDMA bursts in some embodiments) have arrived when scheduled to make sure the CMs that are supposed to have sent them are operative.

Each burst starts with a UW or preamble that is approximately the same length as the preamble in embodiments where separate preamble and UWs are used. In some embodiments, the UW may be different length than the preamble.

The preamble pattern of data and the length of the preamble are both programmable in the preferred embodiment, but may be fixed in other embodiments. The preamble length and value are configured by the CM in accordance with the UCD message transmitted by the CMTS. The UW is used to detect when the burst starts and to calculate phase, amplitude and frequency correction factors to help correctly receive the burst.

All CMs transmitting upstream are quiet until they request bandwidth during a contention interval, are granted a certain number of minislots in a MAP message and transmit during those minislots. The data transmitted during that interval plus the preamble are known as a burst.

In SCDMA mode, the CMTS sets and/or knows the time reference in the ranging gap (also known as the contention interval) where the TDMA ranging burst is supposed to start. In SCDMA mode, the start of burst detector detects if there is an TDMA ranging burst, where the burst actually starts and detects if there is a collision in the contention interval. However, to train SCDMA modems at initial station maintenance burst time, the start of burst detector determines the time of arrival of the UW of the TDMA initial station maintenance burst relative to the reference time in the contention interval. This time offset is then sent down to the SCDMA modem so that it can adjust its ranging offset to achieve frame synchronization, and this ranging offset is used to transmit subsequent SCDMA bursts. The same process occurs for TDMA periodic station maintenance bursts from SCDMA modems.

Contention Interval and Bandwidth Requests

In the CMs, if they send a bandwidth request during a contention interval and there is a collision, they will receive no response. They respond by sending the bandwidth request again, because it is assumed that if no grant in a MAP message is received after transmitting a bandwidth request that there must have been a collision.

Summary of Steps Performed by SBD

The start of burst detector (SBD) 226 and the timing recovery loop 224 perform the following steps in the preferred embodiment:

Start of burst presence detection (valid, collision or empty burst).

In TDMA mode and in SCDMA initial and periodic station maintenance bursts the SBD is used for burst presence detection and for initial timing offset, whereas for other SCDMA bursts, the start of burst detector is used for burst presence detection only (and time correction in some embodiments).

Initial ranging burst time-offset measurement which is sent to the MAC process for transmission down to the CM that sent the burst.

The SBD is used to calculate the initial time offset for timing recovery purposes by the timing recovery loop 224 and sends that initial time offset to the timing recovery on bus 227.

Estimating the symbol samples at the right time by the timing recovery loop.

In TDMA mode, there is no interleaving on the preamble symbols of the UW, but in SCDMA mode when the interleaver is enabled, the UW symbols need to be deinterleaved before the start of burst detection process can detect the UW.

The time offset in ranging processing is calculated in two steps:
Coarse time offset
Fine time offset The burst time offset, which is the combination of the coarse and fine time offsets, is output to the MAC layer process 60.

The Start of Burst detector's main use is monitoring the contention region for REQ, REQ/DATA and Initial Station Maintenance bursts.

For each burst, the following calculations are carried out by the start of burst detector 226 for reporting to the MAC process.

Start of burst nominal receive time
Start of burst search window
Time offset output
Burst length calculation Coarse Burst Time Offset The start of burst detection is based on correlation of the actual received signal to a known preamble sequence, i.e., unique word (UW) that is added by every CM at the beginning of every burst. The absolute value of the correlation of the received signal with the UW is calculated and compared to a predefined programmable threshold. The absolute value is used because the received signal phase is unknown.

The carrier phase is not fixed during the correlation window when there is a carrier frequency offset.

In simpler embodiments, the correlation result is compared to the multiplication of the threshold by the power estimate. In other simpler embodiments, the threshold is normalized by the received power and by the length of the UW sequence because the preamble length might change from burst to burst.

In order to find the two largest adjacent correlation values, four correlation values are stored and compared in the preferred embodiment. The second largest correlation value is always before or after the peak. The four correlation values include one correlation value before the first threshold crossing and two-correlation values after the peak crossing. The correlation value before the threshold crossing is needed when this value is bigger than the correlation value after the threshold crossing. The fourth correlation value is needed when the threshold is low, so the real peak is the sample after the first threshold crossing, and the sample after the peak is bigger than the correlation before the peak.

The correlation peak is found by comparing the first threshold crossing with the correlation after it. The second largest correlation is found by comparing the correlation before and after the peak. The correlation peak location relative to the expected start of burst location is the coarse burst-timing offset.

Start of Burst Nominal Receive Time

As noted above, in the preferred embodiment, the MAC layer software process sets a timing reference mark in every contention interval the CMTS opens. This timing reference takes the form of a start Minislot value established by the MAC layer and transmitted downstream to the CMs in a MAP message. Ranging bursts need to have their timing adjusted (offsetting of upstream minislot clock in the CM) so that the start of the ranging burst arrives at the CMTS at the time of the timing reference mark to achieve frame synchronization.

The expected location of start of ranging burst occurs when the CMTS minislot upstream minislot counter for the HFC system of the CM which sent the ranging burst matches the MAC layer start Minislot reference number for the ranging contention interval during which the ranging burst is supposed to arrive.

The start of burst expected location for most of the other burst types (IUCs) is obtained from the sum of the MAP Start minislot field (4 bytes) and the minislot Offset of each IE. The exception is for the following burst types: REQ, REQ/DATA and Initial Station Maintenance.

There is a process in the CMTS MAC process 60 that maps out the usage of the entire upstream bandwidth on all TDMA and SCDMA logical channels of all FDMA channels. That usage is defined in a table or other array of grants for upstream bursts and is communicated downstream in one or more MAP messages. Each grant is defined by an information element which will hereafter be referred to as an IE. Each IE contains an IUC field that defines the burst type, an offset field that defines the minislot number where the burst is supposed to start, and a SID or service identifier that identifies the voice, data or other service to which the data of the burst belongs. The SID identifies the CM which may transmit because each CM has a unique set of SIDs.

The REQ burst (IUC=1) can start in the first minislot of the IE and on all the minislots in the IE region, which satisfies First_minislot+n*Burst_Size, n=0,1,2, . . . .

where the Burst_Size is given in the burst attribute.

Initial Station Maintenance

The Initial Station Maintenance ranging/training burst (IUC=3) is used to achieve initial synchronization and to allow the CMTS receiver to generate amplitude, frequency and phase error correction factors and equalization coefficients for that CM. The burst size is given by the Burst Size in the burst attribute.

After the Start of Burst Detector 226 detects the Initial Station Maintenance burst, the Timing Recovery circuit processes the data. After the timing recovery circuit finishes processing the burst, it tells the Start of Burst Detector to start searching for another possible burst.

Start of Burst Search Window

The search of the Start of Burst is performed within a window. The window size is defined by the TDMA/SCDMA, IUC # and by the contents of two registers SOB_PRE_WINDOW and SOB_POST_WINDOW (not shown). For most of the burst types, except initial and periodic station maintenance, the window is defined by 2 registers. The PRE_WINDOW defines the start of the window before the anticipated Start of Burst location and the POST_WINDOW defines the end of the window after the anticipated start of burst. These registers are loaded, typically by the MAC process 60, based upon the MAP data indicating where each burst is supposed to start.

The search window for the start of burst for Initial and Periodic Station Maintenance, which are burst types having IUC 3 & 4 for TDMA and IUC 3 & 12 for SCDMA is defined by the contents of a register STATION_MAINT_PRE_WINDOW (not shown).

The search window for Initial Station Maintenance burst lasts for all the allocated grant.

The search window, for Periodic Station Maintenance bursts (IUC=4 for TDMA and IUC=12 for SCDMA), will continue for half of the guard of the burst after the nominal location of the start of the burst. The guard for SCDMA IUC=12 can be any value that works.

Using a NULL SID is a way to increase the time-offset range of the modem by adding a no transmission region. For TDMA bursts IUC 4, an ENABLE_TDMA_NULL_SID control register can be added in some embodiments, which the CPU can enable in order to start the UW search from the beginning of the NULL SID. In alternative embodiments, the search for the start of burst for the periodic station maintenance burst behaves as a regular burst search and there no need to increase the window over the one used in a regular burst.

The Periodic Station Maintenance for SCDMA (IUC=4), which is an SQDMA burst, is not supposed to have a big time offset. In this case the window is within 1 symbol of the anticipated start of burst time, or +/−0.5 symbol. In the preferred embodiment,.mainly IUCs 3 and 12 are used for SCDMA bursts. The IUC=4, which is in SCDMA mode, may also be used in alternative embodiments.

Time Offset Output

The time offset is output for each burst and not just for station maintenance bursts during ranging. However, the main use of the time offset output is for ranging using initial and periodic station maintenance bursts to maintain each CM's timing so as to be aligned with the minislot boundaries at the CMTS. The time offset is used on non-maintenance burst to monitor the state of synchronization in some embodiments.

The time offset is composed of 2 portions: Coarse Time Offset and Fine Time Offset. The coarse time offset is output from the start of burst detector in units of symbols or half symbols. The fine time offset output is in units of a fraction of a symbol. The MAC process 60 will convert these two values into timestamp fraction units based on the symbol rate of the burst. DOCSIS 1.1/1.0 cable modems require downstream messages from the CMTS to specify ranging offsets in 6.25 usec/64 (1/10.24 MHz) resolution.

The coarse time offset is calculated by the difference between the expected location of the Start of Burst and the actual location where the start of burst was found. There is a counter (not shown but usually in timing and control circuit 222) that counts the number of samples 93 that were read from the sample buffer until the start of burst was found relative to the reference point. The MAC process 60 converts the count of the counter to the desired value by subtracting the number of samples read before the start of burst and converts the counter value to time using the symbol rate value. The time offset can be output as a downstream message to the CM that sent the burst as a +/−value relative to the expected start of burst location or as an offset from the search start in alternative embodiments.

Burst Length

The burst length calculation depends on the burst type given by the IUC. For most of the burst types, the length in minislots described by the IE is inferred by the difference between the IE starting minislot offset and the minislot offset of the following IE.

In TDMA mode, when the last RS codeword is illegal, the burst size is shorter and the full grant is not utilized. In this case the modem does not transmit during the full grant and the guard is extended.

The timing and control 222 will use the parameter Burst Length for the burst length in minislots. The Burst Length is equal to the Burst Size burst attribute for IUC 1 & 3.

Note that TDMA-within-SCDMA bursts (IUC 3 & 12 of SCDMA) burst length is calculated using SCDMA parameters, namely, an SCDMA minislot has CODES-PER-MS*SPREADING_INTERVALS_PER_FRAME symbols.

Preamble Power Modes

The preamble symbol power has two power levels referred to as Preamble Scaling Factors (QPSK-P0 or QPSK-P1) which represent high and normal power. The CMTS tells each CM the power to use on each burst by downstream messages so as to control ISI and prevent clipping and manage the near-far problem. If the preamble of the burst is transmitted in high power mode, all the received preamble symbols are normalized to normal power by the timing recovery circuit 224 so all the other circuits do not need to deal with the high power mode. Also the preamble symbol power will be normalized for all the preamble symbols in DOCSIS 1.0 16-QAM constellation.

Start of Burst Power

The expected range of the received burst power is different for data bursts and training bursts. Training bursts, especially the initial station maintenance burst, has a bigger range of received power (up to +/−15 dB). Note that when the burst's power is too high, the burst is subject to clipping by the A/D converter in the analog front end circuits 18, 20, etc. in FIG. 1.

The power threshold of the correlation for burst detection depends on the burst type.

Clock Frequency Offset

The maximum clock frequency offset according to the DOCSIS specifictions is 50 ppm in TDMA mode. In SCDMA mode, a block converter in the cable plant may produce only a carrier frequency offset. The maximum timing phase offset for 32 symbols is very small. In SCDMA, the CMs generate their upstream clocks from the downstream clock so there is no clock offset. The timing phase offset due to the clock frequency offset is small, and does not affect the correlation output.

Carrier Frequency Offset

The correlation calculation in the start of burst detector 226 needs to change when there is a big carrier frequency offset. The expected frequency offset in initial station maintenance bursts can be big and therefore requires changing the correlation calculation. The carrier frequency for initial station maintenance can be offset by more than 50 ppm. The frequency shift is a result of errors in the frequency agile cable modem oscillators and errors in frequency converters at the cable plant. Assuming that the total frequency, offset is 100 ppm, carrier frequency of 65 MHz (Euro-DOCSIS) and TDMA symbol rate of 160 ksps, the 32-preamble symbols processed in initial station maintenance yields phase offset of 2*pi*65 MHz*100 ppm*1/160 ksps*32 symbols=2*pi*1.3=468 degrees. Since the phase rotates more than 360 degrees in the correlation window, the correlation output is invalid. Therefore, the correlation needs to be divided into small pieces. The size of each piece is controlled by a software programmable register with contents that depends on the expected. frequency offset, whether operating in TDMA/SCDMA mode, and on the symbol rate. TDMA and SCDMA modes have different programmable registers in the preferred embodiment.

If the output were absolute value rather than absolute-square, the correlation peak would not change relative to the previous case without the splitting into sub-correlations, but the sidelobe level will be higher. Thus, the threshold needs to be modified for correlation in sections.

Note that the time-offset estimate needs to be simulated also for this correlation in sections.

For TDMA data bursts, the phase offset in the correlation window is small, and there is no need to divide the correlation into sections. For frequency offset of 100 Hz and symbol rate of 160 ksps, the phase offset in a window of 32 symbols is 2*pi*100 Hz*32/160 ksps=7.2 degrees. For SCDMA bursts, assuming the block converter frequency offset is 20 ppm or 65 MHz*20 ppm=1.3 kHz, the phase change inside the correlation window for 1.28 Msps is 2*pi*1.3 kHz*32 spreading intervals/1.28 Msps=12 degrees, which is small. SCDMA initial station maintenance also does not have a problem because the phase offset in the correlator window is 2*pi*1.3 kHz*32 symbols/1.28 Msps= 11.7 degrees.

The threshold for TDMA initial and periodic station maintenance should be different than the TDMA data burst threshold.

The number of symbols per each section of the correlator is programmable according to the symbol rate and expected frequency offset. The possible number of symbols in each correlator section is 2, 4, 8, 16 or 32.

Correlation and Erasures

The received samples can have erasure bits set by the impulse detector. These samples are not used in the correlation calculation in the preferred embodiment. This can be done by zeroing the multiplication of the erased sample or by replacing the marked sample by 0. When the number of erased samples is more than a programmable fraction of the UW, the correlation is automatically set to 0.

Implementation of the Correlator In the Start of Burst Detector 226

A shift register of 64*2 registers with alternate inputs of I and Q are used to do the correlation. Each fourth tap of the register is output for correlation calculation (sum(I*s))^2 and then (sum(Q*s))^2. Each tap has an inversion when s is −1. There is no addition of 1 for 2's complement because all the additions of ones are counted via a counter and are added with one adder at the end. Then adders are used to sum all the taps and at the end the value is squared. After a shift the same circuit is used for all the Q samples to calculate (sum(Q*s))^2.

The power is calculated using the same shift register. The average power is calculated for all the 64 samples, and it's not calculated differently for the odd and even samples. The previous power is updated by adding the new sample power and subtracting the old sample power. It's calculated by (I1+jQ1)^2−(In+jQn)^2=(I1−In)*(I1+In)++(Q1−Qn)*(Q1+Qn). This requires only 2 adders and one multiplier for I or Q.

Frame Buffer 228

The frame buffer stores bursts as long as the burst is not larger than a frame. When the burst size is bigger than one frame, the frame buffer stores up to one SCDIMA frame. In TDMA mode the size of the buffer is anything that works to adequately receive TDMA bursts, but it does not have to be large enough to store the biggest TDMA burst. For TDMA and ATDMA bursts, the frame buffer acts as a FIFO.

In SCDMA mode, the timing recovery circuit writes frames of data into the frame buffer over codes (in columns). Once it finishes a column, the preamble processor 91 can start processing the preamble symbols that are located in that column. The preamble processor does not wait until the full burst is written into the frame buffer in the preferred embodiment, but in other embodiments, it can do so. If the preamble processor starts processing the preamble symbols as soon as the column is available in the frame buffer, there is no need to speed up the preamble processor beyond the speed of the timing recovery circuit 224 in the preferred embodiment. The timing recovery circuit 224 needs to be fast, because it is the first processing block, and, if it is slow, it delays the whole process.

Data is processed burst by burst. When the rotational amplifier (comprised of the AGC circuit 89 and the carrier recovery circuit 230) finishes processing the preamble of a burst to develop phase and amplitude error correction factors, the preamble processor 91 immediately begins to process the preamble of the next burst in the preferred embodiment. The burst sizes can be different; thus, the transfer of bursts from one module to the other is done in the preferred embodiment only after the following module has finished processing the previous burst. In alternative embodiments, pipelined buffers can be employed between each stage such that when a circuit is done doing its work, it can output the burst to the pipeline buffer between it and the following stage. When the following stage is ready, it can retrieve the burst from the buffer.

Optional ISI Canceller 231

An optional ISI canceller is useful for eliminating intersymbol interference between SCDMA bursts transmitted from different CMs that are not exactly aligned in time. The ISI canceller can also be used to cancel ISI between STDMA bursts.

The CM transmit time offset to achieve minislot and frame boundary alignment is corrected once every 30 seconds by the periodic training burst process. Between these time alignments, the cable delay may change or the recovered downstream clock may shift due to TV channel surfing. This effect generates intersymbol interference (ISI) from two sources: one is the intra burst ISI that is caused by the user symbols that interfere one with each other due to time offset; and, the other is the inter burst ISI between different users. The intra burst ISI is removed by correcting the CM's time offset. The ISI between users affects mostly transmissions from other CMs spread by the 3 to 4 codes that are close to the codes used to transmit a burst. This ISI is caused by time offset between SCDMA bursts from different CMs. The inter-burst ISI canceling reduces significantly the ISI between neighboring spreading codes used for SCDMA bursts by different CMs. The Inter-burst IS canceller receives the time parameters it needs via path 233 from the timing recovery 224 and receives the samples taken at the correct time via path 235 from the frame buffer 228.

For the sake of clarity the inter-burst ISI between two users is shown here for only one code. The received symbols of each user are given by:

$$r_1 = s_1 + s_2 * RC(-T+\tau), \tau = \tau_1 - \tau_2$$

$$r_2 = s_2 + s_1 * RC(T-\tau)$$

where $\tau_1$ is positive when the sampling time is after the correct time, and $r_1$ and $r_2$ are the signal of CM 1 and CM 2, respectively, and $s_1$ and $s_2$ are the transmitted signals without ISI, and RC is the raised cosine function.

In matrix form, these relationships are expressed as:

$$\begin{matrix} r_1 \\ r_2 \end{matrix} = A * \begin{matrix} s_1 \\ s_2 \end{matrix}$$

where $A = \begin{matrix} 1 & \alpha \\ \alpha & 1 \end{matrix}$, and $\alpha = RC(T - \tau)$ The two unknown variables $s_1$ and $s_2$ are obtained by solving the following two equations:

$$s_1 = \frac{\alpha * r_2 - r_1}{\alpha^2 - 1}$$

$$s_2 = \frac{\alpha * r_1 - r_2}{\alpha^2 - 1}$$

This can be easily expanded for more than one interfering code. This ISI reduction algorithm can be used for TDMA or STDMA bursts also when two bursts from different CMs with a smaller than normal guardtime or no guardtime between them and timing offsets between the two CMs. The interburst ISI canceller 231 can start to process the data only when the frame buffer stores at least 2 bursts.

Preamble in DOCSIS 1.0/1.1:

The preamble symbols can be transmitted in different modes by legacy DOCSIS 1.0 and 1.1 CMs. Those modes are QPSK, 16-QAM, differentially encoded QPSK, and differentially encoded 16-QAM.

The number of symbols in the preamble is programmable depending on the SNR and modulation. The preamble processor is able to process up to 64 symbols in the preferred embodiment, but more or fewer symbols are permissible. Note that the preamble in training bursts is generally longer than 64 symbols and the preamble processor will process only a portion of the preamble symbols.

The preamble processor 91 has the following inputs:

Received preamble symbols
Time index (in SCDMA the spreading interval index)
Erasure indication
Preamble symbols read from the preamble buffer (not separately shown) according to the
Preamble Value Offset In DOCSIS 1.0/1.1 bursts, when the data is in 16-QAM modulation, the preamble symbols are also modulated in 16-QAM. Thus, a preamble pattern buffer in preamble processor 91 uses 4 bits for each preamble symbol. A portion of the preamble pattern buffer is dedicated for 16-QAM preamble symbols for DOCSIS 1.0. The head-end MAC software should program the preamble pattern buffer so the preamble symbols get the BPSK points of the 16-QAM constellation, located at the corners of first and third quadrants. The receiver should translate the preamble pattern buffer bits into 16-QAM symbols when the burst is in DOCSIS 1.0/1.1 mode and 16-QAM modulation. Each 4 bits in the preamble pattern buffer is converted to 1 bit representing a BPSK symbol.

DOCSIS 1.0/1.1 Preamble in Differential Mode

Note that in differential encoding mode the preamble symbols are differentially encoded together with the data in a known manner, so the preamble processor has to decode them appropriately. The differential encoding is quadrant-differential encoding for uncoded QPSK and 16-QAM. The preamble symbols can be differentially encoded at the modem in 1.0 and 1.1 CMs. A preamble pattern buffer in the receiver of the CMTS should store the expected preamble bits after differential encoding. A preamble pattern buffer at the head-end is different from the preamble pattern sent to the cable modems. The MAC layer process 60 will do the differential encoding according to the definition in DOCSIS 1.1 specification section 4.2.2.2, Symbol Mapping, table 4.2, Derivation of Currently Transmitted Symbol Quadrant. This is applied to QPSK and 16-QAM modulations. The modems do the preamble differential encoding via circuitry therein. A portion of the preamble pattern buffer will be devoted to the preamble in differential mode.

Station maintenance bursts in differential mode require a long sequence for differential encoding.

The Start of Burst Detector 226 and the Timing Recovery 224 are not sensitive to phase rotation; thus, they can deal with the received preamble symbols when they are differentially encoded. The Preamble Processor 91 recovers the phase of the received signal with ambiguity of 90 degrees when the preamble is differentially encoded depending on the initial state of the differential encoder at the modem. The ambiguity is resolved at a differential decoder 242 which is bypassed under control of the control circuitry 222 in the demodulator when differential encoding is not in use. Differential encoding of the preamble and data is used only in DOCSIS 1.0 CMs when the CMTS commands them to use this mode, but most TDMA 1.0 bursts are not differentially encoded and advanced PHY bursts are not differentially encoded. The differential decoder functions to decode only the differentially encoded bursts and is bypassed for all other bursts. Thus, this element is optional in systems where no DOCSIS 1.0 differentially encoded bursts will ever be transmitted. The 90-degree ambiguity does not interfere with the equalizer operation for station maintenance bursts.

Preamble Processor 91

Figure 16:
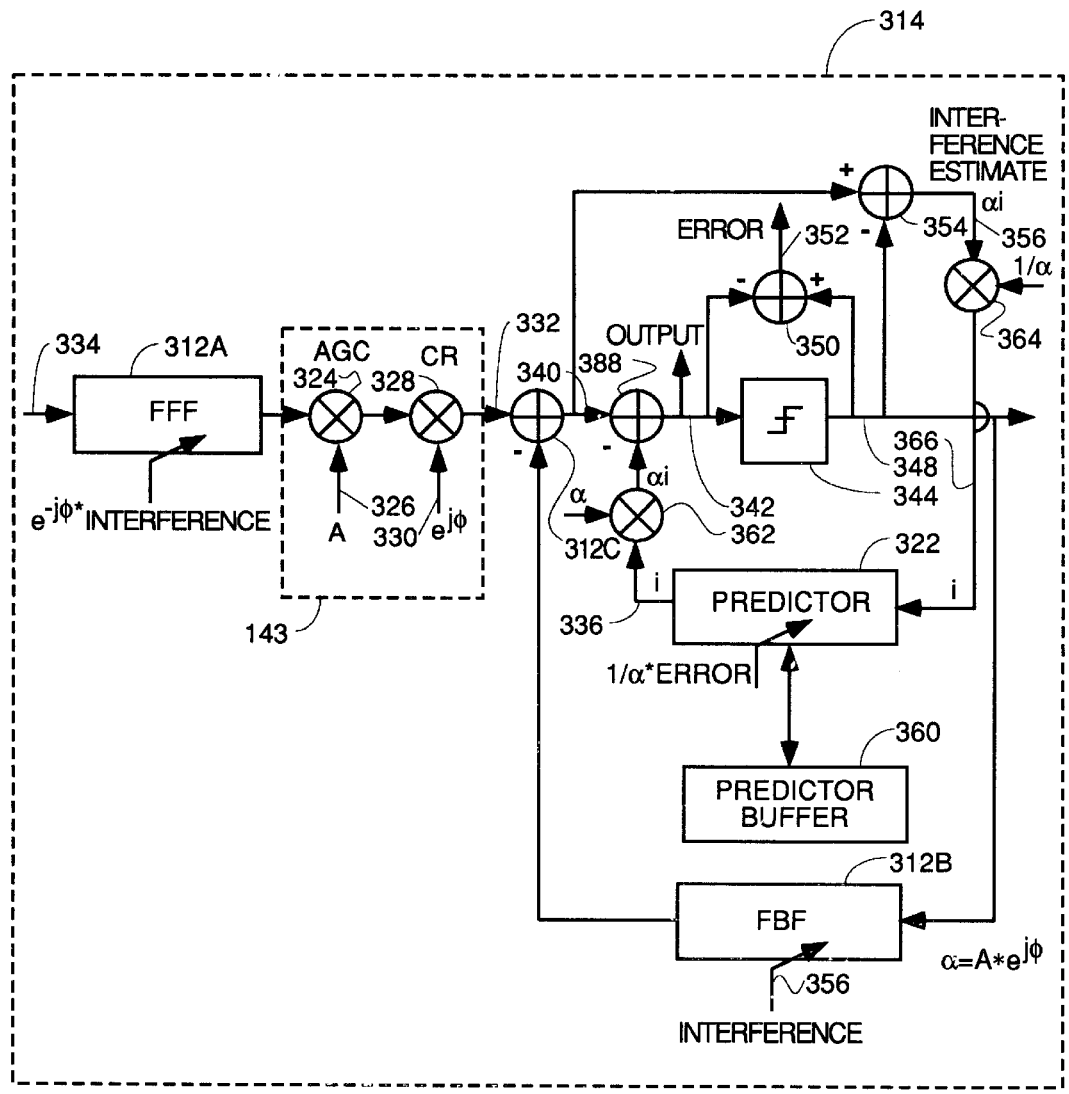
FIG. 16 is a block diagram of an equalizer, predictor, rotational amplifier and preamble processor circuitry within dashed line 314 in FIG. 14 which is useful for filtering SCDMA spreader-on bursts.

The preamble process 91 receives the preamble symbols of training bursts and other bursts from the frame buffer 228 via switch 237 which is controlled by the timing and control circuit 222. A more detailed diagram of the connections of the preamble processor is shown in FIG. 16. The received preamble symbols are read from the frame buffer according to the time they are received. They are output together with a time index. The time index in SCDMA indicates the spreading interval number in the frame and in TDMA mode (including TDMA burst in SCDMA) the time index indicates the symbol number in the received sequence.

In SCDMA mode, when a burst is transmitted over more than one frame, there are pieces of data without the preamble portion. In this case the rotational amplifier continues to track the data.

The received signal can have frequency offset also in SCDMA mode when there is a block converter in the cable plant. The frequency-offset option in SCDMA can be turned off via a control register (not shown) which receives control input from any control circuitry that reads the IUC.

The preamble processor calculates from the preamble the initial gain, phase and frequency offsets (correction factors used to receive bursts from this CM). These calculations of the initial gain, phase and frequency offsets are based on the best linear interpolation (least squares) of the received symbol phases. After the preamble, switch 237 is switched, and data symbols of the burst are supplied to the rotational amplifier 143 which uses these initial correction factors as initial values for the tracking loops which track and correct the gain, phase and frequency offsets of the burst. The calculation steps to derive the initial offset values are:

Read the symbols from the frame buffer and calculate the amplitude and phase for each symbol;
Filter impulse noise according to amplitude;
Phase unwrap;
Filter impulse noise according to the normalized phase difference (frequency offset) (cancelled later to reduce latency);
Phase unwrap (cancelled later to reduce latency);
Calculate initial phase, frequency offset, gain offset and signal-to-noise ratio (SNR).

The preamble processor operates in the same way on data, ranging and training bursts. In training bursts, the first portion of the preamble is the same as in data bursts.

The preamble processor does not use symbols that are indicated as erased.

The preamble processor outputs to the MAC chip 56 in FIG. 1 the frequency offset and received power of each burst. This can be done by control circuitry 222 or by the MAC chip 56 in FIG. 1 reading registers in the preamble processor via bus 54 and passing along the data to the MAC process 60 by sending it to computer 58. FIG. 8 is a more detailed block diagram of the connection to the preamble processor 91.

Control Registers In The Preamble Processor
Frequency offset enable/disable in SCDMA mode: When SCDMA mode is active, the frequency-offset calculation can be disabled.

The received preamble symbols are read in the order they are received and not interleaved. In SCDMA mode the received preamble symbols are read from the frame buffer over the spreading intervals, where all the symbols from the first spreading interval are read first.

The preamble buffer symbols are read according to directions from the interleaver and converted to a complex signal by a mapper.

Note that when the number of preamble symbols is above 32 the preamble processor processes only 32 symbols. In SCDMA mode the preamble processor does not choose all the symbols from one spreading interval in the preferred embodiment. It takes only about (total preamble_symbol #)/(spreading_interval #) symbols from each spreading interval.

The preamble processor outputs a preamble SNR, which is an indication of the quality of the received preamble symbols. The preamble SNR is a number proportional to the received SNR of the preamble symbols or is an indication for collision when the SNR is very low. In order to simplify the implementation only the phase SNR is calculated.

The preamble symbols in DOCSIS 1.0 bursts are programmed as 16-QAM symbols when the data uses 16-QAM modulation. The MAC should program the preamble pattern memory into the BPSK or QPSK constellation points out of the 16-QAM points.

In 16-QAM mode, the preamble symbols are chosen to be a subset of the 16-QAM constellation. It can be the 4 extreme points, which have power above the average.

MAC Limitations

In SCDMA bursts, the preamble symbols should be limited to one frame, because the demodulator 14 in FIG. 1 uses the phase and gain obtained from the preamble to detect the data symbols received in the same frame. There is one exception to this requirement; which is when all the symbols of the burst in the frame are preamble and there are no data symbols in that frame. Then the preamble can extend to the next frame.

The preamble length for all the bursts except training will be equal or less than 64 symbols in the preferred embodiment.

In TDMA mode, the preamble symbols are not interleaved. They are interleaved only in synchronous TDMA and SCDMA bursts, so in embodiments which can receive STDMA bursts, the preamble processor either includes a deinterleaver or an interleaver that interleaves the preamble symbols programmed into the preamble pattern buffer (not shown) so that they are interleaved in the same way as the received preamble symbols.

The preamble processor needs to finish processing the preamble data before the next preamble of a burst arrives.

The are 2 worst cases to deal with when the symbol rate is 5.12 Msps:
The smallest burst with minimum number of preamble symbols.
The smallest burst with maximum (32) number of preamble symbols.

In the preferred embodiment, symbols are written into the burst buffer without correction because the rotational amplifier coefficients are obtained only after reading all the symbols of each spreading interval. In order to correct the symbols before writing them into the burst buffer, in alternative embodiments, another read phase is made of the symbols of the spreading interval stored in the frame buffer 228. In TDMA mode a smaller portion of the frame buffer is used to store symbols to be processed by the preamble processor and rotational amplifier.

Rotational Amplifier 143

The rotational amplifier 143 functions to calculate fine tuned gain, phase and frequency offset correction factors using initial values for these correction factors calculated by the preamble processor 91, and uses the fine tuned values to correct at least the data symbols of each burst. For training bursts, the preamble symbols are corrected and stored in the equalizer buffer 232 for use in developing equalization coefficients for the upstream transmissions of the transmitter of the CM that sent the training burst. The data symbols of training bursts are corrected and stored in the burst buffer 238. For data bursts after training has been accomplished, the data symbols of the burst are corrected and stored in the burst buffer 238, and the equalization circuitry (232, 234 and 236) is bypassed.

When a burst continues to the following frame and there is no new preamble, the R/A loop should continue to track the data without getting new initial values.

The tracking loops of the rotational amplifier are decision directed (DD) since the initial values obtained from the preamble processor 91 are accurate enough. Samples marked with erasure bits by the impulse detector and not used by the tracking loops of the rotational amplifier.

In SCDMA mode, the input symbols to the R/A 143 are read from the frame buffer over the codes of each spreading interval. The input symbols include also the received preamble symbols. For each spreading interval, the R/A outputs a complex number which is used to correct all the symbols of the spreading interval. For each spreading interval, the current R/A coefficient corrects all the symbols. The error is averaged over all the symbols per spreading interval, and the loop filter is run only once per spreading interval.

In ranging request and TDMA mode, the R/A corrects each symbol gain and phase of TDMA training bursts and TDMA payload bursts. In SCDMA mode, the amplitude and phase corrections are done for each group of symbols. The symbols in a spreading interval are divided into small groups. The temporary R/A coefficient obtained from the small group of symbols will correct all the symbols in that group.

The R/A correction is done in a pipeline, which requires a double buffer of about 8 symbols. Note that tracking high frequency phase noise and AM hum are better when the correction is done after the R/A coefficient is corrected based on the symbols at the spreading interval.

Outputs generated by the rotational amplifier sent to the
  MAC chip 56 in FIG. 1 for monitoring by the MAC process are:
SNR per burst: The SNR of each burst is estimated by averaging the error signal, which is the difference between the received symbol and its hard decision in the decoder. The control circuitry has a look-up table to convert the error value to SNR in dB. The initial SNR for the averaging can be the preamble SNR.
Averaged SNR: MIB for the average Signal/Noise of the upstream channel. The average is done via the moving average scheme in some embodiments.
SNR per code: The average SNR for a predefined code is output for measurement of the SNR as required by a test defined in the DOCSIS standard.

Note the SNR should not include the case of collision. The AGC 89 does not get the burst data when a collision is detected in the start of burst detector 226.

The constellation points I & Q output by R/A 143 may be output to external pins for testing purposes.

The data output resolution to the equalizer 234 is 12 bits, but the output going to the burst buffer 238 is the same as the TCM decoder, which is 9 bits.

When Tomlinson/Harashima (T/H) clipping is on at the CM, the slicer constellation is extended and the slicer should deal with more constellation points. This extended slicer has an ENABLE signal in order to switch it off in the preferred embodiment, but not in other embodiments.

In order to save processing time, only the data symbols will be processed by the R/A (except for training burst which are long enough >64 symbols). In TDMA bursts, the initial phase of the first symbol will be calculated based on the preamble processor calculated initial phase and frequency.

Burst Buffer 238

The burst buffer is used as a pipeline in order to allow the TCM decoder 246 more time to process the data. Otherwise, the TCM decoder, the preamble processor 91 and the rotational amplifier 143 will have to finish processing the data in one frame. If the TCM decoder is fast enough this burst buffer 238 pipeline stage is not necessary.

The burst buffer size is about 3 frames so it can store approximately two bursts. The bursts are output from the burst buffer in FIFO order.

Each burst is stored with its burst attributes, which define all the burst parameters such as modulation, TCM type and RS code parameters, etc.

The data in the burst buffer is read according to a deinterleaving algorithm by the inner deinterleaver 240 to deinterleave whatever interleaving was implemented in the transmitter.

Processing Steps For Each Burst

1. Inter-burst ISI correction is optionally performed by the optional ISI canceller 231 which is useful to eliminate intersymbol interference between SCDMA bursts transmitted from different CMs that are not exactly aligned in time with each other. The ISI canceller is also optional in embodiments which can receive STDMA bursts.

2. After processing by the start of burst detector 226, the time of the beginning of the burst is known. The length of the preamble UW is also known. Thus, timing and control circuitry 222 controls switch 237 to couple the preamble processor 91 to receive the samples of the UW symbols for an interval corresponding to the length of the preamble. The preamble processor 91 deinterleaves (only when necessary) and processes the preamble symbols and outputs to the rotational amplifier 143 via data path 239 initial phase, gain and frequency offset values. These initial offset correction values are used by the rotational amplifier 143 to develop more refined phase, gain and frequency offset correction factors for the CM that sent the burst, and are developed for every burst and not just training bursts since every burst has a preamble. These offset correction factors are used to correct phase, amplitude and frequency offset errors in every burst. The rotational amplifier also controls the gain of the received symbols and recovers the upstream carrier for use in demodulating the received signals.

After processing the preamble to develop the initial offset correction factors, the switch 237 is switched to couple the AGC and carrier recovery circuits 89 and 230 to receive the symbols of the burst sent following the preamble. The AGC circuit 89 then, starting from the initial gain offset sent to it by the preamble processor 91, tracks and corrects for the gain offset of the data symbols of the burst from this particular CM. The carrier recovery circuit 230 is a second order loop which, starting from the initial phase and frequency error offset correction factor derived by the preamble processor, tracks and corrects for the carrier phase and frequency offset of the data symbols from this particular CM. These errors are caused by CM carrier synthesizer drift and the difference in its path length to the CMTS as compared to the paths lengths experienced by other CM bursts that are at different distances. When preamble symbols are not available, the refinement of the initial gain, phase and frequency offset error correction factors by the rotational amplifier is skipped.

Data Flow in SCDMA Mode

The data of each SCDMA frame is written into the sample buffer 93 at constant rate of 2 samples per symbol by the arbiter. The SCDMA burst data is read burst by burst from the sample buffer 93. In order to minimize the latency, the start of burst (SOB) detector 226 starts processing the sample buffer preamble symbols after one column (spreading interval) is written into it. The SOB is not required to wait until the full frame is written to begin its processing to determine the location of the start of the burst relative to the assigned minislot number. The Start of Burst detector and the timing recovery 224 preferably finish the processing of each burst in one burst time. The timing recovery circuit 224 writes into the frame buffer 228 over codes (in columns). The frame buffer 228 can store two bursts, where the maximum number of symbols is two frames. The preamble processor 91 and the AGC 89 and carrier recovery 230 have to finish processing each SCDMA burst in one burst time.

The preamble processor 91 reads the preamble symbols from the frame buffer 228 by columns. The preamble processor starts reading the preamble symbols immediately after the first column is written into the frame buffer by the timing recovery circuit 224 to minimize latency. The data of each SCDMA frame is written into the sample buffer 132 at constant rate of 2 samples per symbol.

The AGC 89 and carrier recovery 230 circuits read from the frame buffer over columns. Each burst is written into the burst buffer 238 or the equalizer buffer 232 for data bursts and training bursts, respectively. At junction 241, the data from a burst is presented at the inputs of both the equalizer buffer 232 and the burst buffer 238. The timing and control circuit 222 controls into which buffer the data is written by selectively enabling one buffer or the other depending upon the type of burst. Ranging bursts are stored in the equalizer buffer 232 and processed by the upper line of circuits including the equalizer 234. Data bursts are stored in the burst buffer 238, and are processed by the lower line of circuits including the TCM decoder 246. Also a rotational amplifier coefficient register (not shown) that stores phase, amplitude and frequency correction factors developed for each burst is output to the MAC process 60 for each burst.

Equalizer 234

A summary of the operation of the equalizer 234 is as follows. The equalizer is only sent training bursts in the embodiment shown in FIG. 6, but in other embodiments, such as symbolized by FIG. 14, the equalizer is also used to receive TDMA and SCDMA spreader-on data bursts and functions to further improve the reception of those bursts. This is done in the manner described below under the heading Equalizer and Predictor to Filter Data Bursts.

Figure 14:
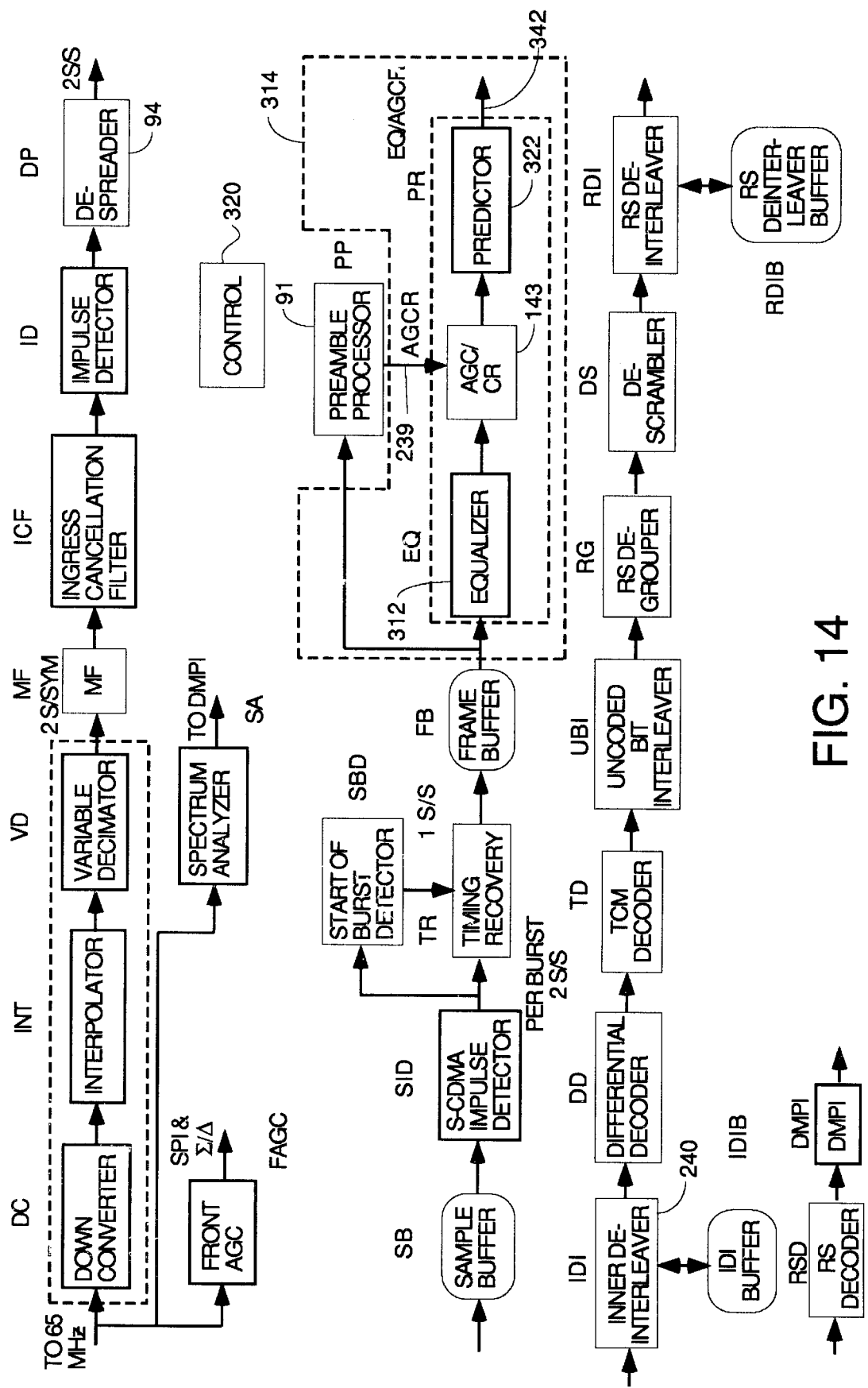
FIG. 14 is a block diagram of a preferred embodiment for the front end and back end circuitry including an equalizer and predictor which are used not only to develop equalization coefficients but also to filter data bursts.

The function of the equalizer in the embodiments of both FIGS. 6 and 14 is to develop upstream equalization coefficients from the training burst preambles. These upstream equalization coefficients are then sent down to the CM that sent the training burst and are then convolved with the existing equalization coefficients in the CM to develop new upstream equalizer filter coefficients to equalize the upstream channel for that particular CM. Subsequent data bursts are filtered in the CM using a preemphasis or equalization filter having these new equalization coefficients so as to compensate for echo and other impairments.

The data portion of each training burst is stored in the equalizer data buffer 236, and the preamble portion is input to the equalizer 234 from storage in the equalizer buffer 232. The equalizer does a coarse equalization convergence on a first pass. After coarse equalization, the data portion of the training burst is passed through the equalizer as a filter using the coarse equalization coefficients just derived to correct the data symbols that identify the CM that sent the training burst. The corrected data symbols are then passed on line 237 to the TCM Viterbi decoder 246 through the inner deinterleaver 240 (which may be bypassed if the data is not interleaved) and the differential decoder 242 (which is bypassed for training bursts).

The equalizer 234 processes the data of the preamble of each training burst by columns to develop upstream equalization coefficients for the CM that transmitted the burst. The equalizer should start processing the data after one column (or even one symbol) of data is available in the equalizer buffer 232. This process is called coarse equalization.

The equalizer 234 continues with fine equalization process iterations on the preamble data until a new training burst arrives or the processing is finished.

The bursts are output from the burst buffer 238 and the equalizer data buffer 236 according to the order they were received (FIFO mode). Note that while the equalizer processes the training burst, the burst buffer can continue to output other previous data bursts to the inner deinterleaver 240 and the TCM Viterbi decoder 246.

The equalizer has two modes of operation:

TDMA: used for TDMA mode and TDMA training bursts in SCDMA mode, and, in the preferred embodiment, SCDMA spreader off bursts are processed like TDMA bursts SCDMA: used for periodic station maintenance in SCDMA mode, and, in the preferred embodiment, SCDMA spreader on bursts. In SCDMA mode, the symbols are processed over codes and in TDMA mode the symbols are input sequentially over time. Processing over codes in SCDMA modes occurs on a per spreading interval basis. The equalizer makes use of the cyclic properties of the spreading codes, and can process the data after despreading of the received signal. Each spreading interval is processed separately. To do this, at the beginning of each spreading interval, the equalizer's filter coefficient registers are reset. Next, equalization convergence is done on the despread data on all the codes except code 0 in a fashion similar to the equalization convergence process on a TDMA burst.

The equalizer can be a linear equalizer (FFE) or a decision feedback equalizer (DFE).

In TDMA and SCDMA modes, the rotational amplifier 143 has already corrected the phase and the amplitude of the stored symbols in the equalizer buffer 232.

Recall that the noise detection circuitry upstream marks some symbols with erasure indications if there is a possibility they are corrupted. Each such erasure indication is input to the equalizer in order to prevent updating the taps using erased symbols.

In some embodiments, the received preamble symbols are recycled through the equalizer during the fine tuning of the equalization filter coefficients until a new training burst is received or until the preamble symbols are recycled N number of times as set by the cycle number parameter. The recycling enables the equalizer to converge utilizing a short training burst. If a new training burst arrives prior to completion of all the cycles, the calculation is terminated and the interim result is latched with reduced accuracy. The equalizer does not process the data portion at the end of each TDMA data burst in the embodiment of FIG. 6.

There are 3 types of training bursts:
Ranging (initial station maintenance) in TDMA mode
Periodic training in TDMA mode
Periodic training TDMA training bursts in SCDMA mode (only SCDMA mode)

In order to reduce the complexity, the equalization process has two programmable convergence step sizes: a larger step size for coarse equalization convergence, and a smaller step size for fine equalization convergence.

Coarse equalization: the equalizer uses a larger, programmable adaptation step value and adapts only 4 of the most significant FFE (out of 8 total FFE tap coefficients) and 4 of the most significant FBE (out of 16 total FBE taps) coefficients, although in alternative embodiments, any other number of coefficients can be used and the step size can be fixed and larger than is used in the fine equalization. If there is no new training burst the equalizer continues to the fine equalization mode. This mode needs to be finished before the following training burst (if available) is processed. When there are two consecutive training bursts, as may occur in ranging, the equalizer will adapt only 8 coefficients.

Fine equalization: the equalizer uses a smaller, programmable adaptation step value and all the 24 FFE and FBE coefficients are adapted. In alternative embodiments, the step size can be fixed and smaller than is used in the coarse equalization. The equalizer switches to this step automatically after filtering the data portion of the training burst using the results of the coarse equalization. There is a programmable register that controls the number of cycles in fine equalization.

A better equalizer implementation in an alternative embodiment shown in FIG. 14 employs phase correction inside the equalizer. The phase correction loop processes the data after the FFE. This gives better performance because the phase is corrected after equalization. The equalizer outputs the carrier frequency offset too in addition to the equalization coefficients in this alternative embodiment for transmission to the CM to adjust its frequency.

The equalizer outputs to the MAC process are:
Equalizer coefficients (8 FF & 16 FB)
Equalizer final SNR
The equalizer control parameters which are programmable are:
Adaptation step for coarse equalization
Adaptation step for fine equalization
Cycles number for fine equalization
Enable/disable DFE & FFE (for testing)

The tap coefficient initial values are programmable so the CPU can load initial values for all the coefficients into initial coefficient registers. Each time the equalizer starts processing a new burst, it will initialize the coefficients using the initial coefficient registers. The default value is 0.5 for the main tap and the rest are zeros.

In the preferred embodiment, the main tap location for linear FFE is programmable for DOCSIS 1.0.

Figure 12:
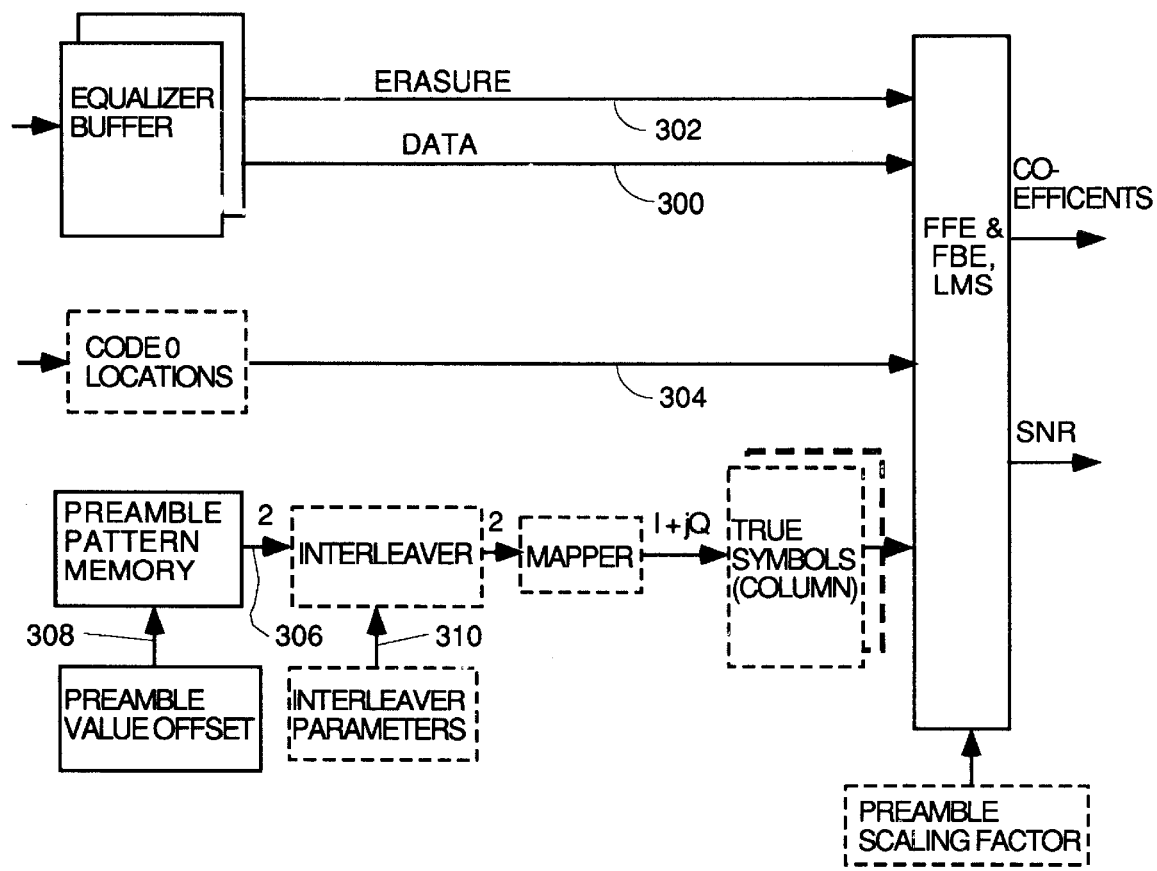
FIG. 12 is a more detailed diagram of the connections of the equalizer.

The equalizer main inputs, as seen in FIG. 12 are:

Data on line 300
Erasure bit on line 302
The equalizer control inputs are:
Code 0 location per spreading interval (in SCDMA mode) (up to 32 complex values) & training burst offset code number on line 304
TDMA/SCDMA training burst mode (not shown)
Preamble Pattern memory (1536 bits) on line 306
Preamble Value Offset on line 308
Interleaver parameters (for preamble) (Codes per Subframe, Symbol Step Size, Spreading Intervals per Frame, SCDMA Interleaver Enable/Disable) on line 310.

FIG. 12 is a more detailed diagram of the connections of the equalizer. Circuits surrounded by dashed lines are used only to process SCDMA training bursts. The preamble scaling factor is only used in some alternative embodiments.

The data portion of the training bursts is transferred to the burst buffer 238 and the TCM decoder 246 for decoding and to the equalizer buffer 232 for equalization.

Code 0 Effect on the Equalizer

Code 0 is not a cyclic shift of the other codes like every other code. Therefore, the equalizer should not use the symbols transmitted in code 0 and needs to know in which minislot code 0 data was transmitted. The location of code 0 for each spreading interval needs to be transferred to the equalizer from the code-hopping circuit 96 in FIGS. 5 and 7 in embodiments where code hopping is used. Therefore, the equalizer 234 has to have a memory that stores all the code hopping offsets of the frame, up to 32 values of 7-bit each. An alternative embodiment approach is to implement a code hopping random number generator in the equalizer block. When the equalizer recycles the data, the random number generator has to be initialized properly. When the number of active codes is less than 128, code 0 is not used, so the above described circuitry is not necessary if the number of active codes is always less than 128. All the other codes in the sample buffer are cyclic shifts of each other including the pair of code 1 and code 127.

While the TCM Viterbi decoder is doing its decoding, the equalizer re-runs the preamble bits of the training burst that are stored in equalizer buffer 232 iteratively to do a fine tuning equalization process. In some embodiments, the equalizer can re-run both the preamble bits and the data bits of the training burst through iteratively to converge on final adaptive equalizer filter coefficients to be convolved with the existing adaptive equalizer coefficients in the CM that sent the training burst for developing new adaptive coefficients for its subsequent upstream bursts.

This fine equalization process results in final equalization coefficients that are output and/or stored for transmission downstream to the CM that transmitted the training burst. The MAC process then sends the equalization coefficients just derived to the CM that sent the training burst in a downstream message. The coefficients of the equalizer 234 are then initialized to receive the next training burst.

When subsequent data bursts are sent from a CM which has received its upstream equalization coefficients previously derived by the equalizer 234, the data bursts are stored in the burst buffer 238 and the equalizer 234 does not filter them in the embodiment of FIG. 6 since they were equalized at the CM transmitter.

The T-spaced equalizer 234 is an 8-tap FFE filter and a 16-tap FBE filter. A least mean squares algorithm updates the taps. The resampler and the rotational amplifier 143 correct the symbol time, gain, phase and frequency before the data gets to the equalizer. This accelerates the equalizer convergence. The time offset and the equalizer coefficients are calculated using the same training burst.

Equalizer and Predictor to Filter Data Bursts

Referring to FIG. 14, there is shown an alternative embodiment for the equalizer which uses only one data path through the equalizer for both training bursts and data bursts. In this embodiment, the circuitry inside dashed line 314 replaces the circuitry inside dashed line 316 of FIG. 6. For training bursts, the equalizer 312 can process the preamble to converge on equalization coefficients in the same way as described above starting from programmable coefficients and using programmable step size and multiple passes for both coarse and fine equalization stages. In alternative embodiments, any prior art equalization process performed on the preamble to converge on equalization coefficients will suffice. The preamble processor 91, in the preferred embodiment, has the same structure and function as in FIG. 6 as does the rotational amplifier circuitry 143 comprised of an automatic gain control circuit and a carrier recovery circuit to correct amplitude and phase errors, respectively. The preamble processor 91 processes the preamble symbols of every burst and outputs initial phase, gain and frequency offset correction values to the rotational amplifier 143 via data path 239. The initial gain offset factor is used to initialize the automatic gain control circuit of the rotational amplifier, and the initial phase offset correction factor is used to initialize the phase of the carrier recovery circuit within the rotational amplifier. These initial offset correction values are then used by the rotational amplifier 143 to develop more refined phase, gain and frequency offset correction factors from the preamble of the same burst processed by the preamble processor for the CM that sent the burst. These fine tuned offset correction factors are developed from the preamble of every burst including both training and data bursts. Once developed by the rotational amplifier from the preamble of the burst, these fine tuned gain, frequency and phase offset correction factors are used by the rotational amplifier to correct phase, amplitude and frequency offset errors in the data portion of the burst. When another burst arrives from a different CM, the preamble processor processes the preamble and develops the coarse phase, frequency and amplitude error correction factors and sends them to the rotational amplifier which fine tunes these offset correction factors using the preamble data to factors specific to the CM the sent the second burst. The data portion of the second burst is then corrected using the new, fine tuned offset correction factors.

Figure 15:
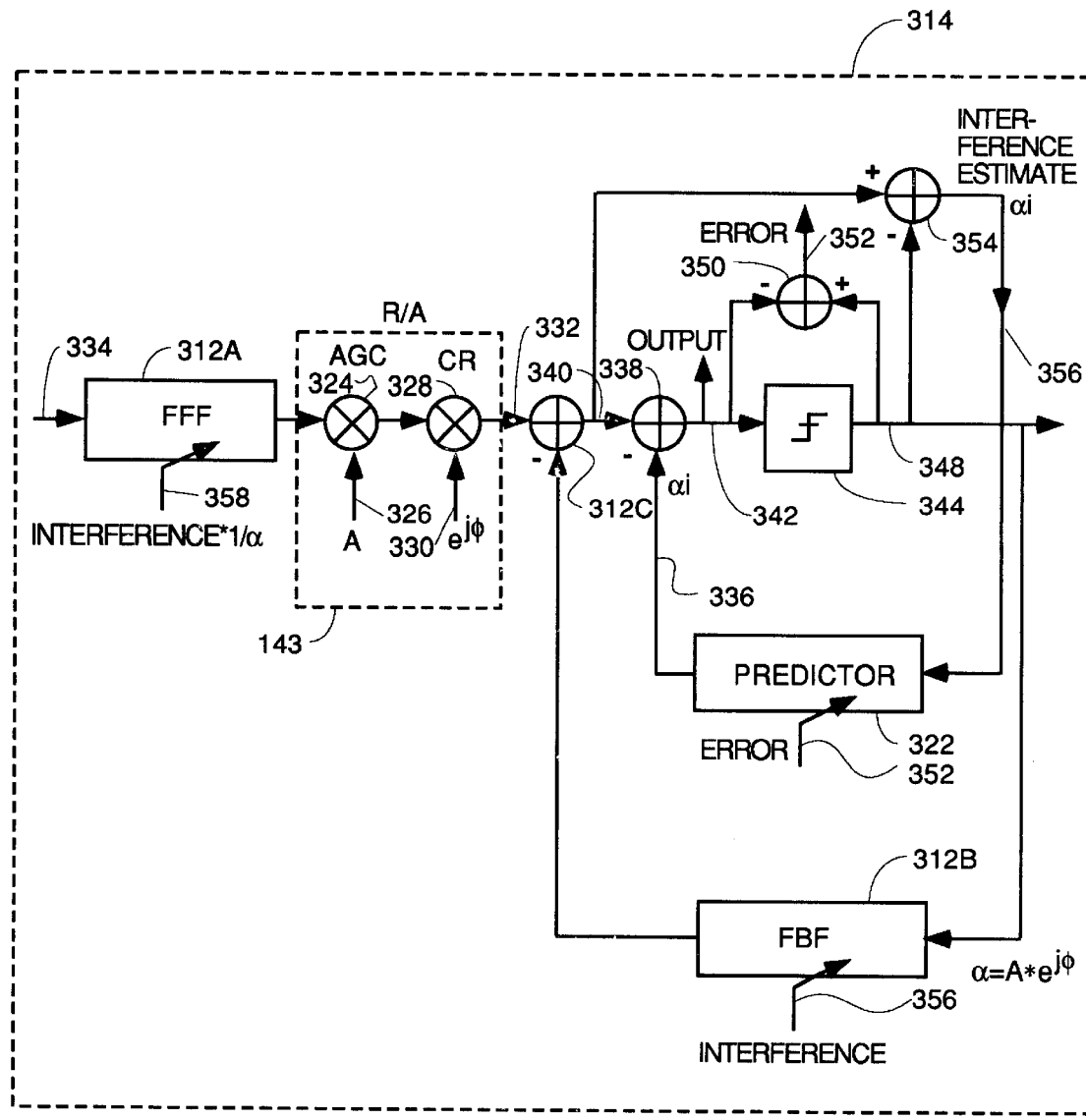
FIG. 15 is a block diagram of an equalizer, predictor, rotational amplifier and preamble processor circuitry within dashed line 314 in FIG. 14 which is useful for filtering TDMA and SCDMA spreader-off bursts.

The rotational amplifier is a one tap equalizer essentially. The details of the rotational amplifier as well as the equalizer and predictor circuits within dashed line 314 in FIG. 14 are shown in FIG. 15. The rotational amplifier corrects for gain, phase or frequency offsets. The rotational amplifier also recovers the upstream carrier for use in demodulating the received signals. The rotational amplifier cannot correct for echoes, so it relies upon the multitap equalizer to do that.

Figure 18:
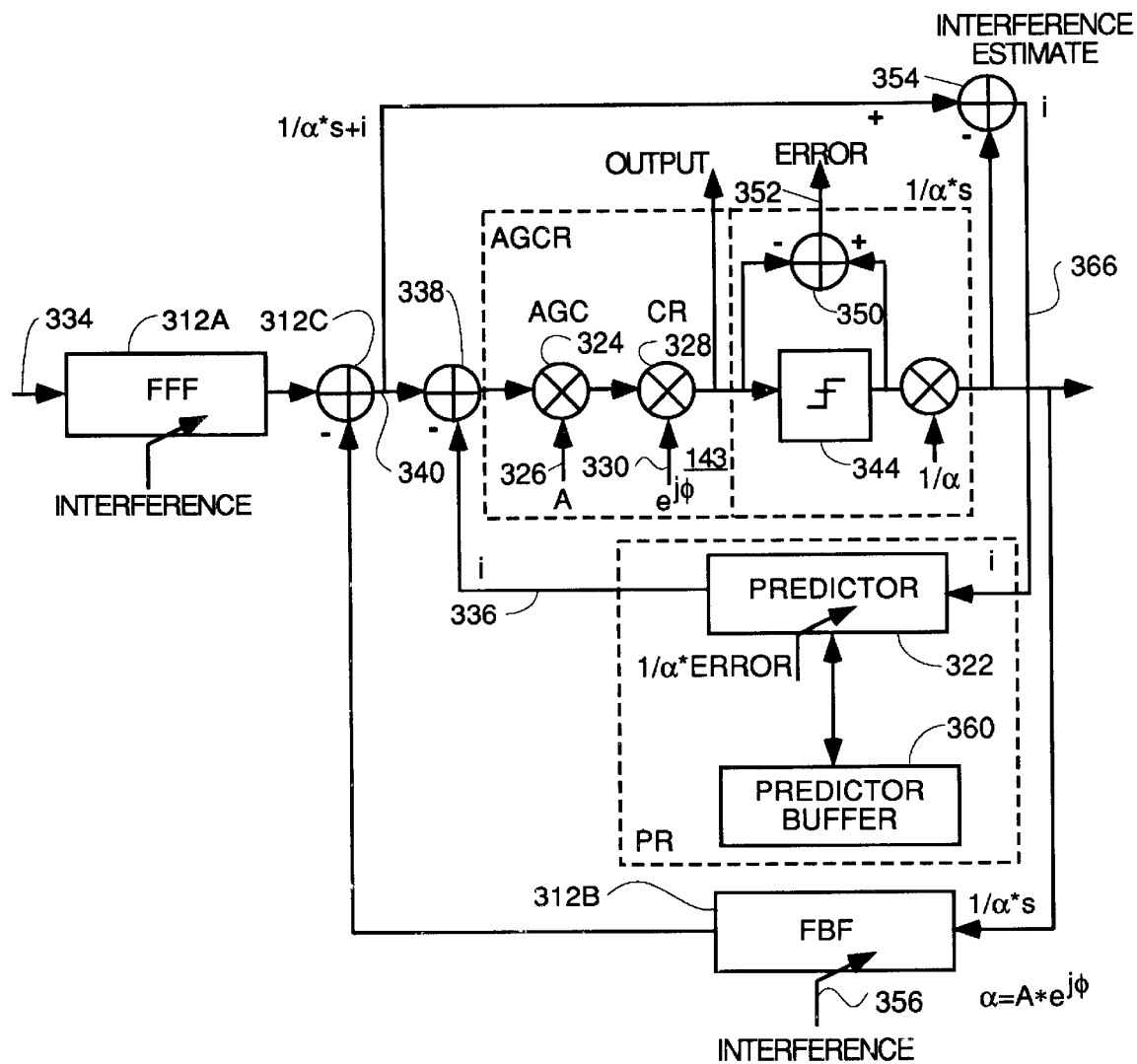
FIG. 18 is a block diagram of the preferred form of an equalizer, predictor, rotational amplifier and preamble processor circuitry within dashed line 314 in FIG. 14 which is useful for filtering SCDMA spreader-on bursts.

The combination of equalizer, predictor and rotational amplifier in the circuitry in box 314 in FIGS. 15, 16 and 18 will be referred to as equalizer means in the claims.

The main difference in the equalizer circuitry of FIG. 14 as compared to FIG. 6 is that equalization coefficients are developed in the FIG. 14 embodiment for data bursts in addition to training bursts. In both embodiments, the phase, amplitude and frequency corretion factors are developed and used by the rotational amplifier 143 on both training and data bursts. However, in contrast to the embodiment of FIG. 6 where the equalization coefficients are developed from training bursts and thereafter are not used to filter data bursts in the CMTS, the embodiment of FIG. 14 develops equalization filter coefficients and uses them to filter both training and data bursts in the CMTS. Basically, the control circuitry 320 controls the equalizer 312 to receive training bursts and develop equalization coefficients from the preamble. These equalization coefficients are used in the equalizer to filter the data portion of the training burst and are sent down to the CM that transmitted the training burst. Then, when data bursts are transmitted by that CM, the data bursts are filtered using a pre-emphasis filter with coefficients derived by convolving the existing equalization coefficients with the new coefficients. This shapes the outgoing bursts. When these filtered data bursts arrive at the CMTS, they are sent to the equalizer 312 and not around it as was the case in FIG. 6. The equalizer 312 then uses the preamble of the data burst to rapidly converge on equalization coefficients which will improve the reception of the data portion of the burst even though equalization filtering has already been done at the CM. Rapid convergence is accomplished by using large, possibly programmable steps during the iterations toward convergence and, in some embodiments, mulitiple rounds of convergence, possibly with ever increasing step sizes.

Convergence on additional equalization coefficients to improve reception is done by resetting the equalizer coefficients at the beginning of reception of the preamble portion of a data burst after the preamble processor has developed its initial phase and amplitude offset correction factors. In some embodiments, these equalizer coefficients can be reset to programmable values, and in other embodiments, the coefficients can be reset to fixed values. Then, the preamble portion of the data burst is passed through the equalizer, and it is allowed to converge. The idea is to converge on equalization coefficients using just the preamble and then use those coefficients to filter the data portion of the data burst. Fast convergence is necessary because the data burst preambles are shorter, so one or more of the following techniques can be used: (1) large (programmable in some embodiments) step sizes for coefficient changes between iterations; (2) multiple passes of preamble data through the equalizer at different step sizes; (3) any other equalization technique that will result in convergence on just the preamble. In some embodiments, a FIFO is used to store the preamble and data portions of each training and data burst and the preamble is run through the equalizer in multiple passes if necessary.

After convergence, the new equalization coefficients in the equalizer's feedforward filter and optional feedback filter are used to filter the data portion of the burst by retrieving the data portion and passing it through the equalizer. In some embodiments, the preamble is passed through the equalizer just once to derive new coefficients. In other embodiments, the preamble of a data burst is passed through the equalizer a first time to derive coarse equalization coefficients, and then the preamble and possibly a portion or all of the data burst passed through the equalizer again multiple times starting with the coarse equalization coefficients in the feedforward and optional feedback fitlers and using smaller step sizes to fine tune the equalization coefficients before the final pass of the data through the equalizer to correct it prior to decoding.

A predictor 322 is used in conjunction with the equalizer 312 to take advantage of the cyclic property of the SCDMA spreading codes so as to process TDMA bursts in time domain and to process SCDMA spreader-on data bursts in code domain after despreading similar to the way TDMA bursts are processed. The use of the cyclic property of the codes in the equalizer and predictor allows simplification of the hardware of the CMTS receiver for reasons explained below, and allows SCDMA spreader-on bursts to be filtered in the CMTS to improve reception with filters that follow the SCDMA despreader 94 whereas in the prior art this could not be done. In the prior art, persons skilled in the art did not believe that an equalization filter could be used on SCDMA bursts after the despreading operation because all the echo information to be subtracted was thought to be lost. Thus no equalization filtering of SCDMA bursts after the despreader was attempted in the prior art. The novelty in the structure of FIG. 14 is, believed to be in the fact that it the same equalizer filter 312 which filters TDMA bursts in time domain may also be used to do equalization filtering of SDCMA bursts in the code domain despite the fact that it is placed after the despreader 94. In the prior art, a separate equalizer to equalize SCDMA bursts, if used, had to be placed in front of the despreader 94. This complicated the receiver because the TDMA burst equalizer located after the despreader could not be used in the prior art to equalize SCDMA bursts so a separate spreader in front of the despreader just for the purpose of equalizing SCDMA bursts had to be included. It is believed to be new here to realize that by making use of the cyclic property of the spreading codes, the same equalizer 312 used to equalize TDMA bursts and located after the despreader can be used to find and remove echoes in the SCDMA bursts. Any number of spreading codes can be used.

An equalizer operates on a TDMA mode signal in time domain to find any echo signals in the received signal that were caused by travel through the channel, and subtracts the echo from the received signal to leave the original signal that went into the channel. However, when a spread spectrum signal has echoes added by propagation through the channel, when the received signal is despread, the echo information was believed in the prior art to be lost. However, where cyclic codes are used for the spreading, the echo information is not lost. Echo signals just shows up in a different code than the originally transmitted signal where cyclic codes were used to spread the spectrum of the transmitted signal.

Recall that in each CM, when a symbol in an information vector to be transmitted as part of an SCDMA burst, the symbol is multiplied by the 128 or so elements of a spreading code, and 128 partial products are generated from that one symbol. Each symbol generates 128 partial products. All these partial products are added together to generate the 128 chips of a result vector. Each chip is a comlex number. The real and imaginary part of every chip are multiplied by digital representations of quadrature RF carriers to generate images and alias images of the signal to be transmitted in both the positive and negative frequency domains. The positive frequency images are converted to a digital to analog converter, and a SAW filter picks one image which is transmitted after amplification.

On the way to the CMTS echoes and other distortions of the SCDMA signal occur on the transmission medium. Each spreading interval, the 128 chips are each multiplied by the 128 elements of the spreading codes as are the signals representing the echoes and noise. The 128 partial products from each multiplication are added together to reassemble the 128 symbols of the information vector, corrupted by noise and with the results from despreading the echoes present in the information vector. If a particular chip in the time domain has an echo, all the chips in that spreading interval will have an echo and that echo will be effectively another received signal that matches the signal during the spreading interval but shifted in time by one chip. We will call the original signal transmitted during a spreading interval signal #1 and the time shifted echo signal signal #2. When signal #1 is despread, each chip contributes partial products to symbols 1–128 in the despread information vector. When signal #2 is despread, that echo energy will contribute partial products to the information vector emerging from the despreader. The echo energy of each chip will be present on the next code from the code used to spread the symbol which had the echo in the code domain but only if the spreading codes are cyclic.

Mathematically, the situation is as follows. Equation (1) represents the transmitted, non noise corrupted signal in the time domain.

$$R=[r(1), r(2) \ldots r(128)] \tag{1}$$

for i from 1–128 where each r(k) is one transmitted chip and R is the vector of chips transmitted during one spreading interval and k is an index in the time domain which defines the position in time of r(k) during the 128 chip times during a spreading interval.

Equation (2) below is the mathematical expression which defines the spreading of each symbol s in an information vector to be transmitted by one code. For simplification, we assume that the information vector has only one symbol s.

$$r(k)=s*C_k^i \text{ for } k=1, \ldots 128 \tag{2}$$

where s is the single symbol in the information vector and $C_k^i$ is cyclic spreading code i in the code set having 128 elements for k=1, ... 128. The multiplication of each of these 128 elements times symbol s creates one of the 128 chips r(k) for k=1, ... 128.

The received signal R' is R from equation (1) above corrupted by an echo of each chip which is delayed by one chip and attenuated by a factor α. The expression the defines the amplitude of each chip signal plus its echo signal (by superposition) is given by equation (3) below.

$$r(k)+\alpha*r(k-1)=s*C_k^i+\alpha*s*C_{k-1}^i \text{ for } k=1, \ldots 128 \tag{3}$$

where α*r(k−1) represents the contribution to the final amplitude of the chip (r(k) from an echo signal of r(k−1) caused by the one chip delay in the echo.

At the receiver, after despreading (multiplying the received chip vector times the columns of the transpose of the code matrix) this received chip signal of equation (3), the output of code i, i.e., the contribution to the amplitude of the symbol s to be recovered from only code i is given by equation (4) below.

$$\frac{1}{128}\sum_{k=1}^{128}((r(k)+\alpha*r(k-1))*C_k^i = \frac{1}{128}\sum_{k=1}^{128}(s*C_k^i+\alpha*s*C_{k-1}^i)*C_k^i \tag{4}$$

approximately

Since the cyclic codes used in this invention are orthogonal (any orthogonal, cyclic code will work) one gets for the output of code i:

$$\text{approximately } s+\alpha*s*0=s \tag{5}$$

The output of the despreading at code i+1 is given by equation (6) below.

$$\frac{1}{128}\sum_{k=1}^{128}(r(k)+\alpha*r(k-1))*C_k^{i+1} = \frac{1}{128}\sum_{k=1}^{128}(s*C_k^i+\alpha*s*C_{k-1}^i)C_k^{i+1} \tag{6}$$

Since the cyclic codes used in this invention are orthogonal, equation (6) reduces to:

$$0+\frac{1}{128}*\alpha*s*\sum_{k=1}^{128}C_{k-1}^i*C_k^{i+1} \tag{7}$$

approximately Using the cyclic property of codes, which is stated mathematically as follows:

$$C_{k-1}{}^{i}=C_{k}{}^{i+1} \text{ for } k=2, \ldots 128 \qquad (8)$$

yields for the output of the next code $$0 + \frac{1}{128} * \alpha * s * \sum_{k=1}^{128} C_{k}^{i+1} * C_{k}^{i+1} = \alpha * s \qquad (9)$$

Hence, the echo of one chip is detected at the despreading of the next code if and only if the spreading codes are both orthogonal and cyclic. The preferred cyclic, orthogonal code to use is the 128 bit code given in Section 6.2.14 of the DOCSIS 2.0 specification the entirety of which is hereby incorporated by reference.

This property is used to advantage to share equalizer 312 in FIG. 14 to filter both TDMA and SCDMA bursts after the despreader 94.

FIG. 15 is a more detailed block diagram of a conventional equalizer, predictor and rotational amplifier circuit that can be used to implement the circuitry inside dashed box 314 in FIG. 14 to process TDMA and SCDMA spreader off bursts. The equalizer 312 in FIG. 14 is comprised in FIG. 15 of a feed forward filter 312A which receives TDMA and SCDMA burst symbols corrupted by whatever narrowband interference which was not removed in the circuits upstream from the equalizer and corrupted by echoes on line 334. The equalizer may also include an optional feedback filter 312B (not required in DOCSIS compliant systems) and a difference calculating circuit 312C. Both filters are conventional digital filters. If only a feed forward filter 312A is used, the taps after the main tap are adapted by a Least Mean Square algorithm based upon an error signal so as to remove the echo error. If both the feed forward 312A and feedback filter 312B are used, their tap or filter coefficients are adapted by the LMS algorithm based upon the error signal on line 352 or the interference estimate signal on line 356 to remove the error. An echo shows up as an error because when the received chips have an echo within the spreading interval, the echo signal is superimposed on each despread symbol as an error over what the symbol was supposed to be in amplitude and phase. Each symbol output from the despreader is considered to be the output of one spreading code. The error in amplitude and phase of each symbol caused by the echo is detected by the slicer 344, and the subtractor 350 generates an error signal, as does the subtractor 354. Either of these signals on lines 352 or 356 can be input to the LMS algorithm to adapt the filter coefficients of the equalizer filers as well as the predictor filters.

The rotational amplifier 143 is comprised of a first multiplier 324 that receives on line 326 an amplitude offset correction factor for the CM that sent the burst and uses it to multiply the I and Q output signals of the feed forward filter 312A to perform an automatic gain control function to correct for amplitude offsets in the burst. A second multiplier 328 receives on line 330 a phase offset error correction factor for the CM that sent the burst and uses this factor to multiply times the I or Q component as necessary of the complex output signal from the AGC 324 to correct for phase offset errors. The rotational amplifier 143 receives the initial values for the amplitude offset correction on line 326 and the phase offset correction on line 330 from the preamble processor 91 in FIG. 14 (which has the same structure as in the Jasper I prior art). After receiving these initial offset correction values for amplitude and phase, the LMS algorithm adapts the offset correction signals on lines 326 and 330 based upon slicer error or interference estimate signals to improve the operation of the rotational amplifier.

The amplitude and phase corrected output signals from the feed forward filter on line 332 are combined in summer 312C with the output of the feedback filter 312B to complete the equalization.

A conventional predictor 322 predicts the interference for the next symbol time from the interference in the previous symbols received, i.e. from the recent history of the interference. This is prediction is based upon the assumption that the interference changes slowly over time. The predictor provides a signal on line 336 which, when subtracted by subtractor 338 from the signal on line 340, yields a signal which has less interferences. The signal on line 342 is therefore an equalized, rotational amplifier processed, predictively processed symbol stream which is output to the inner deinterleaver 240 in the embodiments of FIGS. 14 and 6.

There is still noise in the symbols on line 342 however, so slicer 344 and its associated circuitry are used to generate error signals and interference estimates which aid the equalizer and predictor processing to remove even more noise. The output on line 348 from the slicer is what the slicer thinks is the actual symbol sent, while the signal on line 342 is the noise corrupted symbol that survived the processing by the equalizer, rotational amplifier and the predictor. Each of the predictor 322, FFF 312A and FBF 312B is an adaptive digital filters whose coefficients are calculated and adapted by a least mean squared process (LMS). The LMS process is typically carried out by the control computer 320 which controls the shared back end circuitry or it can be carried out by the MAC or Transmission Convergence layer processes wherever they are in execution. The LMS process also calculates and adapts the coefficients of the rotational amplifier on lines 326 and 330. A difference calculating circuit 350 computes the difference between the slicer output on line 348 and the slicer input on line 342 and outputs an error signal on line 352 which is supplied to a least mean squared process (LMS) running on a control computer that controls the operation of said shared demodulator circuit (or any other computer) to adapt the coefficients. The LMS process uses the error signal to adapt the coefficients of the FBF 312B, predictor 322, FFF 312A, and rotational amplifier 143, and supplies the new coefficients on lines 356, 352, 358, 326 and 330, respectively. The output of the slicer 344 on line 348 should be zero during processing of symbols transmitted on unused codes. Because unused codes are present before every burst, the symbols transmitted on these unused codes are used to calibrate the slicer. Whenever a symbol transmitted on an unused code is processed by the slicer, the output on line 348 is adjusted to 0+j if the output level is anything other than this.

A difference calculating circuit 354 computes the difference between the slicer output 348 and the output of the equalizer at line 340 taken at a point before the subtractor 338 subtracts the predictor error correction signal. The difference calculated by subtractor 354 is an estimate of the remaining interference in the signal which has not been removed by the equalizer filters. This interference estimate signal on line 356 is supplied to the predictor.

Slight modifications to the structure of FIG. 15 are necessary to implement an equalizer, rotational amplifier and predictor for filtering SCDMA spreader on data bursts. Those modifications are shown in FIG. 16. Each structure which has the same reference number as a circuit in FIG. 15 has the same structure and purpose as the like numbered circuit in FIG. 15. The main differences between FIG. 15 and FIG. 16 are the presence of the predictor buffer 360 and the addition of the multipliers 362 and 364. The predictor buffer is used only on SCDMA spreader-on bursts. It stores the state of the predictor filter 322 at the end of each spreading interval per burst. The predictor buffer also stores the adapted coefficients of the predictor filter 322 after the first spreading interval of the frame per burst. The error signal on line 352 is fed to the Least Means Squared (LMS) algorithm to adapt the predictor coefficients (tap weights of the FIR digital predictor filter). The interference estimate signal on line 356 is the error signal fed to the LMS algorithm to adapt the coefficients of the equalizer filters. In some embodiments, the error signal on line 352 is used to adapt the equalizer filter coefficients. The use of the LMS to adapt the filter coefficients is the same in the embodiments of FIGS. 15, 16 and 18. There is also a difference in how the circuitry of FIG. 16 is controlled relative to how the circuitry of FIG. 15 is controlled.

The initial state and the initial filter coefficients of the predictor 322 are established during the null burst which precedes the first SCDMA burst in most SCDMA frames. The null burst is the symbols transmitted on unused codes 371 in FIG. 17. The symbols of this burst contain no data, so any amplitude and phase they have over the no data complex value of 0+j*0 must be noise. When the null burst arrives, the error signal on line 366 (the slicer error sans the rotational amplifier correction) is fed into the predictor as its initial state. Likewise, the slicer error signal on line 352 is fed to the LMS algorithm and is used to adapt the filter coefficients of the predictor filter 322 to initial values. Thereafter, as payload SCDMA bursts are received, the state of the predictor and its filter coefficients are altered and adapted in accordance with the algorithm for equalizing SCDMA bursts given herein to subtract out noise from symbols that are output on line 342 and input to the slicer. FIG. 18 works in the same way.

Figure 17:
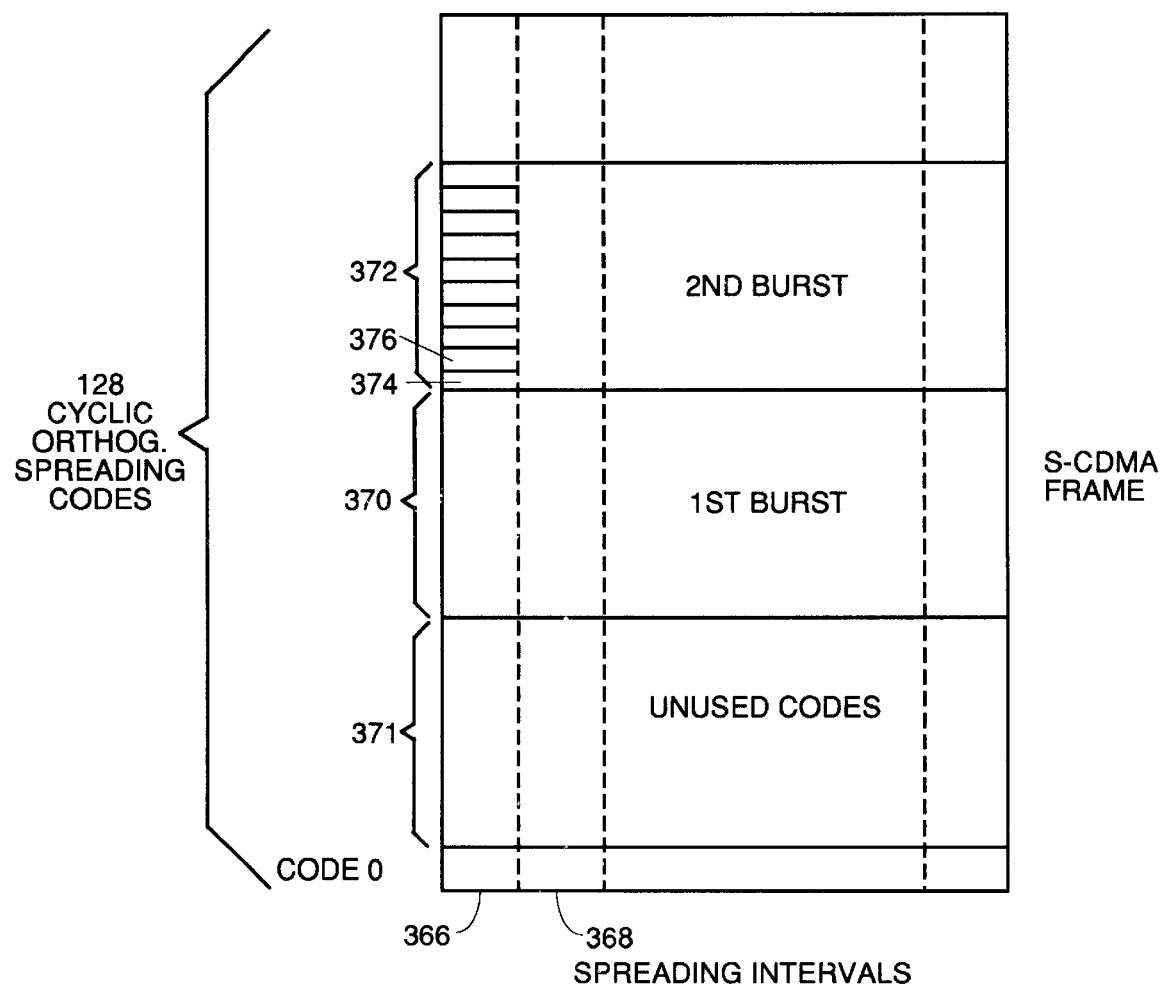
FIG. 17 is a diagram of an SCDMA frame used to illustrate how control of the circuit of FIGS. 16 and 18 is implemented to process SCDMA bursts.

FIG. 17 is a diagram of an SCDMA frame which is useful for explaining the operation and control of the circuit of FIG. 16 to use the cyclic property of th orthogonal spreading codes to be able to equalize SCDMA spreader on bursts after despreading by finding and removing echoes. Column 366 represents one spreading interval and the vertical dimension represents the transmitted symbols in first and second bursts, possibly from different CMs, and with the spectra of the symbols in each burst spread by different sets of spreading codes in a set of 128 cyclic, orthogonal spreading codes with code 0 in the bottom row. The first burst codes are represented by bracket 370 and the second burst codes are represented by bracket 372. The first and second bursts are transmitted simultaneously during each spreading interval and are separated out at the CMTS receiver by the despreader.

The equalizer circuitry in box 314 in FIG. 16 processes one SCDMA burst at a time, and processes the symbols of the burst one symbol at a time. So if the second burst is processed first, symbol 374 will be sent through the equalizer followed by symbol 376, etc. When all the symbols in spreading interval 366 have been equalized, corrected in the rotational amplifier and predictively processed, all the states (shift register contents) are reset and the symbols from the next spreading interval are processed one at a time. Symbols that do not carry data because no modem transmitted data or because they are transmitted on unused codes such as codes indicated at 371 in FIG. 17, are used to calibrate the slicer zero point to improve the performance of the predictor and equalizer. This is done by calibrating the slicer output to output 0+j*0 when a symbol that carries no data is transmitted during a chip time.

At the beginning of each SCDMA frame, the states of the FFF filter 312A and FBF filter 312B and the predictor filter 360 are set to zero. After finishing processing the symbols of the spreading interval, the state of the predictor filter 322 is stored in the predictor buffer 360. The stored state will be used by the same spreading interval of the following burst in the same frame. The adapted predictor filter coefficients 322 after the first spreading interval only are stored in the predictor buffer. The stored predictor coefficients will be loaded into the predictor filter 322 in the first spreading interval of the next burst of the same frame. For SCDMA spreader on bursts, the predictor state is the interference estimate on line 356 without the rotational amplifier amplitude and phase correction $\alpha=A*e^{j\Phi}$. It is the function of the multiplier 364 to remove the amplitude and phase correction of the rotational amplifier from the state of the predictor for the embodiment of FIG. 16. By removing the CM dependent phase and amplitude correction, the predictor state for one burst can be reused as the initial predictor state for the next burst which might come from a different CM.

Since the predictor coefficients can change between spreading intervals, only the predictor filter coefficients after the first spreading interval are stored in the predictor buffer 360. For the following bursts in the same frame (transmitted simultaneously, but processed one at a time in the shared back end demodulator by use of the front end buffers and the arbiter retrieving one buffer at a time), the coefficients for the predictor filter 322 are retrieved from the predictor buffer 360 at the beginning of the first spreading interval.

The predictor filter coefficients for processing SCDMA spreader on bursts are also used to process spreader off and TDMA bursts. The equalizer and predictor filters are not used to filter the symbols of code 0. For SCDMA spreader on bursts, the equalizer processes each spreading interval separately, and outputs the filtered symbol data after each spreading interval.

More precisely, the process which controls the circuitry in box 314 carries out the following steps. The control process is implemented in a state machine in the preferred embodiment, but it can be implemented in a programmed computer in other embodiments. The object of the control process is to control the states and coefficients of said digital equalizer and predictor filters to filter the symbols of one or more synchronous code division multiplexed (SCDMA) bursts in an synchronous code division multiplexed (SCDMA) frame during which one or more SCDMA bursts are transmitted simultaneously during one or more spreading intervals. The filtering process to filter the symbols of each burst is carried out one SCDMA burst at a time and one spreading interval at a time. The states and coefficients of said digital equalizer and digital predictor filters are controlled by performing the following steps:

(1) at the beginning of each SCDMA frame, the states of said equalizer filter and said predictor filter are set to zero;

then, at the beginning of a first spreading interval in an SCDMA burst, the following steps are performed:

(2) predetermined predictor filter coefficients are loaded into said digital predictor filter, where the predetermined predictor filter coefficients are the adapted predictor filter coefficients stored in the predictor buffer at the end of the first spreading interval of the previous SCDMA burst in the same SCDMA frame;

then at the end of each spreading interval of an SCDMA burst, the following step is performed:

(3) the state of the digital predictor filter is stored in the predictor buffer either in a location dedicated to storing the state of said digital predictor filter for the spreading interval just processed or with tag data identifying the spreading interval number of the spreading interval just processed;

at the beginning of each spreading interval of an SCDMA burst, the following steps are performed:

(4) the state of the digital predictor filter is loaded with the state stored in the predictor buffer of the digital predictor filter at the end of the same numbered spreading interval of the previous SCDMA burst within the same SCDMA frame;

(5) the state of said digital equalization filter(s) are loaded with all zeros;

at the beginning of only the first spreading interval of a burst, the following step is performed (6) the filter coefficients of the digital equalization filter are set to default values, and thereafter filter coefficients are adapted by a Least Means Squared algorithm during each spreading interval of the burst based upon slicer error signals;

and for each SCDMA burst (7) filtering each symbol of each spreading interval of said SCDMA burst using said digital equalization filter;

(8) subtracting from each filtered symbol output from step (7) a corresponding output of said digital predictor filter to compute an output symbol;

(9) inputting each symbol output by step (8) into a slicer and comparing the input to said slicer to an output of said slicer to develop an error signal;

(10) subtracting the output of said slicer from each symbol output by step (7) to calculate an interference estimate signal;

(11) inputting each said error signal into a least mean squares (LMS) calculation process and using the results of said LMS process to adapt said filter coefficients of said digital predictor filter; and

(12) inputting each said interference estimate signal or said error signal into a least mean squares (LMS) process, and using the results of said LMS process to adapt the filter coefficients of said digital equalization filter.

The control process also includes the following steps in the preferred embodiment to use the null bursts to calibrate the slicer and set the initial state and filter coefficients of the predictor filter:

(13) receiving symbols transmitted on unused codes which bear no data and processing said symbols according to steps (1) through (12) in the above process;

(14) examining the output of said slicer as each symbol which bears no data is processed thereby and calibrating said slicer to have an output of 0+j*0;

(15) loading the interference estimate signals on line 366 into the predictor filter as its initial state as a null burst is received; and

(16) using the error signal on line 352 or, in some embodiments, the interference estimate signal on line 366 from the null burst as an input to an LMS algorithm and using the LMS algorithm to adapt the filter coefficients of the predictor filter 322 to set its initial tap weights.

The reason that the states are reset at the beginning of each spreading interval is that in the time domain, if the echo delay is one chip time, the echo will show up in the next code, but this only holds true if the echo delay is such that the echo is still in the same spreading interval. Each spreading interval is independent. The algorithm does not work if the echo delay is so large as to take it out of the spreading interval because then the equalizer will not find the echo and remove it. Generally, the echo is always within the same spreading interval.

Each burst may come from a different CM, and each CM has its own unique rotational amplifier phase and amplitude correction factors on lines 330 and 326, respectively. However, the predictive processing works better if the coefficients of the predictor FIR filter 322 are preserved from one burst to the next. Therefore, the effects of the rotational amplifier processing are reversed by multiplier 364 which multiplies the error signal generated by summer 354 by a factor $$\frac{1}{\alpha}$$

where $\alpha=A^*e^{j\Phi}$ and represents the amplitude and phase correction factors applied by the rotational amplifier. The resulting error signal on line 366 is sans the effect of the rotational amplifier and is input to the predictor FIR filter and proceeds through its shift registers. The tap coefficients multiply the outputs of each shift register stage and the results are summed and output on line 336 where mulitplier 362 multiplies the output by $\alpha$ to put the effects of the rotational amplier back in.

FIG. 18 is the preferred embodiment of the equalizer, predictor and rotational amplifier circuitry inside block 314 in FIG. 14, and works the same way as the FIG. 16 embodiment, but because the rotational amplifier is placed to the right of summer 338, the need for multipliers 362 and 364 is eliminated.

TCM Viterbi Decoder 246

Returning to the consideration of FIG. 6, the TCM Viterbi decoder 246 decodes the constellation points of training bursts into the coded and uncoded bits which define which CM sent the training burst. These bits are sent to the MAC process 60 in FIG. 1 through the same Reed-Solomon and descrambling circuitry described below that processes the data bursts.

From the burst buffer, the subsequent data bursts are processed through the inner deinterleaver 240, differential decoder 242 if necessary (only used for DOCSIS 1.0 ATDMA bursts which are differentially encoded and bypassed for all other bursts including all advanced PHY bursts) and the TCM Viterbi decoder 246 to convert the constellation points or symbols that were received back to payload bits.

The Trellis Code Modulation Viterbi decoder 246 can be any TCM decoder that implements a polynomial defined by the DOCSIS standards. The TCM decoder is essential to detect the payload data bits encoded in Trellis Code Modulation (TCM) constellation points of advanced PHY SCDMA and TDMA bursts. When bursts are not Trellis code modulated, the TCM Viterbi decoder portion of the circuit 246 is bypassed and a conventional slicer type hard decision decoder which is part of circuit 246 is used to determine which constellation point each received symbol is and output the bits that map to that constellation point on path 247.

The TCM decoder 126 can also be a known type soft output Viterbi algorithm (SOVA) to output coded and uncoded bits along with an erasure indicator that indicates how confident the Viterbi decoder is that its decision was correct. The erasure indications are then used along with the Reed-Solomon (RS) parity symbols for RS code words to detect and correct at least some errors in the marked code words. In this class of embodiments, the slicer is also a known type of slicer which outputs the bits of each received symbol/constellation point along with an erasure indication indicating the degree of confidence the slicer has in its decision. The slicer's erasure indication is also used by the Reed-Solomon decoder circuitry 256 to decode the Reed-Solomon codewords. The Reed-Solomon decoder circuitry 256 used in this class of embodiments which can use SOVA or slicer erasure indications is known.

The TCM modulator at the CM convolutionally encodes only some of the payload bits that go into each constellation point. Other uncoded bits are then combined with the encoded bits to define the constellation point.

The Viterbi decoder 246 decodes the TCM bits of the constellation point and then figures out from those bits what the uncoded bits were and outputs all the bits on line 247. The uncoded bit interleaver 248 then deinterleaves the uncoded bits. This circuit is essential to complete the deinterleaving of TCM encoded SCDMA bursts.

The TCM decoder 246 gets input symbols or constellation points with erasure indications for each symbol from the impulse noise detecting circuitry. The programmable register branch metric clipping value sets the maximum branch metric value. When the channel has impulse noise, the branch metric clipping value is set to a small value so the impulse noise can be corrected. When the channel is characterized with white noise only, the branch metric clipping is set to a greater value.

In TDMA mode, the TCM branch metric calculation should take into consideration the Tomlinson-Harashima clipping at the precoder in the CM.

The TCM decoder has a TCM mode and a bypass mode.

The TCM decoder outputs the corrected symbols and the normalization rate of the path metric. The normalization rate is proportional to the input SNR.

For continuous data transmission, the input signal phase can be rotated by n*pi/2 without ability for detection and correction. Therefore, when the normalization rate is too high above a programmable threshold, the input phase of the signal at the TCM decoder input should be incremented by 90 degrees. When the phase is corrected, the normalization rate should be reset and recalculated in a predefined window. The rotation has an enable/disable mechanism in some embodiments.

The TCM decoder outputs data with an erasure bit. The output data is divided into coded bits and uncoded bits. The erasure bit indicates whether the uncoded bits are erased. In embodiments where SOVA TCM decoding is not used, the coded bits do not have erasure indications. Outputting erasure bits for the uncoded bits is implemented in TCM mode and also when the TCM decoder is bypassed. An assumption has been made in the preferred embodiment that for typical impulse noise, the TCM decoder will not have error in the coded bits because of the coding. The RS decoder 256 combined with the RS degrouper 250 will improve the bit error rate performance.

The TCM decoder gets its erasure input from the impulse detector 90. In the preferred embodiment, the TCM decoder 246 also outputs. for monitoring by the MAC process 60 the number of erasure bytes in each RS codeword. A rate adaptive algorithm in the MAC process 60 will use the erasure count for finding the optimal number of RS information bytes (k) in a codeword and use that information in UCD messages to control burst parameters.

The erasure output has an ENABLE/DISABLE capability in the preferred embodiment, but not in other embodiments.

When the burst is not trellis code modulated, an erasure bit for the uncoded bits is output when one of the following occurs:

The input erasure indication is active.

The input signal power is bigger than a programmable threshold.

When the difference between the distance of the received signal and the two closest constellation points is smaller than a programmable threshold.

When the burst is trellis code modulated, an erasure bit for the uncoded bits is output when one of the following events occurs:

The input erasure indication is active.

The input signal power is bigger than a programmable threshold.

The difference between the branch metrics of the two closest parallel paths in the trellis is smaller than a programmable threshold generates a temporary erasure bit. After a temporary erasure bit, the Add Compare Select (ACS) circuit (not shown) selects the appropriate erasure for a state between all the possible paths. Then a trace-back processor (not shown) decides the final erasure bit output. When the input symbol power is above a programmable threshold or the input symbol is erased, the branch metric is set to 0.

An ENABLE/DISABLE option for this TCM burst erasure bit for uncoded bits feature is present in the prior art.

Inner Deinterleaver 240

The inner deinterleaver is essential to receive advanced PHY SCDMA bursts that are Trellis Code Modulated and functions to undo the interleaving done by the CM prior to Trellis encoding payload bits into SCDMA constellation points. The inner deinterleaver deinterleaves both the coded and uncoded bits that define constellation points, although, ideally, it would deinterleave only the coded bits. The uncoded bit interleaver 248 undoes the effects of the inner deinterleaver on the uncoded bits of the TCM constellation points by reinterleaving the uncoded bits to get them back to the state they were in before the inner deinterleaver 240 deinterleaved all the bits of each constellation point. Together, these two deinterleavers 240 and 248 undo the interleaving carried out in the CM transmitter. The coded bits are encoded with a redundant bit at the transmitter to overcome the effects of burst noise. The uncoded bits are interleaved at the transmitter and grouped in RS groups to minimize the effects of burst noise. The preferred method of interleaving the one dimensional array of symbols to be transmitted in CDMA bursts in two dimensions one being the code axis and the other being the time axis is disclosed in EPO publication 0987850, published Mar. 22, 2000, which is hereby incorporated by reference. The two deinterleavers 240 and 248 undo the effects of this 2-D interleaving.

The inner deinterleaver 240 has an SCDMA mode and a TDMA mode and only deinterleaves trellis code modulated (TCM) TDMA or SCDMA bursts and is bypassed for non TCM bursts. The deinterleaver 240 can be disabled depending on the latency requirements and channel characteristics in the preferred embodiment.

The burst buffer 238 and the equalizer data buffer 236 have similar features in terms of the input to the deinterleaver 240. They both hold the data portion of a burst. The equalizer 234 and the carrier recovery circuit 230 should output the data symbols of the data portion of a burst to the deinterleaver 240 as a vector (in SCDMA and TDMA modes) without the preamble symbols. The input cell to the inner deinterleaver 240 should be divided into vectors, each according to the data in a frame for SCDMA. The output cell from the inner deinterleaver 240 consists of one burst and is divided into vectors, each with length of one sub-frame in SCDMA mode or an interleaver segment in TDMA mode. The inner deinterleaver 240 builds the matrix and the sub-frames according to the burst parameters that travel to each pipeline stage with each burst including the preamble length, sub-frame length, frame parameters (number of codes and spreading intervals) etc. For SCDMA CMs, there are no interleavers (inner & RS) for TDMA station maintenance bursts (IUC 3 & 12). For TDMA TCM bursts, the block size is 2048 TCM coded subsymbols or 2048*3*n bits maximum, where n=8 soft decision bits.

For SCDMA TCM bursts, the address to the burst buffer 238 is calculated according to interleaved symbols. The data resolution is the same as the TCM decoder. In the preferred embodiment, the deinterleaver processes the data without the preamble symbols, but in other embodiments, the preamble symbols may be included if they are interleaved. In other embodimnets, the inner deinterleaver 240 is structured to deinterleave bit interleaved code modulation TDMA and SCDMA bursts.

For TDMA TCM bursts, the block size is 2048 TCM coded subsymbols or 2048*3*n bits maximum, where, preferably, n=8 soft decision bits.

Uncoded Bit Interleaver 230

After the TCM decoder decodes the constellation points, the uncoded bits need to be interleaved in order to cancel the deinterleaving of the uncoded bits performed by the inner deinterleaver 240. This is necessary because at the transmitter only the coded bits were interleaved so the inner deinterleaver causes interleaving of the uncoded bits when it deinterleaves the coded bits. There are two modes: TDMA and SCDMA. The coded symbols are obtained in the correct order and are received in a vector. The uncoded bits are then converted to a matrix to perform the interleaving.

In SCDMA mode, The TCM decoder 246 outputs bits together with the erasure indication bit to a double buffer (not shown) with the size of a sub-frame in the uncoded bit interleaver 248. The uncoded bits together with the erasure indication bit are interleaved and the correct pairs of coded and uncoded bits with erasure indication are output to the RS de-grouper 250.

In TDMA mode, the operation is similar, but the required memory is smaller.

A switch 239, under control of the timing and control circuitry 222, couples the inner deinterleaver 240 to the output of the equalizer data buffer 236 for training bursts and to the output of the burst buffer 238 for data bursts.

The differential decoder 242 gets the last received preamble symbol, which is used to differentially decode the first data symbol. It is assumed that that the differential encoder uses a random initial phase. The AGC and carrier recovery circuits 89 and 230 and the equalizer 234 will output to the burst buffer 238 and to the equalizer data buffer 236, respectively, the last preamble symbol in differential encoder mode.

RS de-grouper 250

The upstream transmission is divided into Reed-Solomon (RS) code words each of which has data bits and RS parity bits. The concatenation of these bits is divided into bytes. When these bytes entered the Trellis encoder in the transmitter, some bits of each byte were mapped to the uncoded bit inputs of the Trellis encoder, and the rest of the bits of each byte were mapped to the coded bit inputs. The RS de-grouper 240 reverses this mapping by receiving the uncoded and coded bits at its input 249 and mapping them back into the Reed-Solomon byte stream of the code words. This byte stream can be de-interleaved and decoded as necessary.

The RS de-grouper has two modes depending upon whether Trellis coded modulation is on or off. It uses the TCM mode burst parameter that travels with the data of every burst to set its mode. The RS de-grouper needs to calculate the parameter of the block based upon the burst length.

De-scrambler 252

The de-scrambler 252 does the same operation as the scrambler in the CM transmitter but only for bursts that are scrambled. For other bursts, that are not scrambled, the de-scrambler is bypassed, as controlled by the scrambled burst parameter.

RS De-interleaver 254

The RS de-interleaver 254 de-interleaves the bytes of the RS code words so as to put them back into the order in which they arrived at the RS encoder in the CM transmitter. The RS de-interleaver is active only in TDMA mode. The RS de-interleaver improves performance in the presence of impulse noise, but with increased latency. Data is written into the de-interleaver's internal double buffer by columns and read out by rows. The RS de-interleaver uses the RS encoding parameters in the burst profile data such as the T value and RS code word length to properly de-interleave the byte stream of RS code words output by the RS de-grouper 250 and de-scrambler 252.

The block segment memory size is $I_r$ rows by N columns, where N is the RS code word length in bytes and $I_r$ is the de-interleaver depth in bytes. There are two modes of operation:

Fixed interleaver depth ($I_r$) mode
Dynamic interleaver depth ($I_r$) mode

In fixed interleaver depth mode the block size of each interleaver segment is defined by the MAC parameters ($I_r$ & N). The MAC sets the interleaver depth $I_r$ according to the latency requirement and expected impulse noise. The maximum possible value of the interleaver depth (calculated by the CPU) is $$I_{r,max} = floor(2048/N)$$

In dynamic interleaver depth mode, the number of rows in each deinterleaver segment is optimally configured. The number of rows in each segment is more or less the same which avoids having the last small segment as occurs in fixed interleaver depth.

RS Decoder 256

The RS decoder 256 receives the RS code words and uses the RS parity bits and erasure bits sto correct any errors.

The RS decoder inputs are:

Data (8 bits)
Erasure (1 bit)

The RS decoder uses erasure input in order to double the impulse noise correction capability.

There is an internal buffer of one RS word at the RS decoder input. The size of the buffer is 255 bytes and 255 bits for erasure indication. Note that the erasure indication does not have to be stored in a buffer because it can be processed immediately after it arrives by the RS decoder.

The RS decoder is programmable: T=0–6 up to N=255. Last code word is selectable fixed or programmable. When T=0, the RS decoder is bypassed. In bypass mode the smallest "codeword" has 6 bytes for REQ bursts.

The MAC interface 258 The MAC interface 258 functions to output the decoded data to the MAC layer process 60 in FIG. 1. In some embodiments, the MAC interface formats the data into whatever format the particular MAC process uses. In other embodiments, the data is simply stored in a buffer and an interrupt is generated to retrieve the data and provide it to the MAC process. In other embodiments, the data is stored in a buffer, and the MAC periodically polls the buffer to retrieve new data. In the preferred embodiment, the measurement data such as ranging offset adjustments, upstream equalization coefficients, power, frequency, signal-to-noise ratio, etc., are appended to the data from the burst and sent to the MAC process 60. In other embodiments, the MAC interface 258 includes three lines. A data line carries user payload data from the data bursts or CM identification data from training bursts. A measurements line carries the measurements obtained in the demodulator. Any of these messages can be masked in the preferred embodiment, but not in alternative embodiments. In the preferred embodiment, the MAC can enable the output of the measurements only for particular SID numbers so that the MAC can average the numbers for each specific SID. A third line 260 carries control data from the MAC process 60 to the demodulator such as the channel parameters, the burst parameters (UCD) and the MAP. This control data is stored in a buffer such as the burst parameter memory 193.

Measurements and other data are typically sent to the MAC layer process using a serial port with a programmable nominal clock rate. When a circuit in the demodulator that makes measurements is disabled for a burst, it outputs a measurement of 0.

A collision indication from the start of burst detector 226 can be output on the status line if power is over a predetermined threshold and the UW is not detected after a predetermined number of symbols. The MAC process 60 also calculates a CRC on the data portion of such a burst to determine if a collision has corrupted the data in some embodiments.

In embodiments where the data does not need to go to the MAC, the MAC interface 258 is optional. Where broadband internet access is one of the services being provided, the MAC layer process, among other things, strips off the cable MAC headers. In a typical environment, a computer that wants to browse the internet is coupled to the cable modem. It converts a request from the user into a TCP packet which is encapsulated into an IP packet when is then encapsulated into an Ethernet packet and transmitted over an Ethernet physical layer to the cable modem. The cable modem MAC layer process strips off the Ethernet PHY layer header and adds a cable DOCSIS MAC layer header which contains data defining the burst parameters and sends the burst to the CMTS. The CMTS MAC layer process 60 strips off the cable DOCSIS MAC layer header and sends the TCP/IP packet out to the internet.

Control Process

Figure 13A:
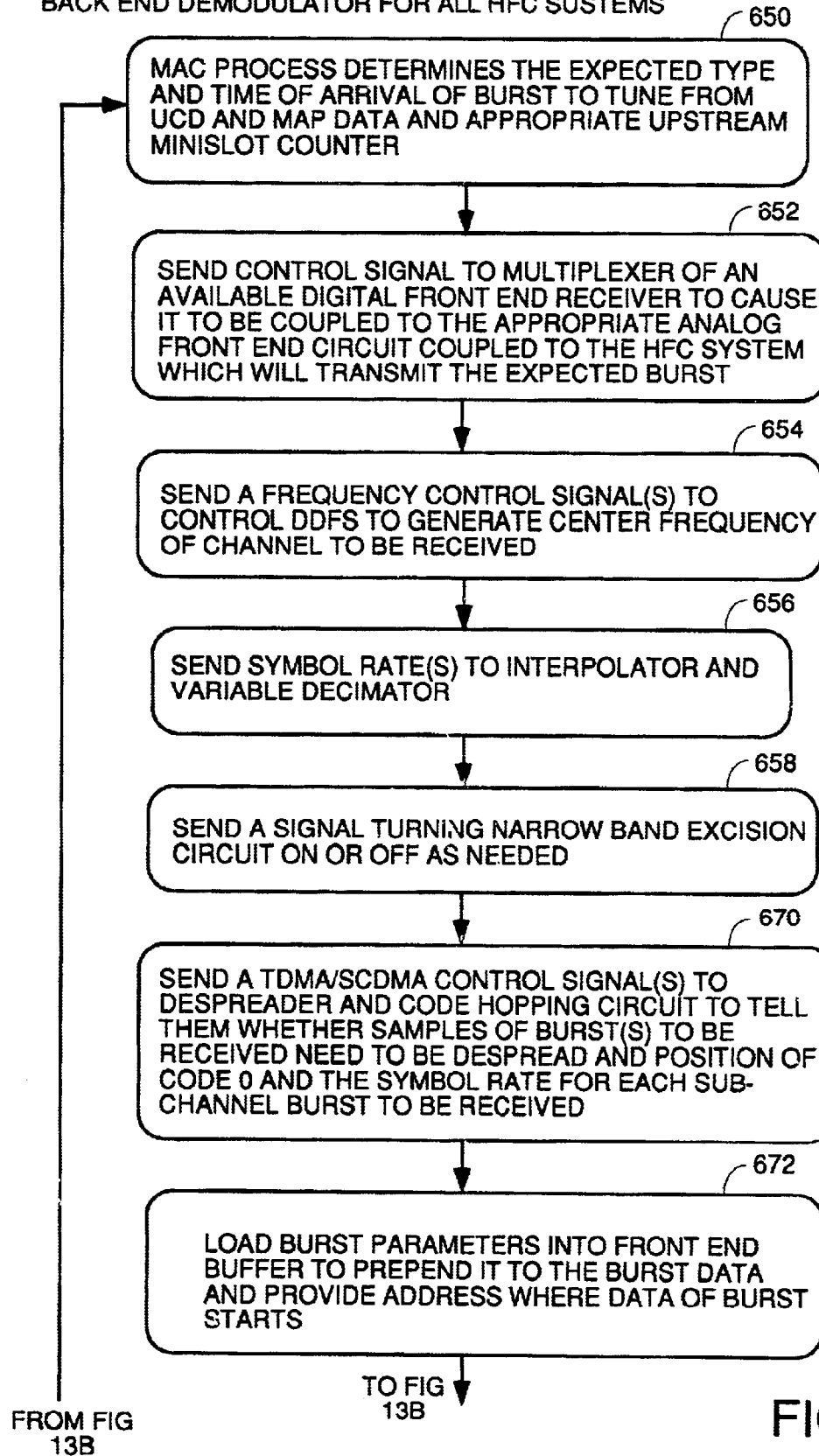
FIGS. 13A and 13B are a flowchart of one MAC control process to control a channel receiver to receive one channel which may or may not be mixed mode.
Figure 13B:
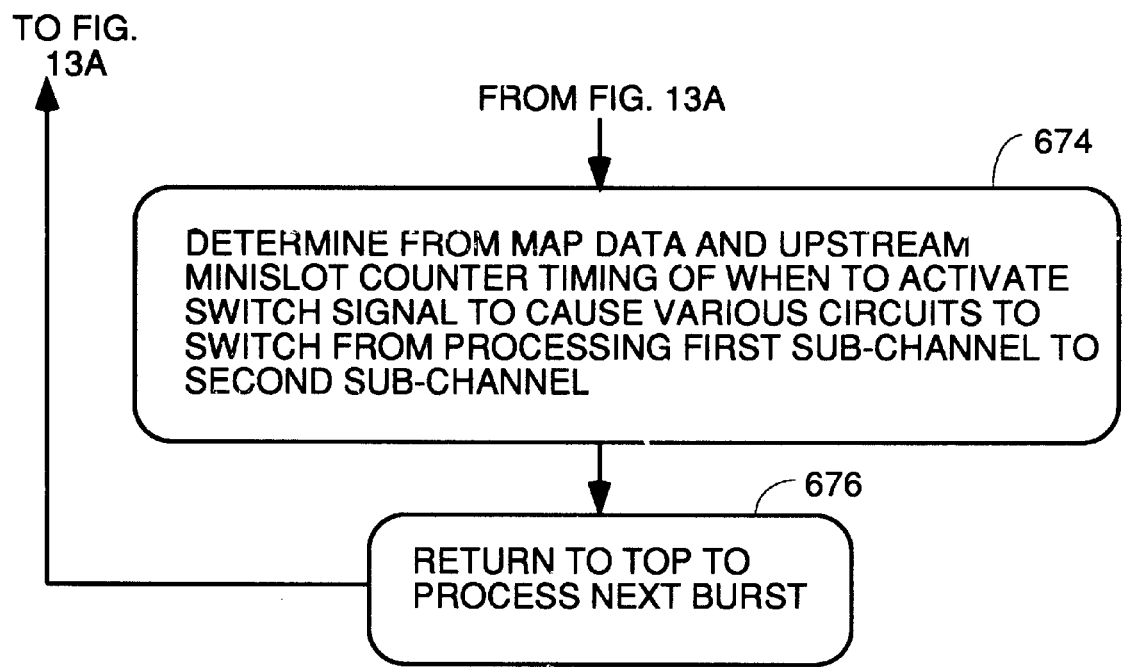

Referring to FIG. 13, there is shown a flowchart of a control process for controlling the receiver of FIG. 1 to provide multichannel, mixed-mode capability. FIG. 13 is not the entire MAC process. It is only the processing steps carried out by the combination of the MAC process 60, microprocessor 58, register array 51 and controller state machine 50 to control the receiver. Specifically, the process of FIG. 13 generates the proper control signals to control the various circuits and send the proper burst parameter data to the shared backend circuitry 52 at the proper time. The burst parameter data then travels with the burst through the shared backend circuit pipeline to properly configure the circuitry that carries out the processes there including: filtering, demodulation, timing recovery, ranging measurement, preamble processing, phase and amplitude error correction factor calculation, equalization coefficient calculation, Viterbi and differential decoding, deinterleaving, descrambling and error correction processing processes. The premise of FIG. 13 is that all the bandwidth requests have been received, all bandwidth grants have been made and sent downstream in UCD and MAP messages, all burst parameter and channel parameter data of each assigned burst is known to the MAC as is the time in terms of a minislot count when a burst having particular burst and channel parameters will be received. FIG. 13 represents one control process for one sub-channel. There is a separate control process like that shown in FIG. 13 for each subchannel that can be received. Assuming four digital front end receiver channels, each capable of receiving two sub-channels, there will be eight separate processes like that shown in FIG. 13 implemented by the control circuitry in FIG. 1, each controlling one sub-channel. In alternative embodiments, one MAC control process can be shared by all channels and subchannels.

In some embodiments, these individual MAC processes cooperate with each other in assigning MAP bandwidth assignments so that "channel" (as opposed to sub-channel) transmissions do not overlap in time. In some embodiment, these MAC processes cooperate with each other such that when channel MAPs overlap in time, the assignments are such that the overall symbol rate that needs to be processed through the shared back end demodulator 52 does not exceed 5.12 Msps or at least does not exceed the capacity of the front end buffers in the various digital front end receivers to store data until it can be processed by the shared back end demodulator 52.

Basically, the process of controlling one front end receiver channel to receive a channel or mixed mode channel involves: sending a signal to control the multiplexer to select the correct analog front end coupled to the HFC system on which the channel will be transmitted; setting the right center frequency to be generated to beat the channel signal for each sub channel down to base band into a register for each sub-channel; supplying the symbol rate for each sub-channel; supplying a control signal to turn narrow band excision on or off; and supplying an IUC code that tells any SCDMA despreading circuitry in the front end to turn on or turn off and supplying the code 0 position in some code hopping embodiments, and supplying the address in the front end buffer into which the burst is to be stored and prepending the burst parameter data for the burst in the front end buffer in front of the burst data.

Step 650 represents a process of determining the type and timing of the expected burst to be received. The UCD data from downstream messages sent on the HFC system on which the logical channel to which the MAC process is assigned will be sent defines the type of burst expected and on which HFC system it will be transmitted. The MAP data from MAP messages allocating bursts for the logical channel to which the MAC process is assigned defines when the burst is scheduled. The purpose of the check of the appropriate upstream minislot counter is to determine the current minislot count so that it can be determined relative to the time a burst is expected when to generate the appropriate control signals to receive the burst. In the preferred embodiment, each HFC system has its own minislot counter, and the minislots can be of different duration. However, where the minislots are of the same duration on one or more HFC systems, those HFC systems can share a minislot counter in some alternative embodiments. Each MAC control process like that shown in FIG. 13 determines when to expect a particular burst from the MAP data allocating that burst to particular minislots and determines how much time is left until the burst arrives from the upstream minislot counter for the HFC system on which the burst will be transmitted.

Step 652 represents sending the proper control signal to the multiplexer 30 of an available digital front end receiver to cause the analog front end coupled to the HFC system on which the expected burst will be sent to be coupled to the input of the available digital front end receiver.

In some embodiments, the MAC control process also writes configuration data to control the controller state machine to sent the appropriate signals to set the constant rate clock on line 39 in FIG. 2 which establishes the sample rate at the U.S. or Euro-DOCSIS rate. This step is not shown as it exists only in some embodiments.

Step 654 represents sending a control signal on line 82 to DDFS 78 in FIG. 4 to cause it to generate a signal on line 80 that is the center frequency of the channel to be received. This beats the channel to be received down to baseband in mixer 74. Where the channel to be received is mixed mode, step 654 represents the process of loading two different frequency control signals into registers in DDFS 78 via line 79 in FIG. 7. This allows switching between registers during the guardtime between sub-channels where the subchannels have different center freqeuncies so that the data needed to change the frequency generated by the DDFS for the new sub-channel is already present in a register. This speeds the switch between subchannels and allows the guardtime to be minimized.

Step 656 represents the process of loading the symbol rate for the channel to be received, or the two symbol rates if two sub-channels with different symbol rates are to be received, into registers in the interpolator 81 and the variable decimator 86 in FIG. 7.

Step 658 represents the process of determining whether narrow band interference may be present and sending a control signal to turn narrow band excision circuit 88 on or off as needed.

Step 670 represents sending control data on bus 101 to the despreader 94 and the code hopping circuit 96 to control operations by these two circuits during the expected channel burst or bursts if two bursts in two different sub-channels are expected. If code hopping is not implemented, the control signal only turns the despreader on or off. Separate registers for each of the sub-channels exist in the despreader and code hopper circuits, and bus 101 is used to load data in them that control operations during each sub channel. A switch signal to be discussed below tells the despreader and code hopper when to switch between using the data in one set of registers pertinent to one sub-channel and another set of registers pertinent to the other sub-channel. The control data tells the despreader and code hopper at least whether the burst needs to be despread and the location of code 0 in the case of SCDMA bursts or passed straight through without change in the case of TDMA bursts. The control data also tell these circuits the symbol rate of each burst.

Step 672 represents the process of loading the burst parameters of the expected burst from the UCD and MAP data into the front end buffer 44 via line 103 in FIG. 7 to prepend to the burst data. This may be done by reserving a block of addresses to store the burst data since its size is known and then prepending the burst parameter data (and channel parameter data where that is necessary to control the back end demodulator) to the reserved block of addresses that will store the burst data. Only the address where the first data from the expected burst is to be stored is also supplied in some embodiments so that the burst parameter can be properly prepended to the burst data to be stored. The burst parameter data (and channel parameter data where necessary) is the data that is needed by the various circuits in the shared back end demodulator to control and configure those circuits to properly process the data of this burst.

Step 674 represents the process of determining from the MAP data and the appropriate minislot counter when to send a switch signal to the various circuits in the front end channel receiver which have been loaded with two different sets of data for two different sub-channels. The switch signal will be sent during the guard time between the first sub-channel and the second sub-channel of a mixed mode channel to tell these circuits when to stop using the control data applicable to the first sub-channel and start using the control data applicable to the second sub-channel. In alternative embodiments, no prestoring of the control data for two different sub-channels is used, and the center frequency, symbol rate, SCDMA/TDMA information and burst data are sent to the channel receiver that will process a sub-channel burst just in time for that receiver channel to process the burst.

In step 676, processing returns to step 650 to process the next burst.

Figure 11:
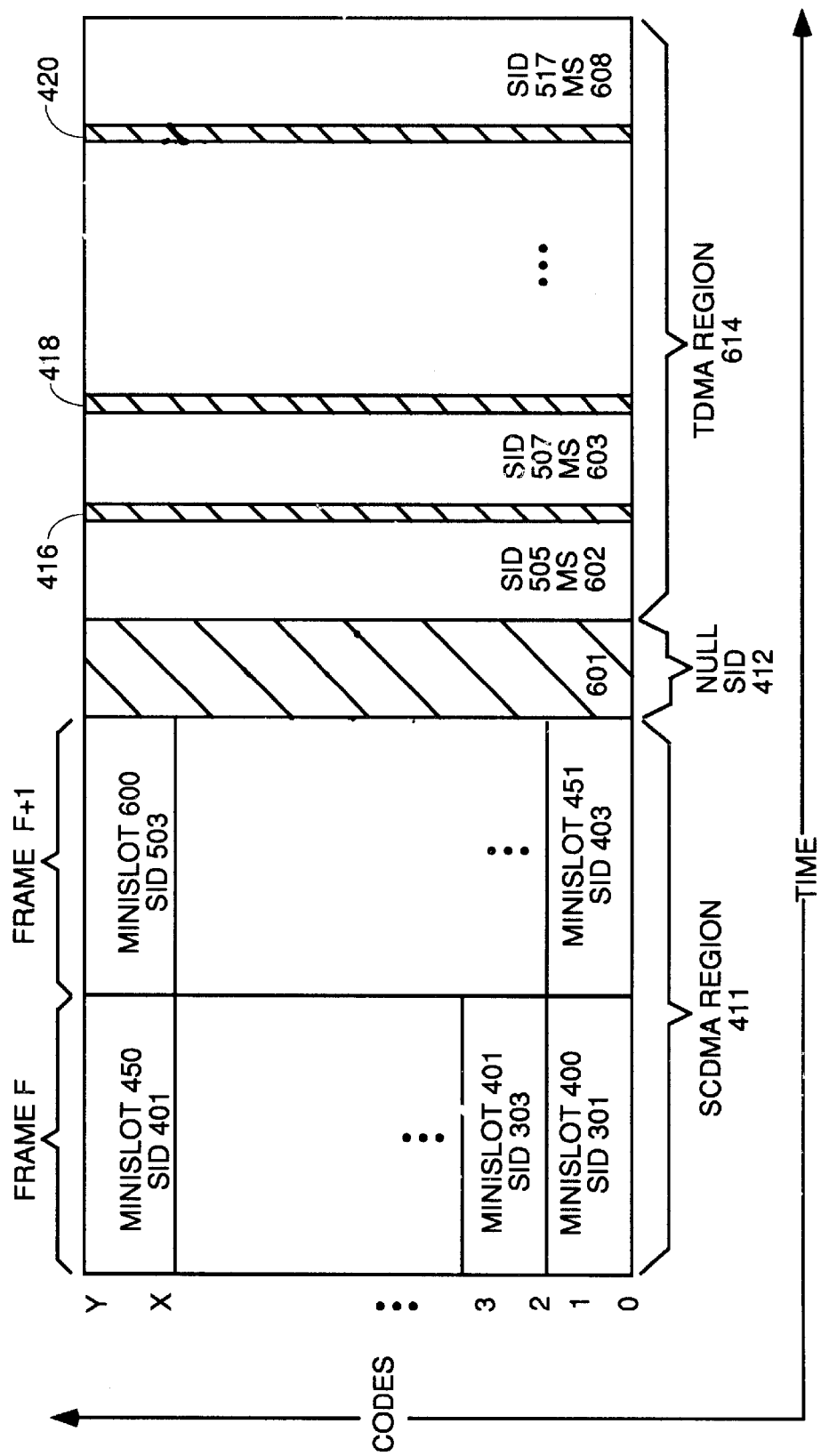
FIG. 11 is a diagram of a MAP which has both SCDMA and TDMA regions and uses null SIDs to create a guardband between them.

FIG. 11 Mixed Mode Map

Referring to FIG. 11, there is shown a MAP which has both SCDMA and TDMA regions. This MAP defines an SCDMA region 410 extending over frames F and F+1 in time which maps spreading codes from 0 to Y to minislots in grants extending from minislot 400 to 600. A null SID during minislot 601 is shown at 612. A TDMA region 414 exists during minislots 602 through 608. Data from SIDs 301, 303 through 401 are all transmitted simultaneously by different CMs during frame F spread using codes 0 through Y. Data from SIDs 403 through 503 are all transmitted simultaneously during frame F+1 by different CMs also using codes 0 through Y. No data at all is transmitted during minislot 601 which is assigned to the null SID. This acts as a guardband.

Synchronous TDMA is not supported in the preferred embodiment, however in alternative embodiments, synchronous TDMA with no guardbands between SCDMA and STDMA intervals and between STDMA minislots can be implemented. In other words, in embodiments where STDMA bursts are transmitted during the TDMA regions, 614 in FIG. 11, the null SID minislot guardband 612 is not needed, and there is also no need for the guardbands 416, 418 and 420, etc. between STDMA minislots. This is because alignment with minislot boundaries will be so precise in both STDMA and SCDMA regions, that the guardbands are wasted bandwidth.

During the TDMA or STDMA region 414, data from only SID 505 is transmitted during minislot 602. Likewise, data from only SID 507 is transmitted during minislot 603 and so on for minislots up to 608.

The upstream transmissions are carried out by each cable modem only during its assigned Minislots. Minislots are like timeslots, and each is numbered. The MAP messages therefore tell specific cable modems when and for how long they can transmit by virtue of the Minislot assignment to the SIDs served by that transmitter in a MAP message. Thus, some transmitters assigned to the frequency channel of one of the receivers in FIG. 1 which are DOCSIS 1.0 modems may be transmitting during certain time intervals while other transmitters which use SCDMA multiplexing will be transmitting with overlapping bandwidth on the same HFC system but during non overlapping intervals in time by virtue of their Minislot assignments included in a MAP like that shown symbolically in FIG. 11. Likewise, other transmitters which use TDMA multiplexing and possibly different symbol rates will be transmitting on the same HFC system during other non overlapping intervals in time by virtue of their respective Minislot assignments. Likewise, second SCDMA or TDMA transmitters which transmit at different symbol rates than other transmitters, respectively, will have their own non overlapping in time Minislot assignments. *** The demodulator 14 receives the MAP information from the MAC layer processes by messages from the CPU 20 and it knows when each numbered Minislot is arriving because the demodulator has a its own upstream minislot counter. Thus, the demodulator 14 uses demultiplexing circuitry which is appropriate to demultiplex the signals being received during each interval.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A head end receiver for a distributed system of digital data transceivers coupled to said head end receiver by a plurality of hybrid fiber coaxial cable (hereafter HFC) systems, comprising:

a plurality of channel receivers, each coupled to one or more of said HFC systems, and each capable of receiving mixed mode upstream bursts in different sub-channels that have overlapping bandwidth but which are multiplexed in time, where each subchannel burst may have a different symbol rate, different RF frequency, different multiplexing type and different Synchronous Code Division Multiple Access (hereafter SCDMA) frame size;

a shared back end demodulator circuit for recovering the data from each burst, making measurements and calculations on at least some bursts transmitted by each cable modem which are sent down to the cable modem which sent said burst which are useful in establishing at least frame boundary and minislot boundary synchronization and upstream equalization;

an arbiter coupled to receive the burst data output by each said channel receiver and structured to supply received data to said shared back end circuit such that said shared back end circuit is shared so as to process all data from all said channel receivers at different times;

control circuitry for controlling at least said plurality of channel receivers and said shared back end circuit to provide multichannel, mixed-mode reception of digital data.

2. The apparatus of claim 1 wherein each of said plurality of channel receivers is comprised of an analog front end circuit each of which performs wideband analog-to-digital sampling and is coupled to an HFC system, and a digital front end receiver circuit coupled to all said analog front end circuits via a multiplexer, said digital front end circuit functioning to mix the samples received from a selected one of said analog front end circuits down to baseband and performs narrow band noise excision.

3. The apparatus of claim 2 wherein each digital front end circuit includes a multiplexer having a plurality of inputs, each input coupled to the output of one of said analog front end circuits and having an output that couples the digital samples on a selected one of said inputs to the rest of the circuitry of said digital front end receiver circuit for processing, and having a select control input coupled to said control circuitry for receiving a control signal controlling which input of said multiplexer is coupled to said output.

4. The apparatus of claim 2 wherein said control circuitry comprises:

a plurality of control registers;

a state machine having inputs coupled to said plurality of control registers, said state machine having control signal outputs coupled to said plurality of channel receivers;

a microprocessor coupled to load data into said control registers and controlled by a media access control process to generate the proper data to load into said control registers to cause said state machine to generate appropriate control signals to receive the data of a channel or to load control data into control registers of various circuits in a channel receiver to control those circuits to receive separate logical channels of a mixed mode channel and to generate a switch signal at an appropriate time to cause the various circuits of said channel receiver to switch from use of control data controlling the circuits to properly process the data of a first sub-channel of a mixed mode channel to use of other control data controlling the circuits to properly process the data of a second sub-channel of a mixed mode channel.

5. The apparatus of claim 4 wherein said microprocessor is programmed to control said control circuitry to carry out the following steps:

determine an expected burst type and time of arrival of an expected burst on a channel to be received from data in upstream channel descriptor and MAP messages and determine how much time is left before the burst arrives from an appropriate upstream minislot counter assigned to the hybrid fiber coaxial cable system on which the burst is scheduled for transmission;

select an available digital front end receiver circuit to receive an expected burst, and send a select control signal to said multiplexer in said selected digital front end receiver circuit to cause coupling thereof to one of said analog front end circuits which is coupled to an HFC system on which said expected burst will be transmitted;

load frequency control data into one or more registers of a direct digital frequency synthesizer, each said register storing data that controls the frequency of a local oscillator signal generated by said direct digital frequency synthesizer during reception of a burst on a sub-channel to which said register is assigned, said sub-channel being the channel itself if said channel is not mixed mode, and being one of two or more sub-channels if said channel is mixed mode;

load symbol rate data into one or more registers of an interpolator and a variable decimator, each said register storing data that defines a symbol rate during reception of a burst on a sub-channel to which said register is assigned, said sub-channel being the channel itself if said channel is not mixed mode, and being one of two or more sub-channels if said channel is mixed mode;

send a control signal to turn on or turn off a narrow band noise excision circuit;

send a TDMA/SCDMA control data to load one or more registers in at least a despreader circuit, each register storing control data controlling whether said despreader despreads the data of a burst received on a sub-channel to which said register is assigned and defining the symbol rate of said burst, said sub-channel being the channel itself if said channel is not mixed mode, and being one of two or more sub-channels if said channel is mixed mode;

prepend burst parameter data from at least said upstream channel descriptor (hereafter UCD) message data that pertains to a burst into a front end buffer of said digital front end receiver circuit to the memory locations where the burst data of the expected burst will be stored; and determining from MAP message data pertaining to the expected burst the minislot count when the burst will start to arrive and terminate and determining from the upstream minislot counter which is counting upstream minislot counts for the HFC system on which the burst is arriving when a guard band between sub-channels of the mixed-mode channel being received is occurring, and sending a switch signal to all circuits in said digital front end receiver which have been loaded with data controlling operations by said circuits for two or more sub-channels causing said circuits to switch to using control data in a register assigned to a sub-channel to be received at the end of the said guard band.

6. The apparatus of claim 5 wherein said microprocessor is further programmed to control said control circuitry to send data as part of said TDMA/SCDMA control data which indicates the location of code 0 in SCDMA sub-channel frames.

7. The apparatus of claim 1 wherein said control circuitry includes a computer programmed to implement a separate media access control process for each sub-channel that said receiver can receive.

8. The apparatus of claim 1 wherein each said channel receiver includes a front end buffer for storing sample and other data, and wherein said control circuitry includes a computer programmed to prepend burst parameter data for each burst to be processed by a channel receiver into the front end buffer of said channel receiver such that said burst parameter data precedes the burst data and travels with the burst data on the same data path through said shared back end demodulator circuit, said burst parameter data controlling and configuring circuits in said back end demodulator to properly process said burst data.

9. The apparatus of claim 1 wherein each said channel receiver includes an analog front end circuit having an output, and a digital front end receiver circuit which comprises:

a multiplexer having multiple inputs, each input coupled to an output of a different front end circuit, and a select control input coupled to said control circuitry and having an output;

a digital mixer having an input coupled to said output of said multiplexer and having an output and having a local oscillator signal input for mixing the signal for each sub-channel to be received down to baseband;

a direct digital frequency synthesizer for generating a local oscillator signal at a center frequency of each sub-channel to be received when data from said sub-channel is being received, and having an input coupled to said control circuitry for receiving frequency control data and having an input coupled to said control circuitry for receiving a switch signal and having a plurality of registers therein, each for storing frequency control data that controls the frequency of the signal generated by said direct digital frequency synthesizer when receiving one sub-channel;

an interpolator for resampling the data of each subchannel at a symbol clock rate of that sub-channel, and having a symbol rate input coupled to said control circuitry and a switch signal input coupled to said control circuitry for receiving a switch signal indicating when to switch from processing the data of one sub-channel to processing data of another sub-channel, said symbol rate input for receiving symbol rate data from said control circuitry for multiple sub-channels, and having a plurality of registers, each for storing symbol rate input for one sub-channel to be received;

a variable decimator for reducing the sample rate of the baseband data stream of a sub-channel burst being received to two samples per symbol based upon the symbol rate of the burst, and having a symbol rate input coupled to said control circuitry and a switch signal input coupled to said control circuitry for receiving a switch signal indicating when to switch from processing the data of one sub-channel to processing data of another sub-channel, said symbol rate input for receiving symbol rate data from said control circuitry for multiple sub-channels, and having a plurality of registers, each for storing symbol rate input for one sub-channel to be received;

a narrow band excision circuit for analyzing the spectrum of each sub-channel and determining if narrow band interference exists, and, if so, setting coefficients of a digital notch filter to suppress said narrow band interference and adapt said coefficients to best suppress said narrow band interference, and having a switch signal input coupled to said control circuitry for receiving a switch signal indicating when to switch from processing the data of one sub-channel to processing data of another sub-channel;

an impulse detector for detecting impulse noise and marking affected samples with an indication that the sample may be corrupted by impulse noise by opening a window in time and measuring a signal power received during said window and comparing the measured signal power to an expected power level to make a determination whether excessive impulse noise power is present, and, if present, marking all samples taken during said window with an erasure bit;

a despreader circuit for despreading the spectrum of synchronous code division multiple access bursts, and having an input coupled to said control circuitry for receiving data indicating whether the bursts in each sub-channel are spread spectrum or not, and having a switch control input coupled to said control circuitry for receiving a switch signal indicating when to switch between processing the data of a first sub-channel and processing the data of a second sub-channel; and a front end buffer having an input coupled to receive data from said despreader and having an input coupled to said control circuitry for receiving burst parameter data to prepend to burst data, said burst parameter data for controlling circuitry of said shared back end demodulator circuit.

10. A process for multichannel, mixed-mode reception of digital data transmissions at a cable modem termination system (hereafter CMTS) receiver coupled via a plurality of hybrid fiber coaxial (hereafter HFC) cable systems to a plurality of DOCSIS compliant, asynchronous time division multiple access and synchronous code division multiple access cable modems, said CMTS receiver comprising a plurality of channel receivers coupled to a plurality of HFC systems, each channel receiver comprising a plurality of analog front end circuits, each coupled to one of said plurality of HFC systems and each coupled through multiplexers to any one of a plurality of digital front end receivers, each said digital front end receiver coupled via a front end buffer and an arbiter to a shared back end demodulator and coupled to control circuitry, said process comprising the steps:

(1) using upstream channel descriptor message data and MAP message data to determine when a burst on a channel will be transmitted and whether the channel is or is not mixed mode;

(2) selecting an available digital front end receiver to receive said burst and sending control data to circuitry in said digital front end receiver to configure it to be coupled to the analog front end circuit coupled to the HFC system on which the burst will be transmitted and to configure said digital front end receiver to receive each sub-channel burst in said channel (hereafter sub-channel burst refers to the channel burst if the channel is not mixed-mode);

(3) loading burst parameter data and channel parameter data pertaining to each expected sub-channel burst in a front end buffer of said selected digital front end receiver in a position to prepend the data of said sub-channel burst when that data is received;

(4) filtering out unwanted radio frequency signals from the HFC system on which the burst is arriving and wide band sampling said burst or bursts from each sub-channel;

(5) mixing each sub-channel burst down to baseband during the time the burst from that sub-channel is being received;

(6) resampling each sub-channel burst at a multiple of a symbol clock rate of the burst;

(7) filtering and decimating each sub-channel burst down to a sample rate of some predetermined number of samples per symbol based upon the symbol rate of each sub-channel burst;

(8) performing a narrow band excision to remove or suppress narrow band noise;

(9) writing burst parameter data and carrier phase and amplitude error correction factors pertaining to a particular sub-channel burst into a front end buffer to prepend the burst data of the burst;

(10) writing the burst data of each sub-channel burst into a front end buffer that has the burst parameter data and error correction factors pertaining to the burst;

(11) providing multichannel capability by repeating steps 1 through 10 for bursts scheduled on any of the HFC cable systems to which said CMTS receiver is connected using other available digital front end receivers of said CMTS receiver;

(12) arbitrating among the collection of data from bursts already received and stored in the front end buffers of said digital front end receivers, and supplying said burst data and burst parameter data and error correction factors to said shared back end demodulator according to a priority scheme established by said arbitration; and

(13) recovering the data of every burst using said shared back end demodulator.

11. The process of claim 10 wherein said step of filtering and decimating is carried out in a manner such that the same delay occurs as each burst is processed by this step regardless of the symbol rate of the burst.

12. The process of claim 11 wherein said step of filtering and decimating is carried out by passing each burst through a conventional decimator and a variable delay element which has its delay set based upon the symbol rate.

13. The process of claim 11 wherein said step of filtering and decimating is carried out by passing each burst through a conventional decimator, and, when bursts in different sub-channels have different symbol rates, causing a ranging process to be carried out by the cable modem that is scheduled to send the next sub-channel burst to cause the cable modem scheduled to send the next sub-channel burst to adjust its ranging delay such that given the delay imposed by said conventional decimator, the burst from said cable modem arrives at a shared back end demodulator circuit aligned in time with minislot boundaries of a minislot for which the burst was scheduled.

14. The process of claim 11 wherein said step of filtering and decimating is carried out by passing the burst from each sub-channel through a conventional decimator and, when there is a shift in symbol rate between a first sub-channel burst and a second sub-channel burst on a mixed mode channel, shifting the timebase symbol clock for the hybrid fiber coaxial cable system on which the second sub-channel burst is scheduled so as to compensate for the changed delay in said conventional decimator caused by the different symbol rate.

15. The process of claim 10 wherein step 13 further comprises the steps:

(A) despreading the spectrum of any synchronous code division multiplexed bursts, and if the burst is not synchronous code division multiple access (hereafter SCDMA) multiplexed, passing the sample data through or around a despreader circuit without alteration;

(B) performing impulse noise detection by opening a window in time and measuring a received signal power during said window and comparing said received signal power to an expected power level, and, if the comparison indicates impulse noise was probably present during said window, marking any symbols that were received during said window and which may be corrupted by impulse noise with an erasure bit;

(C) measuring the start of burst time of at least ranging bursts and reporting any synchronization errors to assist each cable modem in achieving for its bursts minislot and kiloframe boundary alignment at the CMTS receiver so as to achieve upstream synchronization;

(D) recovering a symbol clock on at least time division multiple access data and ranging bursts and resampling TDMA and SCDMA burst symbol data at the correct timing using the recovered symbol clock and storing the re-sampled data in a frame buffer;

(E) processing a unique word preamble of each sub-channel burst to develop initial phase and amplitude error correction factors and using said initial phase and amplitude error correction factors to track and correct phase and amplitude errors in preamble symbols of each burst and storing the corrected preamble symbols in an equalizer buffer, and using said phase and amplitude error correction factors to track and correct phase and amplitude errors in the data symbols of said sub-channel burst and storing corrected data symbols in a burst buffer;

(F) processing said corrected preamble symbols of each sub-channel burst to develop upstream equalization coefficients for the cable modem which transmitted said burst and sending said upstream equalization coefficients to said cable modem which transmitted said sub-channel burst in a downstream message for use in updating tap coefficients in an upstream equalization filter;

(G) processing the data symbols of each interleaved burst to deinterleave them;

(H) decoding the data symbols of each burst in a manner appropriate to the type of encoding used to encode data bits into the burst's data symbols to recover said data bits;

(I) reinterleaving uncoded bits output from step H for Trellis Code Modulated (hereafter TCM) bursts;

(J) for TCM bursts, receiving the coded bits from step H and the deinterleaved uncoded bits from step I and degrouping them back into a Reed-Solomon code word byte stream;

(K) descrambling the Reed-Solomon code word byte stream for bursts that are scrambled;

(L) de-interleaving the Reed-Solomon code word byte stream of TDMA bursts;

(M) error correcting the Reed-Solomon code words to generate and output recovered data bits transmitted by the cable modem that transmitted the burst.

16. The process of claim 15 wherein step D further comprises receiving an initial symbol clock offset value from the start of burst detection performed in step C and using that initial value as a starting point to recover and track the symbol clock of each burst.

17. The process of claim 16 wherein step D further comprises the step of using the recovered symbol clock to resample the symbol data at the correct timing and output a predetermined number of re-timed samples per symbol.

18. The process of claim 16 wherein step C start of burst detection includes a correlation step to measure carrier offset, and wherein samples that are marked with an erasure bit are not used or ignored in said correlation step.

19. The process of claim 16 wherein step D timing recovery does not use symbols marked as erased in symbol clock recovery.

20. The process of claim 15 wherein tracking loops which accomplish step E do not use symbols which have been marked as erased in step B in tracking and correcting phase and amplitude errors in preamble symbols and data symbols of bursts.

21. The process of claim 15 wherein the process of step F of developing equalization coefficients does not use symbols which have been marked as erased in step B to update tap coefficients.

22. The process of claim 15 further comprising the step of processing both time division multiplexed data bursts as well as spread spectrum data bursts using a equalizer and predictor circuit which cooperates with a rotational amplifier, said equalizer and predictor circuits being finite impulse response digital filters the coefficients and states of which are controlled in a predetermined manner at the beginning of each new spreading interval during reception of spread spectrum data bursts to reduce errors in reception of said data bursts transmitted by a cable modem after said upstream equalization coefficients have been developed and transmitted to said cable modem.

23. The process of claim 15 wherein step H is performed using a Viterbi decoder to decode each Trellis Code Modulated (hereafter TCM) data symbol into the coded and uncoded bits which were encoded into it, and, when the burst is not TCM encoded, using a conventional slicer to decode the data symbols.

24. The process of claim 15 wherein the development of upstream equalization coefficients in step F comprises developing coarse equalization tap coefficients during an initial pass of preamble symbols of training bursts through an adaptive equalization filter followed by fine tuning of said equalization tap coefficients by repeatedly passing at least said preamble symbols of each burst through said adaptive equalization filter using said coarse equalization coefficients as starting tap coefficient values.

25. The process of claim 15 wherein step H is performed using a Viterbi decoder to decode each Trellis Code Modulated (hereafter TCM) data symbol into the coded and uncoded bits which were encoded into it, and, when the burst is not TCM encoded, using a conventional slicer to decode the data symbols, and wherein said Viterbi decoder receives symbols with erasure bits set by an impulse detector which implements step B, and wherein said erasure bit indication for each symbol is used to set branch metric clipping values small when the state of said erasure bit indicates the presence of impulse noise and is used to set branch metric clipping values larger when the state of said erasure bit indicate impulse noise is not present, and wherein said Viterbi decoder outputs the coded and uncoded bits of each constellation point with an erasure indication indicating a level of confidence of the Viterbi decoder in its decision.

26. The process of claim 25 further comprising a step of outputting the number of bytes marked with erasure indications by said Viterbi decoder for use in setting the number of Reed-Solomon information bytes in a Reed-Solomon codeword of future bursts.

27. The process of claim 25 wherein the Reed-Solomon decoding step M uses said erasure bits output by said Viterbi decoder to increase the error detection and correction capability of the Reed-Solomon decoding step.

28. A head end receiver apparatus for multichannel, mixed mode reception of digital data in a distributed system, comprising:

a plurality of analog front end means, each coupled to one of a plurality of hybrid fiber coaxial (hereafter HFC) cable systems, each said system coupled to a plurality of cable modems that transmit DOCSIS 1.x, ATDMA or SCDMA bursts, for filtering out unwanted radio frequency signals and wideband sampling of burst signals on a channel which may have two or more sub-channels transmitting bursts of different center frequency, symbol rate and/or multiplexing type;

a plurality digital front end receiver means, each capable of being selectively coupled to any one of said analog front end means, each digital front end receiver circuit for receiving a select control signal and coupling itself to one of said analog front end means and receiving samples therefrom, mixing the samples of each channel or sub-channel burst received from said selected analog front end means down to baseband, resampling the sample data of each burst at a multiple of the symbol rate of said burst, filtering and decimating each sub-channel burst down to a predetermined number of samples per symbol based upon the symbol rate of the burst, performing narrow band excision to remove or suppress narrow band noise, writing burst parameter data pertaining to the burst being received and phase and amplitude error correction factors pertinent to the burst being received into a front end buffer to prepend the burst data or act as a header for said burst data, and writing the preamble and data symbols of the burst being received into said front end buffer;

a control means coupled to at least said plurality of digital front end receiver means for controlling said digital front end receiver means to receive multiple channels of data from one or more of said HFC systems, each channel being either mixed mode or single mode;

arbitrator means coupled to the front end buffer of each of said plurality of digital front end receiver means, for selecting burst data to be further processed according to a priority scheme, and providing said burst data at an output;

a shared demodulator coupled to receive each burst's preamble and data symbols when selected by said arbitrator means and for recovering the data encoded in said data symbols and making predetermined measurements to support ranging by the cable modem and developing phase and amplitude error correction factors for each cable modem from preamble symbols transmitted by said cable modem and using said phase and amplitude error factors developed for each cable modem to correct phase and amplitude errors in bursts transmitted from said cable modem, and developing upstream equalization coefficients from the preamble symbols of at least some bursts for sending to the cable modem which transmitted said burst;

and further comprising equalizer means for processing both time division multiplexed data bursts and code division multiplexed data bursts after despreading to reduce echoes and other noise and use phase and amplitude error correction factors developed for the cable modem which transmitted said data burst to correct for phase and amplitude offset errors in said burst.

29. A head end receiver apparatus for multichannel, mixed mode reception of digital data in a distributed system, comprising:

a plurality of channel receivers, each capable of receiving single mode or mixed-mode channels, each having a front end buffer;

an arbiter coupled to the front end buffers of all said channel receivers for supplying burst data of various bursts on the basis of a priority scheme;

a back end demodulator coupled to receive burst data from said aribiter and recover payload data encoded into each burst; and a control circuit coupled to control said plurality of channel receivers to receive and process multiple single mode or mixed-mode channels simultaneously if necessary.

30. A process for receiving digital data in a central modem coupled to a plurality of remote modems via a shared transmission medium, comprising:

using a counter to establish upstream minislot boundaries;

assigning minislots for particular bursts and assigning burst parameters that define the type of burst to be transmitted during said assigned minislots and transmitting said assigned minislots and burst parameters to a remote modem which has requested bandwidth;

receiving radio frequency carrier signals and filtering out unwanted radio frequency signals and digitally sampling one or more desired radio frequency carriers modulated with bursts of symbols that encode digital data to generate a sample stream representing a desired channel;

mixing said sample stream down to baseband, and excising narrow band noise;

filtering in a matched filter to improve the signal to noise ratio;

despreading the spectrum of any bursts that are code division multiplexed;

detecting the start of each burst by detecting a unique word preamble, and measuring a time offset between an actual start time and an anticipated start time and using said time offset to send a message to a remote modem which transmitted said burst to assist said remote modem in ranging to achieve minislot synchronization so that said remote modem's bursts can be timed to arrive at said central modem aligned in time with the minislot boundaries assigned to said transmission;

recovering a carrier frequency of each burst;

recovering the symbol clock of each time division multiplexed burst;

processing a preamble portion of each burst to generate phase and amplitude correction factors unique to the remote modem which transmitted said burst and using said phase and amplitude correction factors developed for a particular remote modem to correct phase and amplitude offset errors of the data portion of a burst from said remote modem;

processing a preamble portion of each burst in an equalizer to develop upstream equalization coefficients for the remote modem which transmitted said burst, and transmitting said upstream equalization coefficients to said remote modem for its use in adjusting the tap coefficients of a preemphasis filter therein used to filter upstream transmissions to said central modem;

filtering time division multiplexed bursts using the same equalizer used to generate said upstream equalization coefficients to remove echoes and using a predictor to remove further noise, and outputting filtered symbols;

filtering bursts of symbols that have been code division multiplexed using cyclic, orthogonal spreading codes using the same equalizer used to develop said upstream equalization coefficients to remove echoes and using a predictor digital filter to remove further noise, and setting state and tap coefficients of said equalizer and predictor digital filters to a new state at the beginning of each spreading interval, said new state determined according to a predetermined algorithm designed to make use of the property that echoes of chips within the same spreading interval will appear in different, predictable codes than the symbol data encoded in said chips in a code domain after despreading when the spectrum was spread using cyclic, orthogonal spreading codes, and outputting filtered symbols;

detecting and error correcting the digital data encoded in said filtered symbols.

31. A process for filtering symbols of time division multiplexed bursts and symbols of code division multiplexed bursts after despreading using a same equalizer filter, comprising the steps:

receiving noise corrupted symbols of time division multiplexed bursts and receiving noise corrupted chips of synchronous code division multiplexed (SCDMA) bursts which have had their spectra spread using cyclic, orthogonal spreading codes, and bypassing a despreading step for said time division multiplexed bursts while processing said received, noise corrupted chips of said SCDMA bursts with a despreader to recover noise corrupted symbols therefrom, each of said time division multiplexed and SCDMA bursts having been filtered in a transmitter which transmitted said burst using a pre-emphasis filter having its tap coefficients set to equalize the channel through which the burst was transmitted;

filtering said noise corrupted symbols of said time division multiplexed bursts using a digital equalizer filter to remove echoes and summing the resulting filtered symbols with the output of a digital predictor filter to remove further noise, and outputting filtered symbols from said time division multiplexed bursts;

filtering said noise corrupted symbols output by said despreading step using the same digital equalizer filter used to filter said noise corrupted symbols of said time division multiplexed bursts to remove echoes and summing the resulting filtered symbols with the output of the same digital predictor digital filter to remove further noise, and controlling the states and coefficients said digital equalizer filter and said digital predictor filter according to any algorithm designed to make use of the property that echoes of chips within the same spreading interval will appear in different, predictable codes than the symbol data encoded in said chips in the code domain after despreading if the spectrum of the spread spectrum burst being processed was spread using cyclic, orthogonal spreading codes and an echo delay is small enough that the echo of a chip is still within the same spreading interval time, and outputting filtered symbols.

32. The process of claim 31 wherein the states and coefficients of said digital equalizer and predictor filters are controlled to filter the symbols of one or more synchronous code division multiplexed (SCDMA) bursts in an synchronous code division multiplexed (SCDMA) frame during which one or more SCDMA bursts are transmitted simultaneously during one or more spreading intervals, said filtering process to filter the symbols of each burst carried out one SCDMA burst at a time and one spreading interval at a time, and wherein the states and coefficients of said digital equalizer and digital predictor filters are controlled by performing the following steps:

(1) at the beginning of each SCDMA frame, the states of said equalizer filter and said predictor filter are set to zero;

then, at the beginning of a first spreading interval in an SCDMA burst, the following steps are performed:

(2) loading predetermined predictor filter coefficients into said digital predictor filter, said predetermined predictor filter coefficients being adapted predictor filter coefficients stored in a predictor buffer at the end of the first spreading interval of the previous SCDMA burst in the same SCDMA frame;

then at the end of each spreading interval of an SCDMA burst, the following steps are performed:

(3) storing the state of said digital predictor filter in said predictor buffer either in a location dedicated to storing the state of said digital predictor filter for the spreading interval just processed or with tag data identifying the spreading interval number of the spreading interval just processed;

at the beginning of each spreading interval of an SCDMA burst, the following steps are performed:

(4) loading the state of said digital predictor filter with the state stored in said predictor buffer of said digital predictor filter at the end of the same number spreading interval of the previous SCDMA burst within the same SCDMA frame;

(5) loading the state of said digital equalization filter with all zeros;

at the beginning of only the first spreading interval of a burst, the following step is performed (6) loading the filter coefficients of said digital equalization filter to default values, and thereafter adapting said filter coefficients during each spreading interval of said burst;

and wherein the step of filtering SCDMA bursts is accomplished by:

(7) filtering each symbol of each spreading interval of said SCDMA burst using a feed forward filter portion of said digital equalization filter;

(8) processing each symbol output by step (7) in a rotational amplifier using amplitude and phase offset correction factors calculated for the transmitter which transmitted said burst to calculate amplitude and phase offset corrected symbols;

(9) subtracting from each symbol output by step (8) the output of a digital feedback equalization filter;

(10) subtracting from each filtered symbol output from step (9) a corresponding output of said digital predictor filter to compute an output symbol;

(11) inputting each symbol output by step (10) into a slicer and comparing the input to said slicer to an output of said slicer to develop an error signal for each symbol;

(12) subtracting the output of said slicer from each symbol output by step (9) to calculate an interference estimate signal for each symbol;

(13) inputting each said error signal into a least mean squares (LMS) calculation process and using the results of said LMS process to adapt said filter coefficients of said digital predictor filter; and

(14) inputting each said interference estimate signal or said error signal into a least mean squares (LMS) process, and using the results of said LMS process to adapt the filter coefficients of said digital equalization filter.

33. The process of claim 32 further comprising the following steps:

(15) receiving symbols of null bursts transmitted on unused codes which bear no data and processing said symbols according to steps (1) through (14);

(16) examining the output of said slicer as each symbol which bears no data is processed thereby and calibrating said slicer to have an output of 0+j*0.

34. The process of claim 32 further comprising the following steps:

(17) loading said interference estimate signals into said predictor filter as its initial state as the symbols of said null burst are processed through said slicer; and

(18) using said error signal or said interference estimate signal generated as the symbols of said null burst are processed through said slicer as an input to an LMS algorithm and using the LMS algorithm to adapt the filter coefficients of the predictor filter to set its initial tap weights.

35. The process of claim 32 further comprising the following steps:

(15) receiving symbols of null bursts transmitted on unused codes which bear no data and processing said symbols according to steps (1) through (14);

(16) loading said interference estimate signals into the predictor filter as its initial state as the symbols of said null burst are processed through said slicer; and

(17) using said error signal or said interference estimate signal generated as the symbols of said null burst are processed through said slicer as an input to an LMS algorithm and using the LMS algorithm to adapt the filter coefficients of the predictor filter to set its initial tap weights.

36. The process of claim 32 further comprising the steps:

processing a preamble of known symbol data of at least some bursts in a preamble processor to develop initial amplitude and phase offset correction factors;

applying said initial amplitude and phase offset correction factors to first and second multipliers, respectively, of said rotational amplifier;

and wherein step (8) is accomplished by:

multiplying filtered symbols output by said feed forward digital equalization filter by said initial amplitude offset correction factor to output amplitude corrected symbols;

multiplying said amplitude corrected symbols by said phase offset correction factor to output amplitude and phase corrected symbols.

37. The process of claim 31 wherein the states and coefficients of said digital equalizer and predictor filters are controlled to filter the symbols of one or more synchronous code division multiplexed (SCDMA) bursts in an synchronous code division multiplexed (SCDMA) frame during which one or more SCDMA bursts are transmitted simultaneously during one or more spreading intervals, said filtering process to filter the symbols of each burst carried out one SCDMA burst at a time and one spreading interval at a time, and wherein the states and coefficients of said digital equalizer and digital predictor filters are controlled by performing the following steps:

(1) at the beginning of each SCDMA frame, the states of said equalizer filter and said predictor filter are set to zero;

then, at the beginning of a first spreading interval in an SCDMA burst, the following steps are performed:

(2) loading predetermined predictor filter coefficients into said digital predictor filter, said predetermined predictor filter coefficients being adapted predictor filter coefficients stored in a predictor buffer at the end of the first spreading interval of the previous SCDMA burst in the same SCDMA frame;

then at the end of each spreading interval of an SCDMA burst, the following steps are performed:

(3) storing the state of said digital predictor filter in said predictor buffer either in a location dedicated to storing the state of said digital predictor filter for the spreading interval just processed or with tag data identifying the spreading interval number of the spreading interval just processed;

at the beginning of each spreading interval of an SCDMA burst, the following steps are performed:

(4) loading the state of said digital predictor filter with the state stored in said predictor buffer of said digital predictor filter at the end of the same number spreading interval of the previous SCDMA burst within the same SCDMA frame;

(5) loading the state of said digital equalization filter with all zeros;

at the beginning of only the first spreading interval of a burst, the following step is performed (6) loading the filter coefficients of said digital equalization filter to default values, and thereafter adapting said filter coefficients during each spreading interval of said burst;

and wherein the step of filtering each SCDMA burst is accomplished by:

(7) filtering each symbol of each spreading interval of said SCDMA burst using said digital feed forward equalization filter;

(8) subtracting from each filtered symbol output from step (7) an output of a digital feedback equalization filter to compute an equalized symbol;

(9) subtracting from each said equalized symbol the output of said predictor filter;

(10) processing each symbol output by step (9) with a rotational amplifier to correct amplitude and phase offset errors using amplitude and phase offsect correction factors developed for the transmitter which transmitted said burst;

(11) inputting each symbol output by step (10) into a slicer and comparing the input to said slicer to an output of said slicer to develop an error signal for each symbol;

(12) subtracting the output of said slicer from each symbol output by step (7) to calculate an interference estimate signal for each symbol;

(13) inputting each said error signal into a least mean squares (LMS) calculation process and using the results of said LMS process to adapt said filter coefficients of said digital predictor filter; and

(14) inputting each said interference estimate signal or said error signal into a least mean squares (LMS) process, and using the results of said LMS process to adapt the filter coefficients of said digital equalization filter.

38. The process of claim 37 further comprising the following steps:

(15) receiving symbols of null bursts transmitted on unused codes which bear no data and processing said symbols according to steps (1) through (14);

(16) examining the output of said slicer as each symbol which bears no data is processed thereby and calibrating said slicer to have an output of 0+j*0.

39. The process of claim 38 further comprising the following steps:

(17) loading said interference estimate signals into the predictor filter as its initial state as the symbols of said null burst are processed through said slicer; and

(18) using said error signal or said interference estimate signal generated as the symbols of said null burst are processed through said slicer as an input to said LMS algorithm and using the LMS algorithm to adapt the filter coefficients of the predictor filter to set its initial tap weights or filter coefficients.

40. The process of claim 37 further comprising the following steps:

(15) receiving symbols of null bursts transmitted on unused codes which bear no data and processing said symbols according to steps (1) through (14);

(16) loading said interference estimate signals into the predictor filter as its initial state as the symbols of said null burst are processed through said slicer; and

(17) using said error signal or said interference estimate signal generated as the symbols of said null burst are processed through said slicer as an input to an LMS algorithm and using the LMS algorithm to adapt the filter coefficients of the predictor filter to set its initial tap weights.

89

41. The process of claim 37 further comprising the steps:

(15) processing a preamble of known symbol data of at least some bursts in a preamble processor to develop initial amplitude and phase offset correction factors;

(16) applying said initial amplitude and phase offset correction factors to first and second multipliers, respectively, of said rotational amplifier;

and wherein step (10) is accomplished by

(17) multiplying filtered symbols output from step (9) by said initial amplitude offset correction factor to output amplitude corrected symbols;

(18) multiplying output by step (17) by said phase offset correction factor to output amplitude and phase corrected symbols for input to said slicer in step (11).

42. An error correction circuit for use in correcting symbol errors in received symbols of both time division multiplexed (TDMA) and synchronous code division multiplexed (SCDMA) bursts, comprising:

an input for receiving symbols of said TDMA bursts, and despread symbols of said SCDMA bursts;

a feed forward digital equalization filter (FFF) coupled to receive symbols at said input and having an output;

a rotational amplifier having an input coupled to said output of said FFF and having an output, and having a first input for receiving an amplitude offset correction factor and a second input for receiving a phase offset correction factor, both offset correction factors being unique to the transmitter which transmitted said burst;

a first summer having an output and having a first input coupled to said output of said rotational amplifier, and having a second input;

a second summer having an output, and having a first input coupled to said output of said first summer, and having a second input;

a symbol output coupled to said output of said second summer;

a slicer having an input coupled to said output of said second summer, and having an output;

a third summer having a first input coupled to said input of said slicer and a second input coupled coupled to said output of said slicer, and having an output at which an error signal appears;

a fourth summer having a first input coupled to said output of said first summer, and having a second input coupled to said output of said slicer, and having an output at which a interference estimate signal appears;

a first multiplier having an input coupled to receive said interference estimate signal, and having a multiplier input for receiving a $$\frac{1}{\alpha}$$

signal which is a complex number having the real part of the denominator $\alpha$ equal to said amplitude offset correction factor input to said rotational amplifier and having the imaginary part of the denominator $\alpha$ equal to said phase offset correction factor input to said rotational amplifier, and having an output at which the product of said interference estimate signal and said

90

$$\frac{1}{\alpha}$$

signal appears;

a digital predictor filter having a state input coupled to said output of said first multiplier and having an output coupled to said second input of said second summer, and having one or more filter coefficient inputs;

a second multiplier having an input coupled to said output of said digital predictor filter and having an input at which a multiplier equal to $\alpha$ is applied, and having an output at which the product of said state data times $\alpha$ appears;

a predictor buffer coupled to store the states of said predictor filter at the end of each spreading interval of an SCDMA burst, and coupled to store the tap weight coefficients of said predictor filter at predetermined times;

a digital equalization feedback filter having a state input coupled to receive the output from said slicer, and having an output coupled to said second input of said first summer, and having filter coefficient inputs;

a computer or other control circuit controlling said error correction circuit according to a predetermined algorithm to remove errors caused by echoes and other noise from said TDMA and SCDMA bursts.

43. The apparatus of claim 42 wherein said computer or other control circuit is structured or programmed to control said error correction circuit to filter the symbols of one or more TDMA bursts, and, when a synchronous code division multiplexed (SCDMA) frame, during which one or more SCDMA bursts are transmitted simultaneously during one or more spreading intervals, is received, said computer or other control circuit is structured to filter the symbols of each said synchronous code division multiplexed (SCDMA) bursts one SCDMA burst at a time and one spreading interval at a time, and wherein said computer or other control circuit is structured to control the states and coefficients of said equalizer and predictor filters by performing the following steps to error correct SCDMA bursts:

(1) at the beginning of each SCDMA frame, the states of said equalizer filter and said predictor filter are set to zero;

then, at the beginning of a first spreading interval in an SCDMA burst, the following steps are performed:

(2) loading predetermined predictor filter coefficients into said predictor filter, said predetermined predictor filter coefficients being adapted predictor filter coefficients stored in said predictor buffer at the end of the first spreading interval of the previous SCDMA burst in the same SCDMA frame;

then at the end of each spreading interval of an SCDMA burst, the following steps are performed:

(3) storing the state of said predictor filter in said predictor buffer either in a location dedicated to storing the state of said predictor filter for the spreading interval just processed or with tag data identifying the spreading interval number of the spreading interval just processed;

at the beginning of each spreading interval of an SCDMA burst, the following steps are performed:

(4) loading the state of said predictor filter with the state stored in said predictor buffer of said predictor filter at the end of the same numbered spreading interval of the previous SCDMA burst within the same SCDMA frame;

(5) loading the state of said equalization filter with all zeros;

at the beginning of only the first spreading interval of a burst, the following step is performed (6) loading the filter coefficients of said equalization filter to default values;

and for each SCDMA burst (7) inputting each said error signal into a least mean squares (LMS) calculation process and using the results of said LMS process to adapt said filter coefficients of said predictor filter; and (8) inputting each said interference estimate signal or said error signal into said least mean squares (LMS) process, and using the results of said LMS process to adapt the filter coefficients of said equalization filter.

44. The apparatus of claim 43 wherein said computer or other control circuitry is structured to control said error correction circuit to examine the output of said slicer when symbols of null bursts are received, and if the output of said slicer is not 0+j*0, applying a calibration signal to said slicer to calibrate its output to 0+j*0.

45. The apparatus of claim 43 wherein said computer or other control circuitry is structured to control said error correction circuit to load said inteference estimate signals into said predictor filter as its initial state as the symbols of null bursts are received and to feed said error or interference estimate signals to said LMS algorithm as the symbols of said null burst are being received and using the results of said LMS algorithm to set the initial tap weights of said predictor filter for processing SCDMA payload bursts.

46. The apparatus of claim 43 wherein said computer or other control circuitry is structured to control a preamble processor to process known preamble data of at least some bursts from each particular transmitter to generate and apply to control inputs of said rotational amplifier initial amplitude and phase offset correction factors peculiar to the transmitter which transmitted said burst;

and wherein said computer or other control circuitry is structured to control said error correction circuit to apply said error or interference estimate signals to said LMS algorithm and use the results of said LMS algorithm to adapt the values of said initial amplitude and phase offset correction factors during each spreading interval to develop fine tuned amplitude and phase offset correction factors for each burst from each transmitter.

47. An error correction circuit for use in correcting symbol errors in received symbols of both time division multiplexed (TDMA) and synchronous code division multiplexed (SCDMA) bursts, comprising:

an input for receiving symbols of said TDMA bursts, and despread symbols of said SCDMA bursts;

a feed forward digital equalization filter (FFF) coupled to receive symbols at said input and having an output;

a first summer having an output and having a first input coupled to said output of said FFF, and having a second input;

a second summer having an output, and having a first input coupled to said output of said first summer, and having a second input;

a rotational amplifier having an input coupled to said output of said second summer and having an output, and having a first input for receiving an amplitude offset correction factor and a second input for receiving a phase offset correction factor, both offset correction factors being unique to the transmitter which transmitted said burst;

a symbol output coupled to said output of said rotational amplifier;

a slicer having an input coupled to said output of said rotational amplifier, and having an output;

a third summer having a first input coupled to said input of said slicer and a second input coupled coupled to said output of said slicer, and having an output at which an error signal appears;

a fourth summer having a first input coupled to said output of said first summer, and having a second input coupled to said output of said slicer, and having an output at which a interference estimate signal appears;

a digital predictor filter having a state input coupled to said output of said fourth summer and having an output coupled to said second input of said second PATENT summer, and having one or more filter coefficient inputs;

a predictor buffer coupled to store the states of said predictor filter at the end of each spreading interval of an SCDMA burst, and coupled to store the tap weight coefficients of said predictor filter at predetermined times;

a digital equalization feedback filter having a state input coupled to receive the output from said slicer, and having an output coupled to said second input of said first summer, and having filter coefficient inputs;

a computer or other control circuit controlling said error correction circuit according to a predetermined algorithm to remove errors caused by echoes and other noise from said TDMA and SCDMA bursts.

48. The apparatus of claim 47 wherein said computer or other control circuit is structured or programmed to control said error correction circuit to filter the symbols of one or more TDMA bursts, and, when a synchronous code division multiplexed (SCDMA) frame, during which one or more SCDMA bursts are transmitted simultaneously during one or more spreading intervals, is received, said computer or other control circuit is structured to filter the symbols of each said synchronous code division multiplexed (SCDMA) bursts one SCDMA burst at a time and one spreading interval at a time, and wherein said computer or other control circuit is structured to control the states and coefficients of said equalizer and predictor filters by performing the following steps to error correct SCDMA bursts:

(1) at the beginning of each SCDMA frame, the states of said equalizer filter and said predictor filter are set to zero;

then, at the beginning of a first spreading interval in an SCDMA burst, the following steps are performed:

(2) loading predetermined predictor filter coefficients into said predictor filter, said predetermined predictor filter coefficients being adapted predictor filter coefficients stored in said predictor buffer at the end of the first spreading interval of the previous SCDMA burst in the same SCDMA frame;

then at the end of each spreading interval of an SCDMA burst, the following steps are performed:

(3) storing the state of said predictor filter in said predictor buffer either in a location dedicated to storing the state of said predictor filter for the spreading interval just processed or with tag data identifying the spreading interval number of the spreading interval just processed;

at the beginning of each spreading interval of an SCDMA burst, the following steps are performed:

(4) loading the state of said predictor filter with the state stored in said predictor buffer of said predictor filter at the end of the same numbered spreading interval of the previous SCDMA burst within the same SCDMA frame;

(5) loading the state of said equalization filter with all zeros;

at the beginning of only the first spreading interval of a burst, the following step is performed (6) loading the filter coefficients of said equalization filter to default values;

and for each SCDMA burst (7) inputting each said error signal into a least mean squares (LMS) calculation process and using the results of said LMS process to adapt said filter coefficients of said predictor filter; and (8) inputting each said interference estimate signal or said error signal into said least mean squares (LMS) process, and using the results of said LMS process to adapt the filter coefficients of said equalization filter.

49. The apparatus of claim 47 wherein said computer or other control circuitry is structured to control said error correction circuit to examine the output of said slicer when symbols of null bursts are received, and if the output of said slicer is not 0+j*0, applying a calibration signal to said slicer to calibrate its output to 0+j*0.

50. The apparatus of claim 47 wherein said computer or other control circuitry is structured to control said error correction circuit to load said inteference estimate signals into said predictor filter as its initial state as the symbols of null bursts are received and to feed said error or interference estimate signals to said LMS algorithm as the symbols of said null burst are being received and using the results of said LMS algorithm to set the initial tap weights of said predictor filter for processing SCDMA payload bursts.

51. The apparatus of claim 47 wherein said computer or other control circuitry is structured to control a preamble processor to process known preamble data of at least some bursts from each particular transmitter to generate and apply to control inputs of said rotational amplifier initial amplitude and phase offset correction factors peculiar to the transmitter which transmitted said burst;

and wherein said computer or other control circuitry is structured to control said error correction circuit to apply said error or interference estimate signals to said LMS algorithm and use the results of said LMS algorithm to adapt the values of said initial amplitude and phase offset correction factors during each spreading interval to develop fine tuned amplitude and phase offset correction factors for each burst from each transmitter.

* * * * *